US012752400B2

(12) United States Patent
Hanlon

(10) Patent No.: US 12,752,400 B2
(45) Date of Patent: Oct. 6, 2026

(54) VISE

(71) Applicant: Perfect Site LLC, Las Vegas, NV (US)

(72) Inventor: Jared W. Hanlon, Las Vegas, NV (US)

(73) Assignee: Perfect Site, LLC, Las Vegas, NV (US)

( * ) Notice: Subject to any disclaimer, the term of this patent is extended or adjusted under 35 U.S.C. 154(b) by 366 days.

(21) Appl. No.: 18/507,706

(22) Filed: Nov. 13, 2023

(65) Prior Publication Data

US 2024/0157515 A1 May 16, 2024

Related U.S. Application Data

(60) Provisional application No. 63/383,687, filed on Nov. 14, 2022.

(51) Int. Cl.

| | |
|---|---|
| ***B25B 1/02*** | (2006.01) |
| ***B25B 1/10*** | (2006.01) |
| ***B25B 1/24*** | (2006.01) |

(52) U.S. Cl.
CPC ................ *B25B 1/02* (2013.01); *B25B 1/103* (2013.01); *B25B 1/2426* (2013.01); *B25B 1/2457* (2013.01)

(58) Field of Classification Search
CPC ......... B25B 1/02; B25B 1/103; B25B 1/2426; B25B 1/2457
USPC ........ 269/240, 246, 247, 136, 164, 140–149
See application file for complete search history.

(56) References Cited

U.S. PATENT DOCUMENTS

| | | | | | |
|---|---|---|---|---|---|
| 587,749 | A * | 8/1897 | McKenzie | B25B 1/125 | 269/247 |
| 1,020,192 | A * | 3/1912 | Dade | B25B 1/125 | 269/232 |
| 1,333,432 | A | 3/1920 | Maier | | |
| 1,391,913 | A | 9/1921 | Smith | | |
| 1,392,130 | A | 9/1921 | Engstrom | | |
| 1,499,989 | A * | 7/1924 | Lehmann | B25B 1/2421 | 269/254 R |
| 1,511,298 | A | 10/1924 | Petzold | | |
| 1,529,867 | A * | 3/1925 | Burns | B25B 5/102 | 269/215 |
| 1,529,868 | A * | 3/1925 | Burns | B25B 5/145 | 269/215 |
| 1,538,500 | A | 5/1925 | Aubard | | |

(Continued)

FOREIGN PATENT DOCUMENTS

| | | |
|---|---|---|
| CN | 2625112 | 7/2004 |
| CN | 103372819 | 10/2013 |

(Continued)

OTHER PUBLICATIONS

Office Action and English Translation for China Patent Application No. 201680051266.6, mailed May 22, 2019, 28 pages.

*Primary Examiner* — Jason L Vaughan
(74) *Attorney, Agent, or Firm* — Snell & Wilmer LLP

(57) ABSTRACT

A vise includes a pair of clamping jaws, such as a stationary and a movable jaw which are mounted on a saddle which may be connected to a trailer hitch mount or a workbench. The elements of the vise may be constructed from formed sheet metal. The vise may permit gross adjustment of the relative positions of the jaws via a first saddle sliding mechanism and fine adjustment of the relative positions thereof, such as via a screw mechanism which moves one jaw along the saddle.

19 Claims, 33 Drawing Sheets

(56) References Cited

U.S. PATENT DOCUMENTS

| | | | | | |
|---|---|---|---|---|---|
| 1,583,611 | A * | 5/1926 | Seely | B25B 5/102 | 269/208 |
| 1,753,924 | A | 4/1930 | Gordon | | |
| 2,176,608 | A * | 10/1939 | Marsilius | B25B 1/103 | 269/146 |
| 2,241,297 | A | 5/1941 | Exstam | | |
| 2,260,995 | A | 10/1941 | Kruczek | | |
| 2,611,287 | A | 9/1952 | Brandstad | | |
| 2,703,028 | A | 3/1955 | Goodwill | | |
| 2,734,409 | A | 2/1956 | Schum et al. | | |
| 2,815,053 | A * | 12/1957 | Walker | B25B 5/163 | 269/211 |
| 2,882,771 | A * | 4/1959 | Blazek | B25B 1/2421 | 269/251 |
| 2,987,972 | A * | 6/1961 | Schneider | B25B 1/12 | 269/146 |
| 3,055,654 | A * | 9/1962 | Harrison | B25B 5/101 | 269/224 |
| 3,556,506 | A | 1/1971 | Welker | | |
| 3,815,892 | A | 6/1974 | Tulk | | |
| 4,243,212 | A | 1/1981 | Bunyea et al. | | |
| 4,257,584 | A | 3/1981 | Sterling | | |
| D282,143 | S | 1/1986 | Tarquinio | | |
| 4,572,494 | A * | 2/1986 | Goulter | E04G 25/06 | 269/329 |
| 4,687,190 | A | 8/1987 | Yang | | |
| 5,172,895 | A * | 12/1992 | Klimach | B25B 1/24 | 269/902 |
| 5,417,409 | A | 5/1995 | Reddell | | |
| 5,433,356 | A | 7/1995 | Russell | | |
| 6,554,264 | B1 * | 4/2003 | Alford | B25B 5/145 | 269/147 |
| 6,595,508 | B2 | 7/2003 | Duncan | | |
| 7,114,715 | B1 * | 10/2006 | Kirk | B25B 5/166 | 269/6 |
| 7,290,761 | B2 * | 11/2007 | Siegel | B25B 1/08 | 269/266 |
| 7,310,864 | B1 * | 12/2007 | Gingerich | B25B 27/22 | 29/256 |
| D653,592 | S | 2/2012 | Brown | | |
| D680,843 | S | 4/2013 | Onello et al. | | |
| 8,540,225 | B2 | 9/2013 | Ehnstrom | | |
| 9,079,464 | B2 | 7/2015 | Onello et al. | | |
| D749,020 | S | 2/2016 | McFarland | | |
| D802,490 | S | 11/2017 | McFarland | | |
| 10,035,244 | B2 | 7/2018 | Onello et al. | | |
| D837,698 | S | 1/2019 | Song | | |
| 10,173,302 | B2 | 1/2019 | Schwaiger et al. | | |
| 10,377,019 | B2 | 8/2019 | Onello et al. | | |
| 11,565,377 | B2 | 1/2023 | Hanlon et al. | | |
| 11,660,728 | B2 | 5/2023 | Kuter-Arnebeck et al. | | |
| 2003/0071405 | A1 | 4/2003 | Miksovsky | | |
| 2010/0072240 | A1 | 3/2010 | Cornes | | |
| 2015/0239098 | A1 | 8/2015 | Vincent | | |
| 2015/0283680 | A1 * | 10/2015 | Ursell | B25B 1/2489 | 269/149 |
| 2019/0358777 | A1 | 11/2019 | Onello et al. | | |
| 2023/0038808 | A1 | 2/2023 | Kuter-arnebeck et al. | | |
| 2023/0347476 | A1 | 11/2023 | Hanlon | | |
| 2024/0157515 | A1 | 5/2024 | Hanlon | | |

FOREIGN PATENT DOCUMENTS

| | | |
|---|---|---|
| CN | 103817611 | 5/2014 |
| CN | 203579440 | 5/2014 |
| CN | 203636663 | 6/2014 |
| CN | 203650011 | 6/2014 |
| CN | 203712532 | 7/2014 |
| CN | 105537992 | 5/2016 |
| CN | 206825243 | 1/2018 |
| CN | 207189486 | 4/2018 |
| CN | 217317615 | 8/2022 |
| GB | 181892 | 6/1922 |
| GB | 638854 | 6/1950 |
| KR | 10-1886497 | 8/2018 |
| WO | 2013024498 | 2/2013 |

* cited by examiner

VISE

RELATED APPLICATION DATA

This application claims priority to U.S. Provisional Application Ser. No. 63/383,687, filed Nov. 14, 2022, which prior application is incorporated by reference herein in its entirety.

FIELD OF THE INVENTION

The present invention relates to vises and similar types of clamping tools.

BACKGROUND OF THE INVENTION

Vises are well known, and are used to clamp tools and workpieces. However, most vises are relatively limited in their capabilities. For example, such vises may be able to clamp a workpiece or tool, and do nothing else. This is undesirable to users who want increased functionality from their vises.

Other problems are associated with the manufacture, assembly and shipping of vises. Typically, vises are constructed from cast elements which use a significant amount of steel/iron and contributes to the vise having a high mass. The high mass of existing vise increases the cost of shipping and storing them. Further, the cast configuration of vises create a number of problems associated with assembly and repair thereof. For example, traditional vises typically have jaw faces that connect to jaw bodies via a blind hole that is drilled and tapped, which is a significant problem because a slot and nut behind the screw is not easy to access. In addition, when portions of such vises are damaged, they can't readily be repaired or replaced by the user, thus often rendering the entire vise useless.

Traditional vises have other drawbacks. For example, traditional vises are most often clamped in only one direction, which provides a relatively limited working parameter.

There is, therefore, room for improvement in vises.

SUMMARY OF THE INVENTION

Aspects of the invention comprise vises, features or elements of vise, and methods of operating or using vises.

In one embodiment, a vise comprises a base, a first jaw connected to the base, a saddle, a second jaw movably mounted to the saddle, and a first means for moving the second jaw relative to the saddle, wherein the saddle is movable relative to the first jaw and movement of saddle relative to the first jaw causes the first and second jaws to be moved towards and away from one another, and wherein movement of the second jaw relative to the saddle causes the first and second jaws to be moved towards or away from one another.

In one embodiment, the saddle may have an elongated tubular construction, and may be fabricated from sheet metal, such as having a top, a pair of sides and a bottom which has a slot which is defined by opposing sides of the sheet metal which is used to form the saddle. The top and sides may further define an inset channel, whereby each of the top and sides has a Z beam configuration.

The second jaw may have a base which defines a passage for receiving the saddle, and the means for moving may comprise a drive screw which is located in the saddle. A spindle nut may be mounted on the drive screw and be connected to the second jaw, thus allowing the second jaw to move along the saddle as driven by the drive screw.

In one embodiment, a means for locking may allow the position of the saddle to be changed relative to the first jaw, such as comprising at least one pin which is connected to the first jaw and may selectively engage one of a plurality of apertures in the saddle.

The first and second jaws may comprise jaw bodies which are constructed from sheet metal. The jaw bodies may define one or more working surfaces which are supported by beams.

The jaw bodies may define or mount features or accessories, such as dies, bending elements, covers or fractal jaw assemblies.

In one embodiment, the vise may be mounted to a work surface, such as via the base. In other embodiments, the vise might be mounted to a trailer hitch or other mount, such as by a portion of the saddle or an extension thereof.

Features or aspects of the vise may be configured to reduce the manufacturing time and cost and the weight of the vise, such as to reduce production and shipping costs. Features or aspects of the vise may also facilitate serviceability thereof, such as to repair or replace parts of the vise.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise vises, features or elements of vise, and methods of operating or using vises.

Figure 1A:
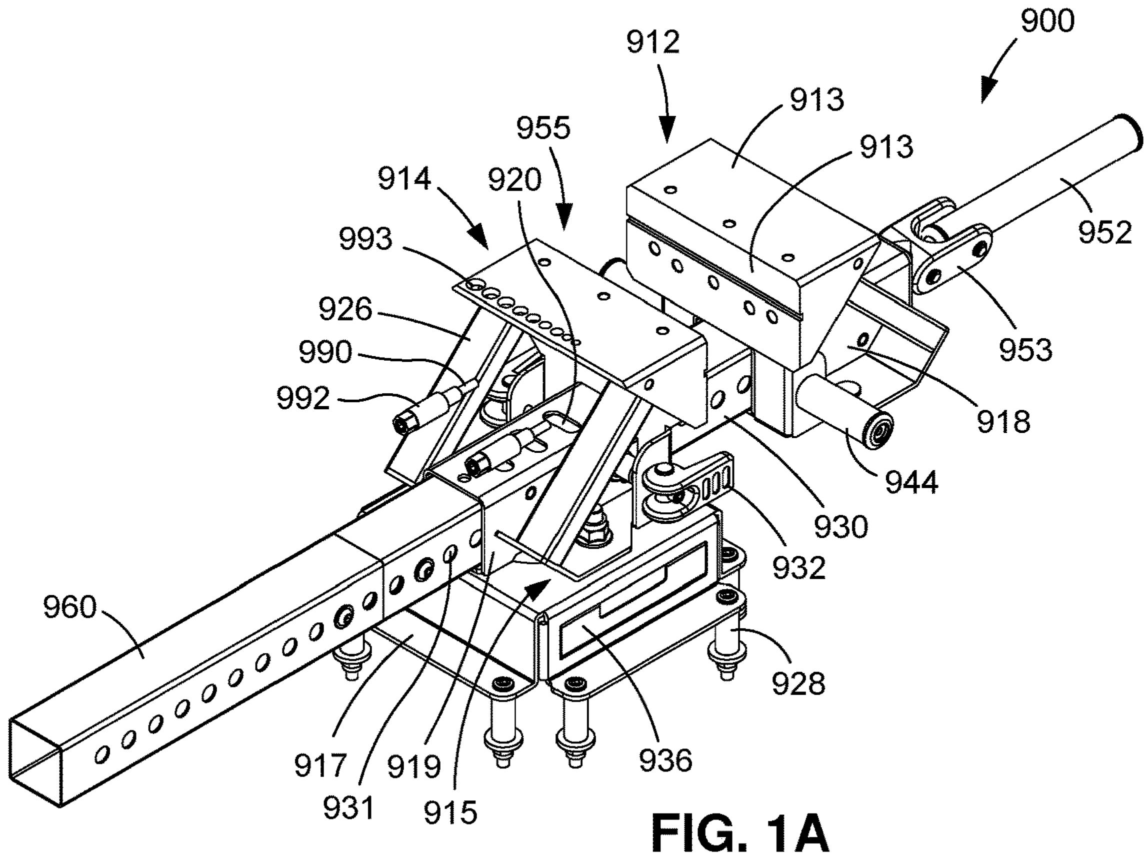
FIGS. 1A-1K are views of a fabrication vise in accordance with an embodiment of the invention.
Figure 1B:
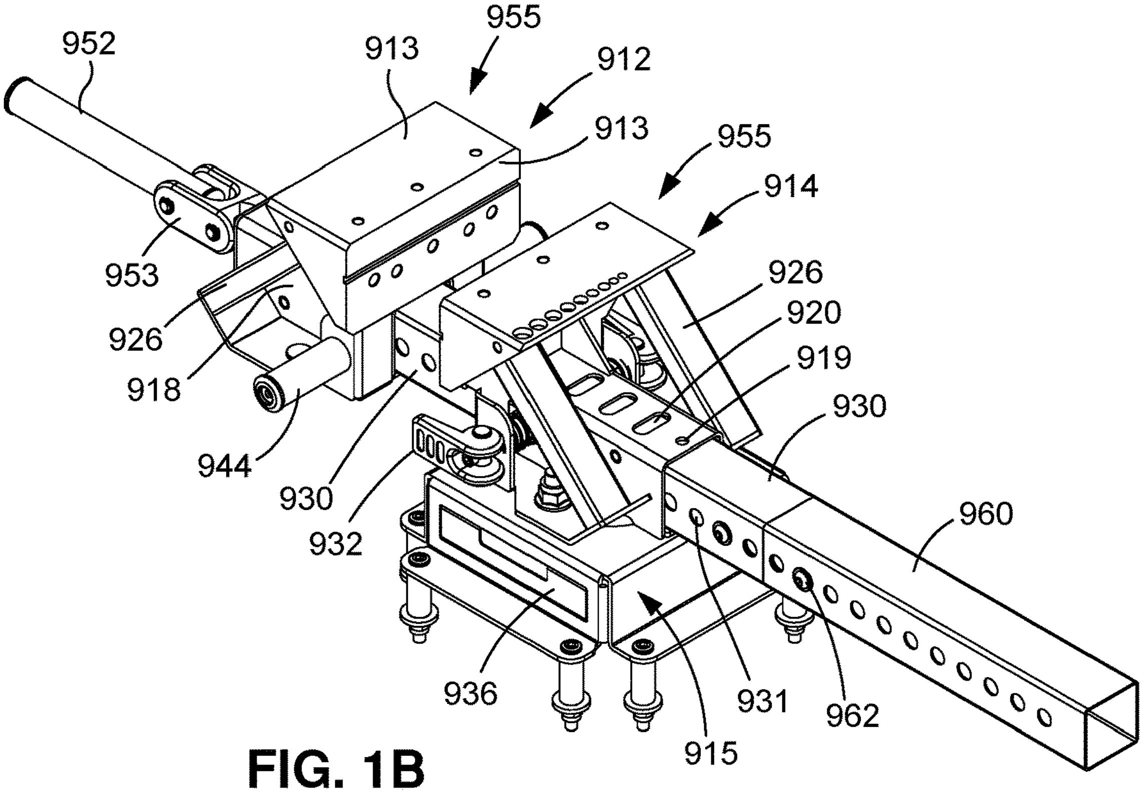

FIGS. 1A-B illustrate an embodiment of a vise or workpiece holding device in the form of a fabrication vise 900.

The fabrication vise 900 includes a first jaw 912, which is may be referred to as a movable jaw, and a second jaw 914, which may be referred to as a stationary jaw.

In one embodiment, the second or stationary jaw 914 is mounted to a base 915. The base 915 may have various shapes and sizes. In one embodiment, the base 915 is generally square. The base 915 may be used to support the vise 900 on a work surface. In one configuration, the base 915 may be mounted to the work surface. For example, the base 915 may include one or more flanges 917 which extend outwardly therefrom, such as from the bottom of one or more of the sidewalls thereof, for supporting or connecting one or more fasteners 928 thereto. The fasteners 928 might comprise, for example, bolts, screws or the like which are used to connect the base 915 to the work surface. In one embodiment, the fasteners may comprise expandable sleeves or locks which can be passed through an opening in the work surface and then expanded, such as by rotation of a fastener into the sleeve, to expand the sleeve and prevent removal of the sleeve from the work surface.

In one embodiment, as illustrated, the base 915 may define a hollow interior. In one configuration, the base has one or more upwardly extending walls or supports that support a top surface to which the stationary jaw 914 is mounted. The walls and top surface may thus define a interior space below the top surface. One or more openings, doors or the like might be provided for accessing the interior space, such as for storing work elements, accessories or the like. In one embodiment, at least one drawer 936 might be provided, which drawer can be moved in and out of the interior space of the base 915.

The stationary jaw 914 is preferably connected to the base 915, such as by being located at a top thereof. The stationary jaw 914 might be connected by one or more fasteners, such as bolts, or via welding or other means of connection.

In one embodiment, the stationary jaw 914 comprises a slide 919. The slide 919 preferably defines a passage for receiving a saddle 930 therethrough. The saddle 930 preferably comprises an elongated support, such as comprising a square or "U" shaped tube. In one embodiment, the saddle 930 may define a plurality of mounts, such as apertures or openings 931 therein. In one embodiment, the openings 931 are provide in on or both lateral sides of the saddle 930. In one embodiment, the saddle 930 may include a scratch resistant finish, such as a plated finish or a coating. In one embodiment, one or more bearings, such as nylon guides, may be removably located in the passage through the slide 919. These guides may be used to facilitate smooth movement of the saddle 930 through the slide 919 and prevent wear of those components. The guides may be replaceable (such as by fitting in to slots in the slide 919 or being mounted with fasteners), thus permitting the user to replace them when worn.

Figure 1C:
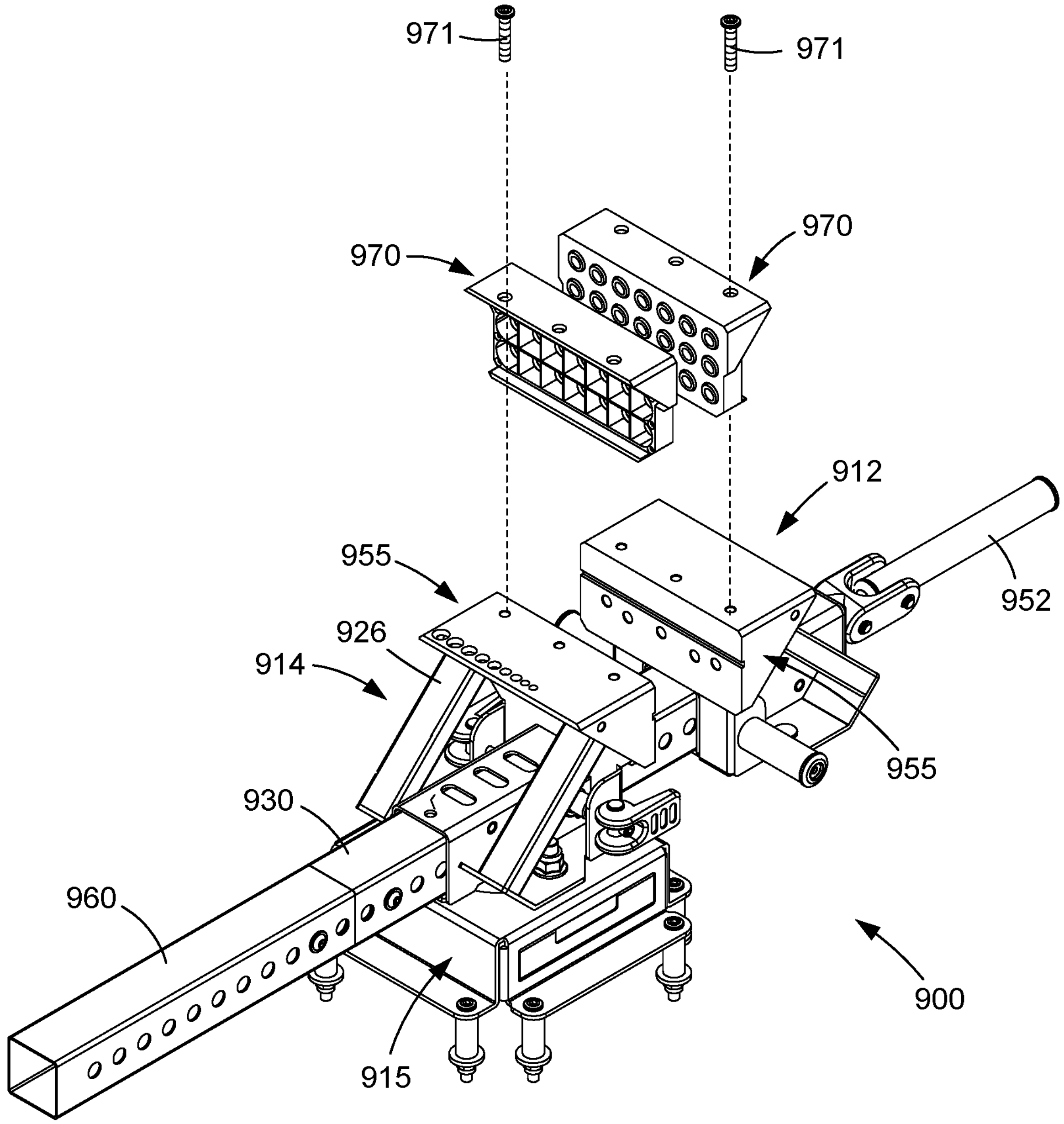
Figure 1D:
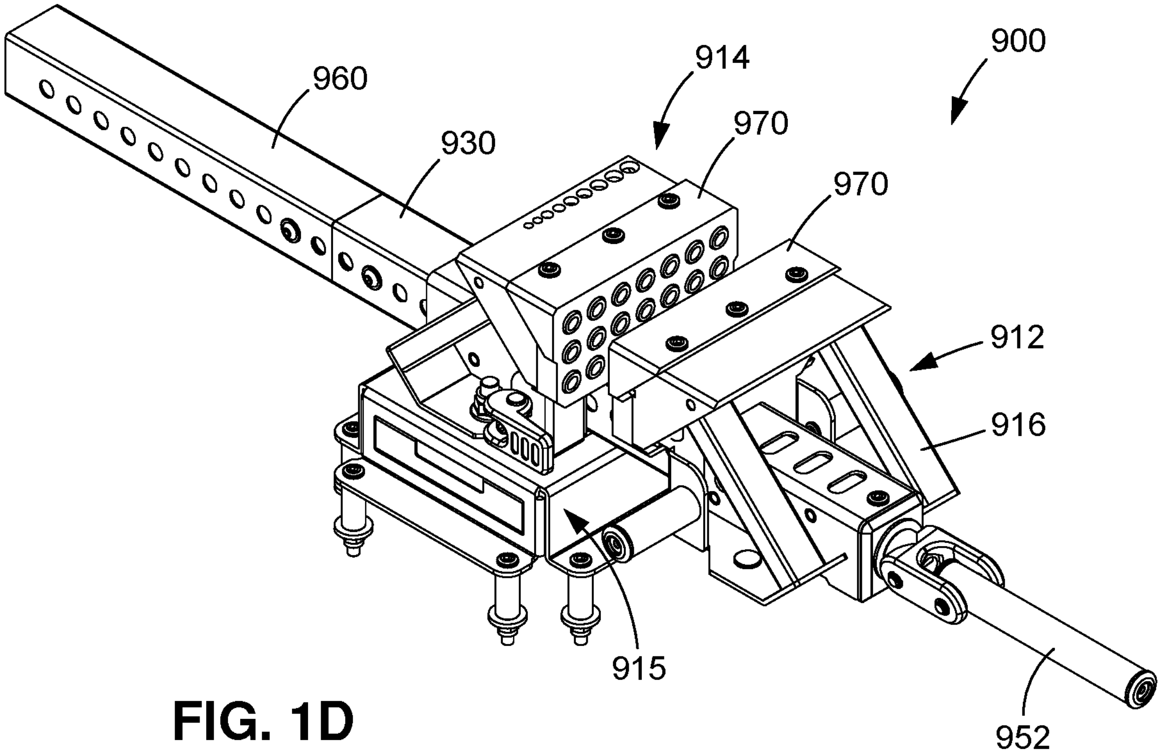
Figure 1E:
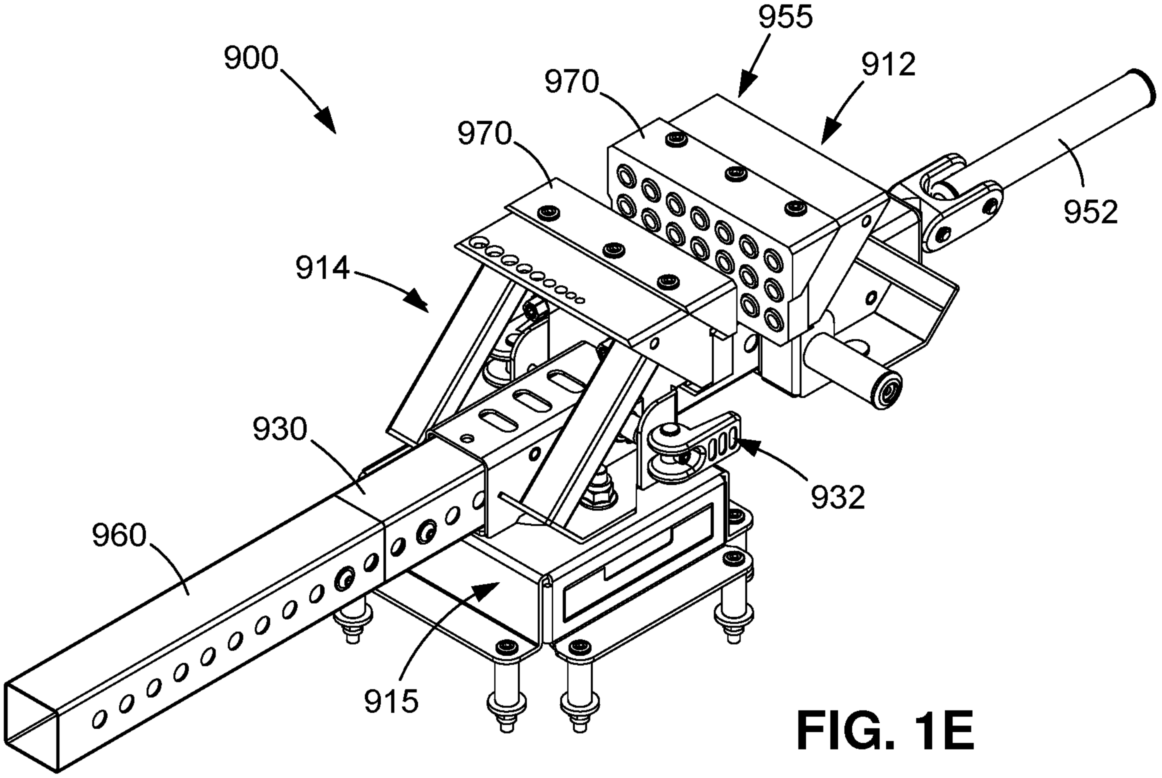
Figure 1F:
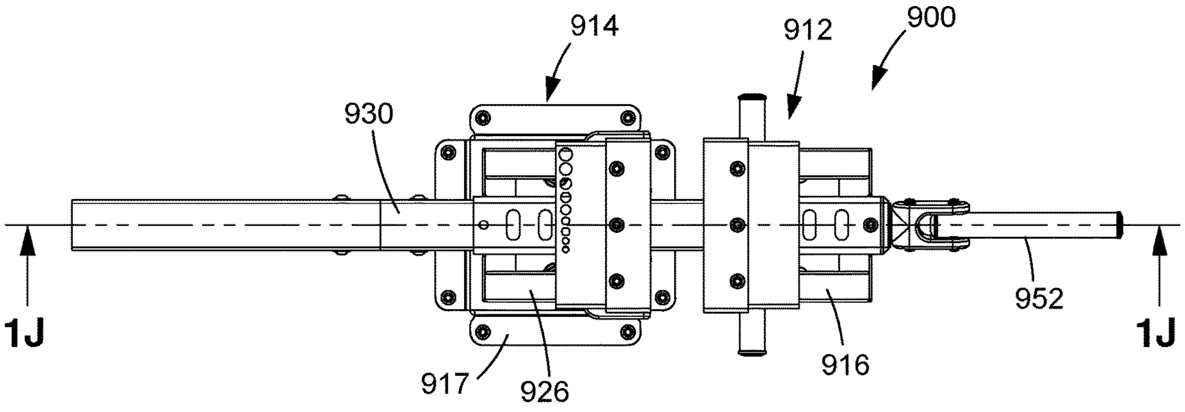
Figure 1G:
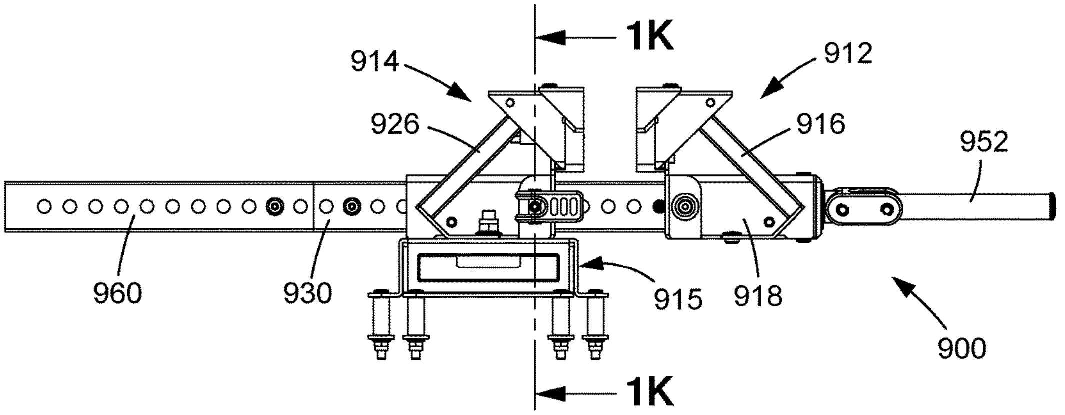
Figure 1H:
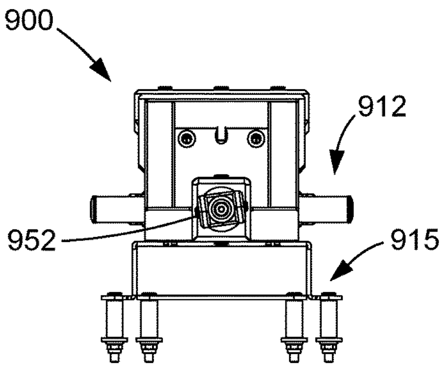
Figure 1I:
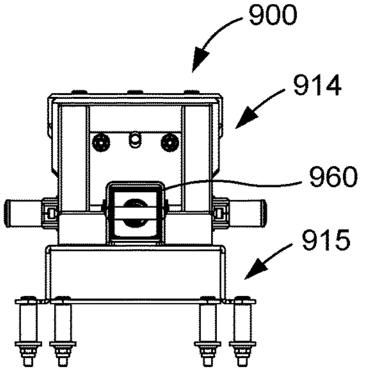
Figure 1J:
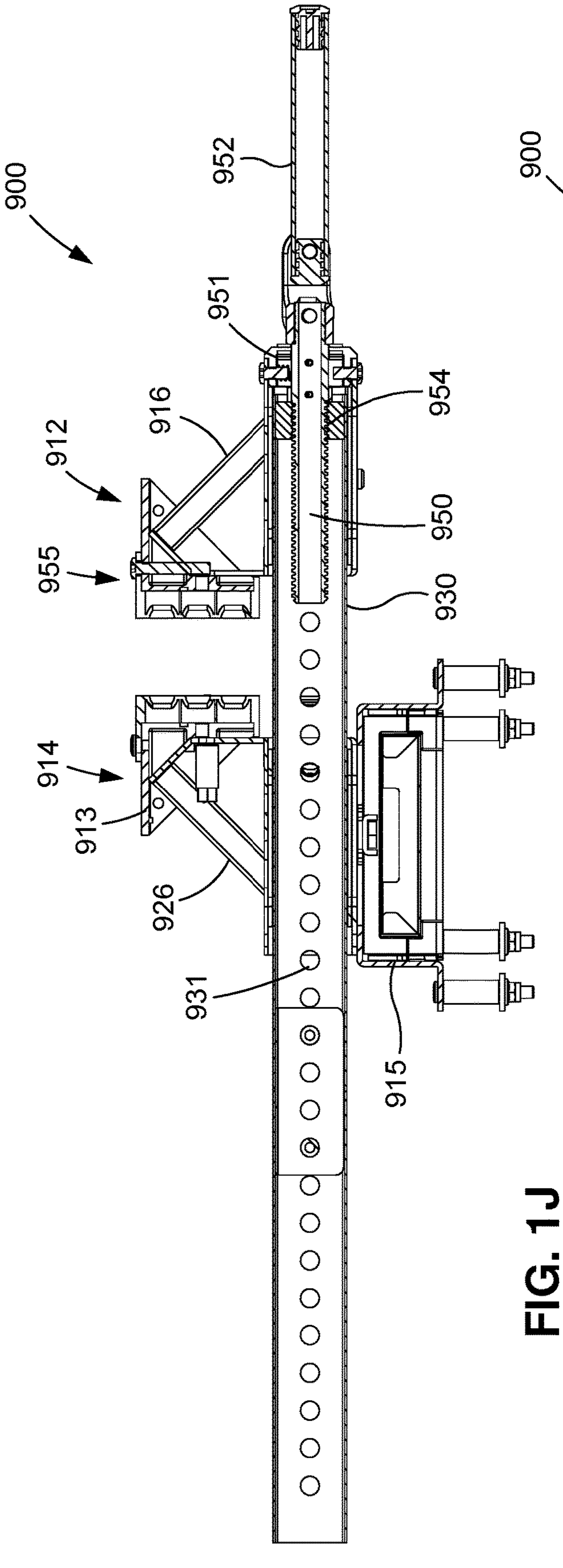
Figure 1K:
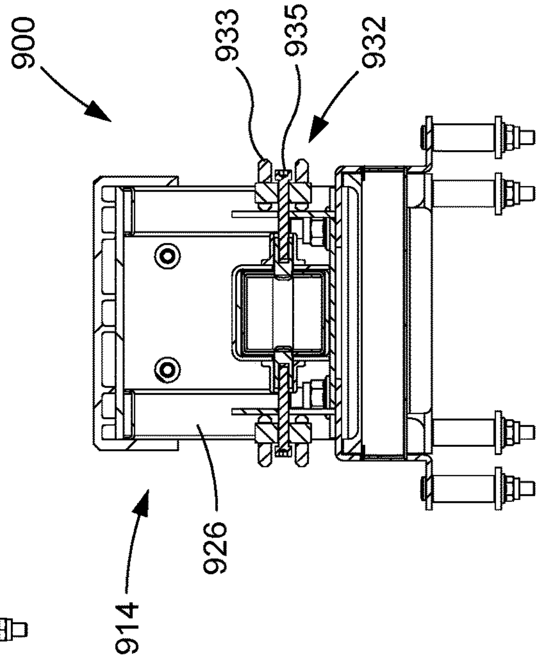
Figure 6A:
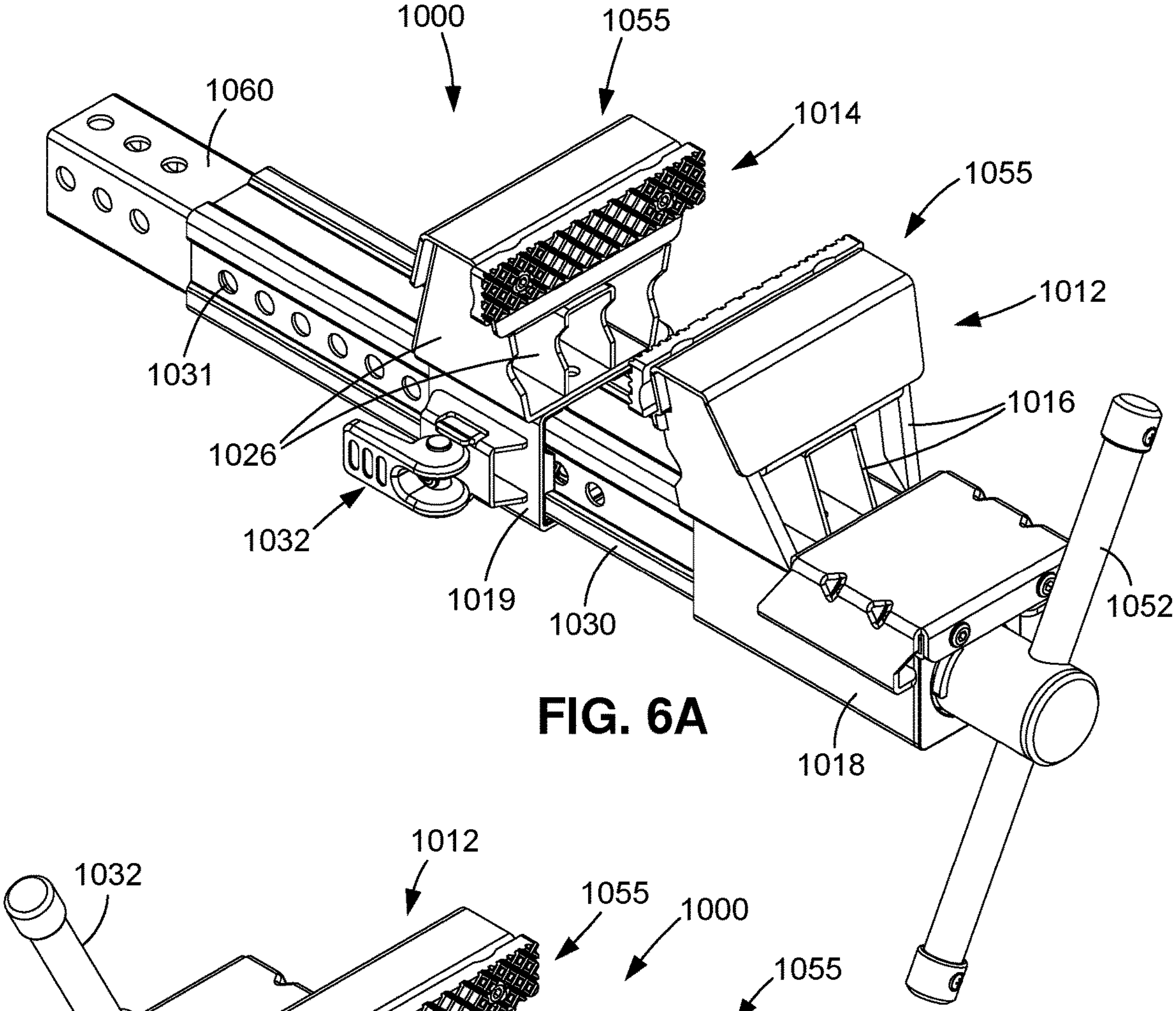
FIGS. 6A-6I are views of a trailer vise in accordance with an embodiment of the invention.
Figure 6B:
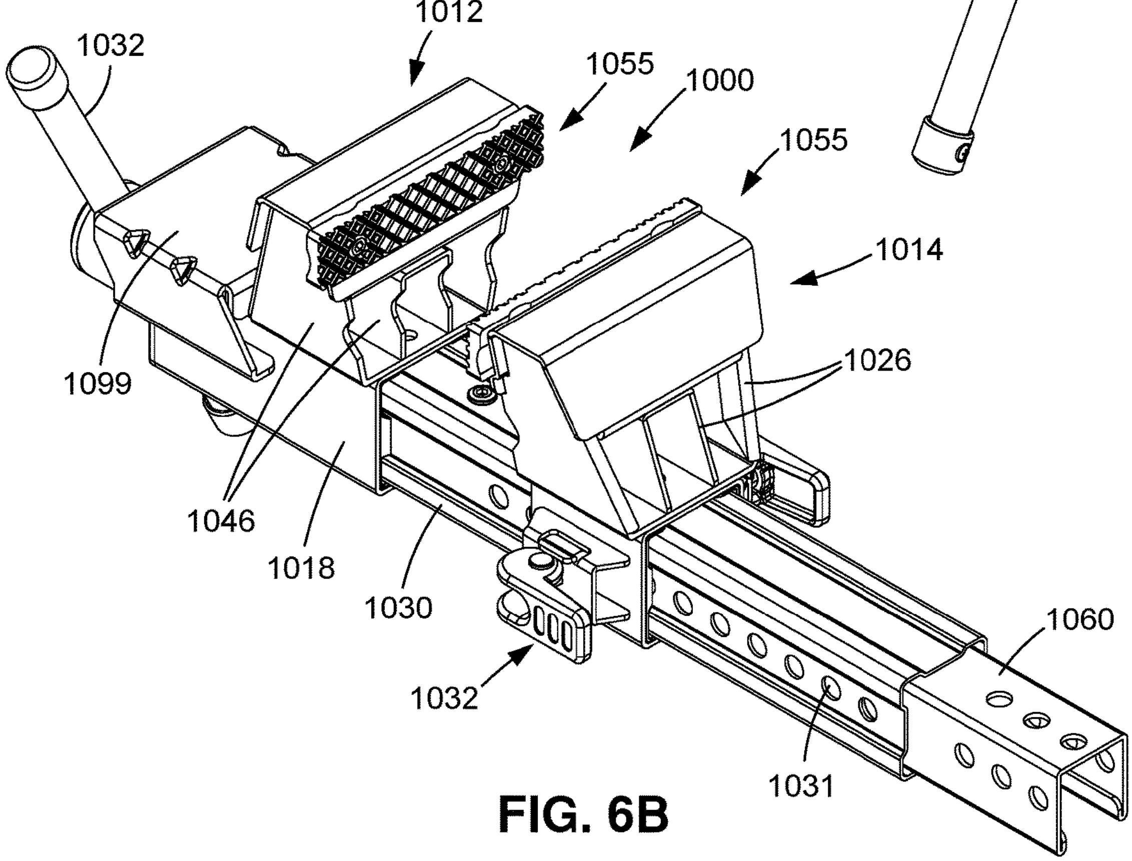
Figure 6C:
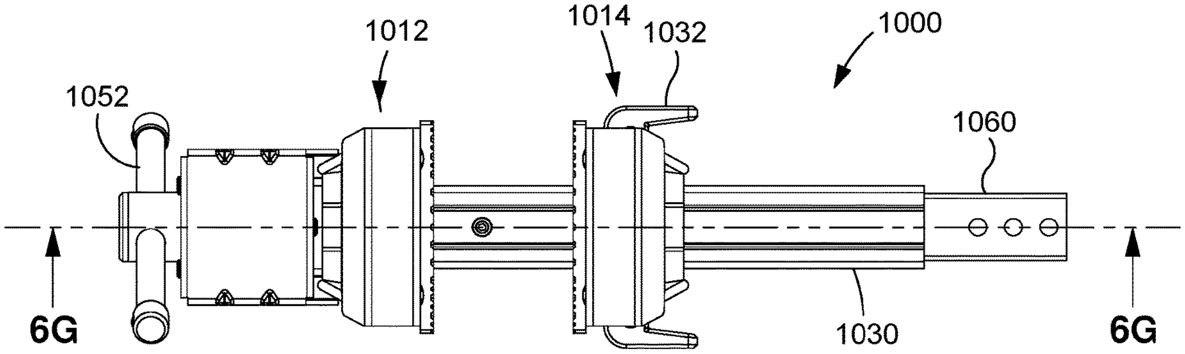
Figure 6D:
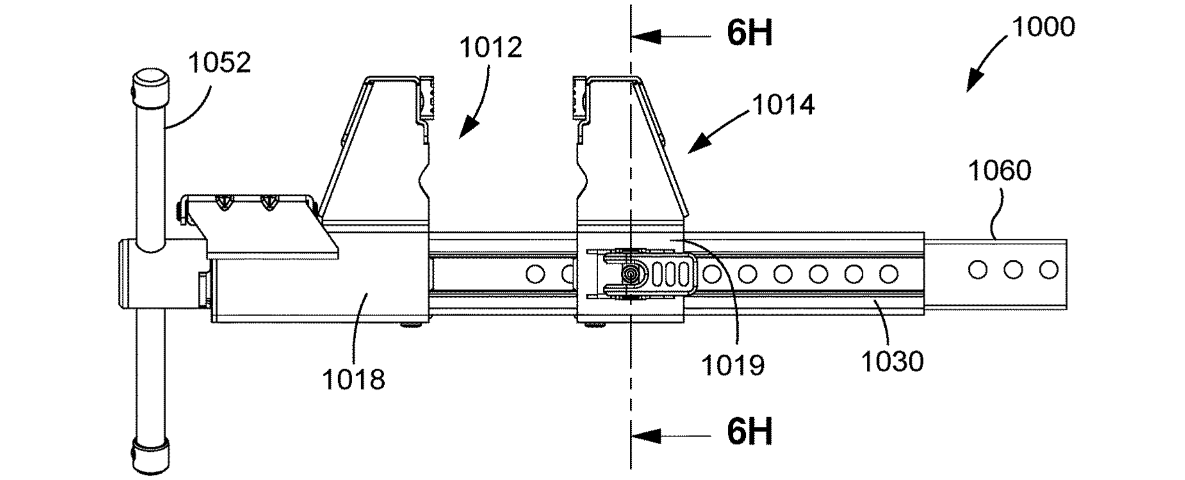
Figure 6E:
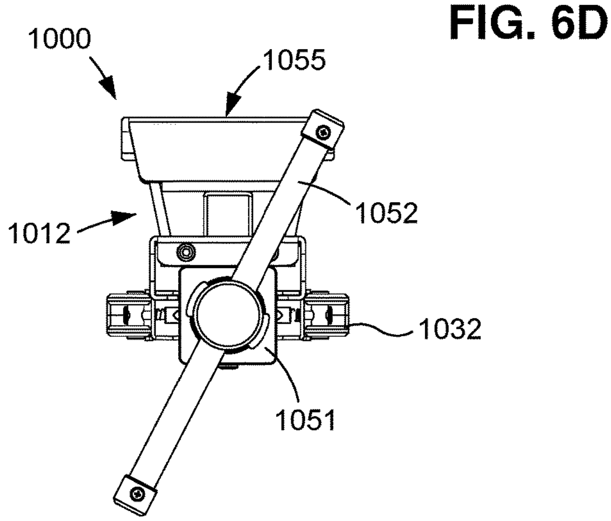
Figure 6F:
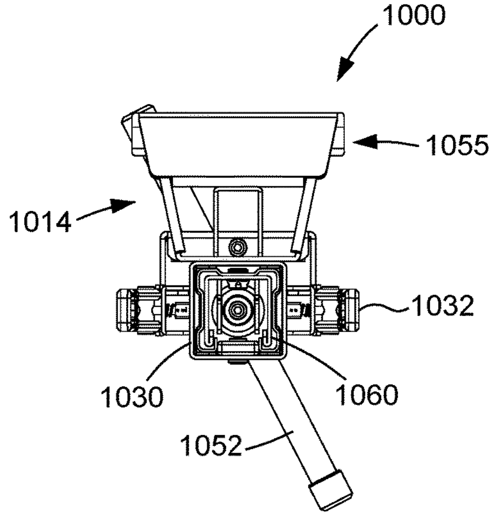
Figure 6G:
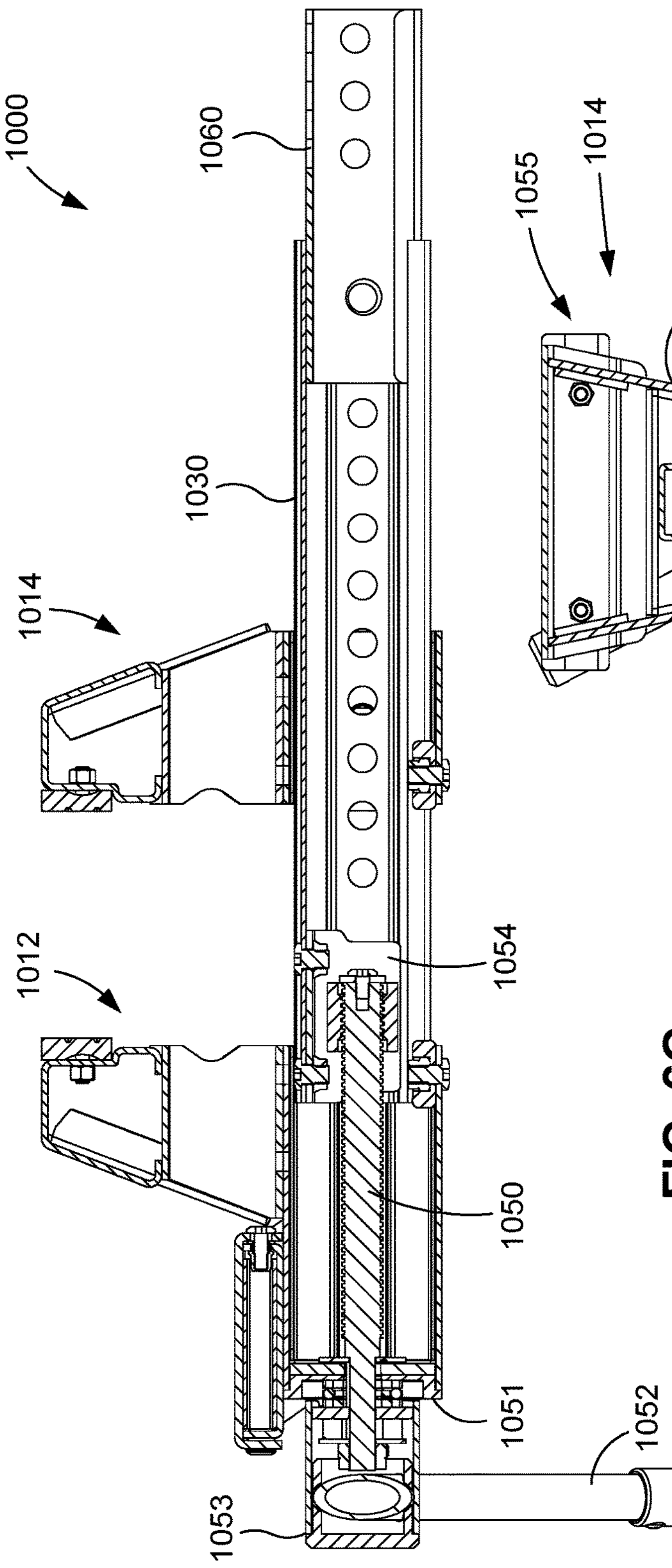

Preferably, the position of the saddle 930 may be changed relative to the stationary jaw 914. In one embodiment, the saddle 930 can be moved through the slide 919. The position of the stationary jaw 914 relative to the saddle 930 may then be fixed, such as by a saddle lock 932. In one embodiment, the saddle lock 932 comprises a pin 935 which can be moved in and out of a corresponding aperture 931 in the saddle 930, such as via a handle 933, as best illustrated in FIG. 1K. As illustrated, a lock 932 may be provided at both sides of the slide 919 for engaging corresponding apertures 931 on body sides of the slide 919. Of course, other types of mounts or locks might be utilized. For example, a single elongated pin might be removably placed through the slide 919 and saddle 930. An advantage to the lock 932 which is illustrated is that it may be mounted to the slide 919 so as to not be removable, thus removing the risk of losing the pins. Also, the lock 932 may include a rotatable handle 933 which, when rotated to one position, causes the pin 935 to retract, and in another position, causes the pin 935 to be extended, thereby simplifying the use of the lock 932. This may be accomplished by the handle 933 having a cam surface, such as an outwardly extending semi-circular or curved body, and rotatable mounting the handle 933 to the pin 935. In this configuration, the handle 933 may be rotated to cause the cam surface to engage a portion of the slide 919 of the stationary jaw 914, thus causing it to move outwardly therefrom, pulling the pin 935 outwardly. The handle 933 may then be moved back to the closed position, allowing the pin 935 to move inwardly. In one embodiment, the pin 935 may be biased inwardly, such as by a spring. However, the saddle lock 932 might comprise other means for selectively fixing the relative positions of the saddle 930 and slide 919. Additional details of a saddle lock are illustrated in FIG. 6I and described below.

The movable jaw 912 comprise a body 918 that is also configured to accept the saddle 930. The movable jaw 912 is preferably mounted for movement along the saddle 930, towards and away from the stationary jaw 914. In one embodiment, as best illustrated in FIG. 1J, the vise 900 includes a threaded shaft 950. The threaded shaft 950 may, for example, extend into the saddle 930 at one end thereof, such as by being rotatably mounted to a cap or guide 951 which is connected to the saddle 930. In one embodiment, the cap or guide 951 is bolted to the saddle 930, thus allowing the cap or guide 951 and the associated shaft 950, to be removed for service.

A handle 952 may be mounted or connected to an end of the shaft 950 that extends outwardly of the saddle 930. In one embodiment, the handle 952 may have a tubular construction, such as to reduce the weight of the vise 900. The handle 952 allows the user to rotate the shaft 950. The remaining portion of the shaft 950 may be located inside of the saddle 930, such as to permit rotation of the spindle relative thereto. The handle 952 may be connected to the spindle 950 via a universal joint or member 953 that permits the handle 952 to be placed in offset positions from the axis of the shaft 950.

The movable jaw 912 may be mounted to the shaft 950 via a spindle nut 954, such as which is connected to the body 918 thereof. It will be appreciate that as the shaft 950 rotates, the spindle nut 954 is drawn along the shaft 950, thus causing the movable jaw 912 to slide along the saddle 930. Rotation of the shaft 950 in clockwise or counter-clockwise directions serves to move the movable jaw 912 towards or away from the stationary jaw 914.

Both the movable jaw 912 and the stationary jaw 914 preferably include or define one or more working surfaces 913 (which may be generally planar, but might have other shapes). The working surfaces 913 may comprise, for example, a generally vertical working surface (which vertical working surfaces of the jaws 912, 914 face one another), and generally horizontal or top working surfaces (which may extend generally perpendicular to the vertical working surfaces). The working surfaces 913 may be defined by a jaw body 955. One jaw body 955 may be removably attached (such as with threaded fasteners) to the body 918 of the movable jaw 912 and another jaw body may be movably attached to the slide 919 of the stationary jaw 914, thus allowing the jaw bodies to be replace for service and also allowing their positions to be adjusted, such as to ensure that they are aligned (for example, to ensure that the vertical and horizontal working surfaces are aligned when placed against one another).

Unlike existing vises which are constructed from cast components, such as cast jaw bodies which are mounted to a cast base, the elements of the fabrication vise 900 are preferably constructed from sheet metal and tubing. For example, as indicated, the saddle 930 is preferably constructed sheet metal which is bent into a "U" shape, or might be constructed from standard tubing, such as square metal tubing. The movable jaw 912 (including the body 918 and jaw body 955), the base 915, and the stationary jaw 914 (including the slide 919 and jaw body 955), are preferably constructed from sheet metal, such as rolled sheet metal having a thickness of 0.2 to 0.12 inch. This metal may be cut, bent and welded or otherwise fabricated to form various features of the vise 900.

In one embodiment, the strength of the stationary jaw 914 is derived from support beams 926, which preferably also comprise folded sheet metal. The support beams 926 may extend from the jaw body 955 to the slide 919 to help distribute the pressure from the work surfaces 913 to the slide 919 and the saddle 930, as best illustrated in FIG. 1A. Likewise, the strength of the movable jaw 912 may be derived from support beams 916 that extend from the jaw body 955 to the body 918, as best illustrated in FIG. 1B. Again, these beams 916 may be constructed from sheet metal. In other embodiments, similar members such as ribs or the like which are constructed from sheet metal may be used to support the jaw bodies.

In use, a user may gross-adjust the positions of the movable jaw 912 and stationary jaw 914 relative to one another by changing the position of the saddle 930 relative to the stationary jaw 914 via the saddle locks 932. In one embodiment, one or more handles 944 (such as which may extend outwardly from either or both sides of the base 918) may be associated with the movable jaw 912. When the user releases the saddle locks 932, the user may grasp one or more of the handles 944 and then push or pull them to cause the position of the saddle 930 to change relative to the stationary jaw 914 (by sliding through the slide 919 thereof).

Fine adjustment of the movable jaw 912 may then be made by turning the handle 952 which moves the movable jaw 912 towards or away from the stationary jaw 914. The movement of the movable jaw 912 towards the stationary jaw 914 may be used, for example, to clamp a workpiece between the vertical work surfaces 913 of the jaw bodies 955 of the two jaws).

While in one embodiment, the vise 900 may be supported on a work surface, the vise 900 might be mounted to other elements. For example, an extension 960 might be mounted to the end of the saddle 930 which is opposite the handle 952. This extension 960 might, for example, permit mounting of the vise 900 to a trailer hitch receiver of a vehicle or a similar mount which is associated with another structure. The extension 960 might be configured to fit into or over the end of the saddle 930 and the two might be connected by one or more fasteners 962 which pass through aligned openings in the saddle 930 and the extension 960 (where the extension might 960 similarly comprise tubing having openings in the sides thereof). In another embodiment, the saddle 930 and extension 960 might be connected by a sleeve which fits inside the ends of the saddle 930 and extension 960 or over the ends of the saddle 930 and extension 960, and which is coupled thereto).

While the extension 960 is shown as having a series of apertures to be fixed with a fastener in a particular position within the saddle 930, a number of ways of fixing the location of the extension 960 are used in other embodiments. For example, the saddle 930 and/or extension 960 may incorporate or include a ratchet mechanism for selectively engagement with the other component (such as where the extension 960 may include slots for engagement with a biased ratchet element on the saddle 930, thus allowing the extension 960 to be slipped into the saddle 930 and locked at a particular position, or unlocked by releasing the biased ratchet element; or where the features thereof are reversed relative to the extension 960 and saddle 930). In another embodiment, the extension 960 includes a continuous notch on the surface, into which a corresponding workpiece (such as a locking or engaging member) is frictionally inserted after also passing through the saddle 930. In one example, the workpiece comprises a thumbscrew which is associated with the saddle 930 and can be turned to engage the extension 960 in the notch thereof, including where the pressing or engaging force is increased by the means of a spring-loaded mechanism.

While the saddle 930 is described as being of a U or square tubular construction, the saddle 930 might have other constructions, including being of different shapes such as rectangular, oval, circular, etc.

A number of benefits are created by the embodiments shown in these figures. One benefit includes the ability to make faster gross adjustment by sliding movement of the saddle 930 relative to one of the jaws (the stationary jaw 914 in this case) and then fine adjustment with the shaft 950.

The use of sheet metal to form the core portions of the vise 900 eliminates the need for expensive casting, avoids issues associated with casting (such as interior and/or exterior voids which may reduce the strength of the casting or require filling), substantially reduces the total weight of the vise 900 (thus saving substantial expense in the shipping of the vise 900, such as from the site of manufacture to the point of sale or to the customer), and allows quicker and easier modification to the design of the vise, such as to incorporate new features. Other elements may be constructed from standard tubing, thus eliminating the need for any custom cast parts for the main body of the vise.

The consistency and quality of sheet metal components is much higher than casting. Sheet metal quality is easier to measure. The sheet metal body is lighter than the traditional casting, yet stronger with the correct geometry, such as by utilizing lightweight bent/formed support beams 916, 926. In a preferred embodiment, the jaws have a triangle or truss shape profile (e.g. where the beams 916,926 or similar supports extend at an angle between the base and jaw body) that is supported by a tubular beam on one or two sides of the profile. The tubular beam can be square, rectangular, or round to create an optimal triangle shape.

As indicated, the movable jaw 912 and stationary jaw 914 may each include a jaw body 955 that defines one or more working surfaces. In one embodiment, these surfaces 913 may be oversized, or larger in dimension in either or both the vertical and horizontal surfaces (compared to cast vise jaws, where casting and weight limitations generally limit the size thereof), thereby providing larger clamping or anvil surfaces.

In one embodiment, the jaw bodies 955 may be configured to accept accessories, such as other engaging elements. For example, as illustrated in FIG. 1C, a fractal jaw body 970 may be connected to each jaw body 955, such as via a threaded fastener 971 which engages the jaw body 955.

The fractal jaw body 970 will be described in more detail with reference to FIGS. 2A-D. As illustrated in FIG. 2B, the fractal jaw body 970 may comprise a base 972 which defines one or more sockets located at/extending into a face thereof. A mount 974 may be located in the socket. The mount 974 may comprise, for example, a head 976 which includes a recess 977 which accepts an engaging member 980. The engaging member 980 may comprise a base 982 which is configured to be located in the recess 977 and includes a workpiece engaging surface or face 983. The engaging member 980 (or at least the face thereof) may be constructed from rubber or similar materials which are durable but flexible, preferably allowing them to deform and grip workpieces.

In one embodiment, the mounts 974 are preferably configured for independent rotation to one another relative to the base 972. In one embodiment, as best illustrated in FIGS. 2C and E, the head 976 of the mount 974 is connected to a base 975, such as via a stem 978. The base 975 may comprise a ball. In one embodiment, a means for biasing is provided that serves to bias the mount 974 into the position illustrated in FIG. 2B, e.g. where the face 983 of the engaging member 980 is generally parallel to the face of the base 972 of the jaw body 970. In one embodiment, this may comprise a silicone or similar flexible body 981. The silicone body 981 may be located at the back of the fractal jaw body 970 and define receivers for the bases 975 of the mounts 974 (for example, the bases 975 of the mounts 974 might be pushed through openings at the rear of the sockets in the jaw body 970, and thereon through passages in the silicone body 981. In this configuration, when the mount 974 is rotated relative to its corresponding socket in the jaw body 970, the base 975 thereof moves against the silicone body 981 which defines the receiver, which generates a biasing force for moving the base 975 back to the middle of the socket in the silicone body 981, re-aligning the mount 974 in the socket of the base 972 of the jaw body 970.

Figure 2A:
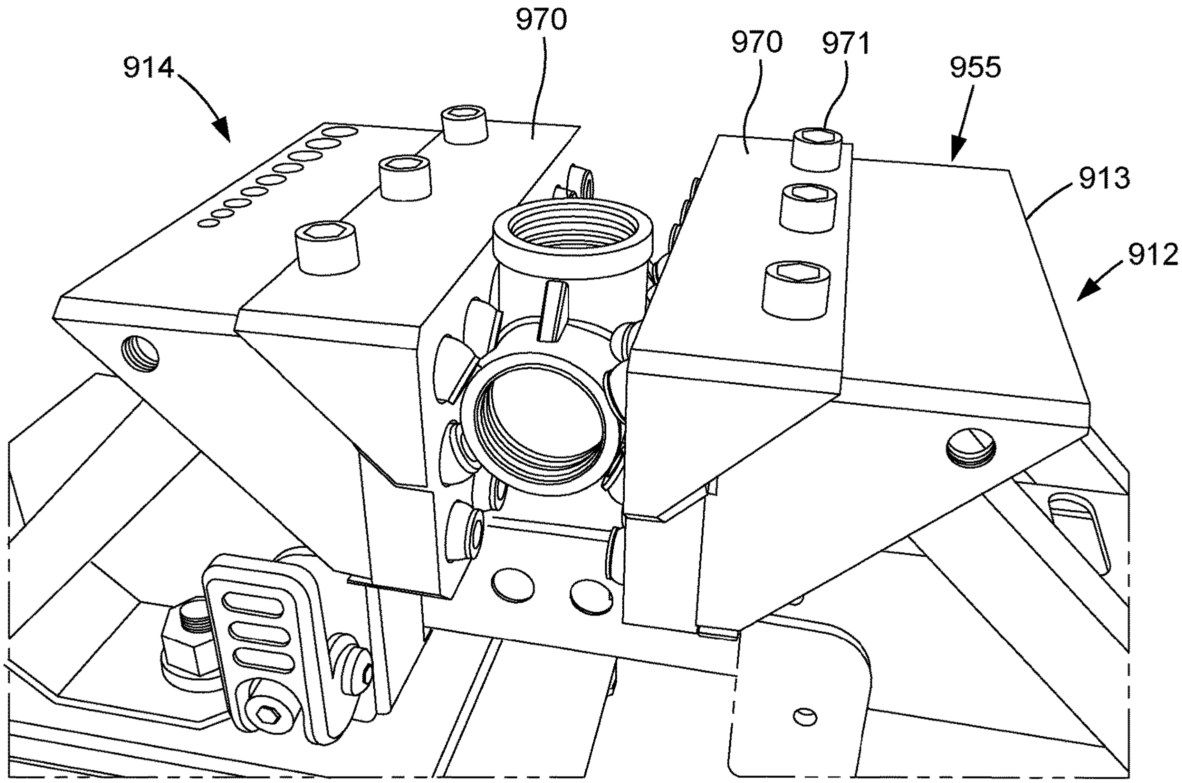
FIGS. 2A-2E are view of a fractal jaw for use with a vise in accordance with an embodiment of the invention.
Figure 2B:
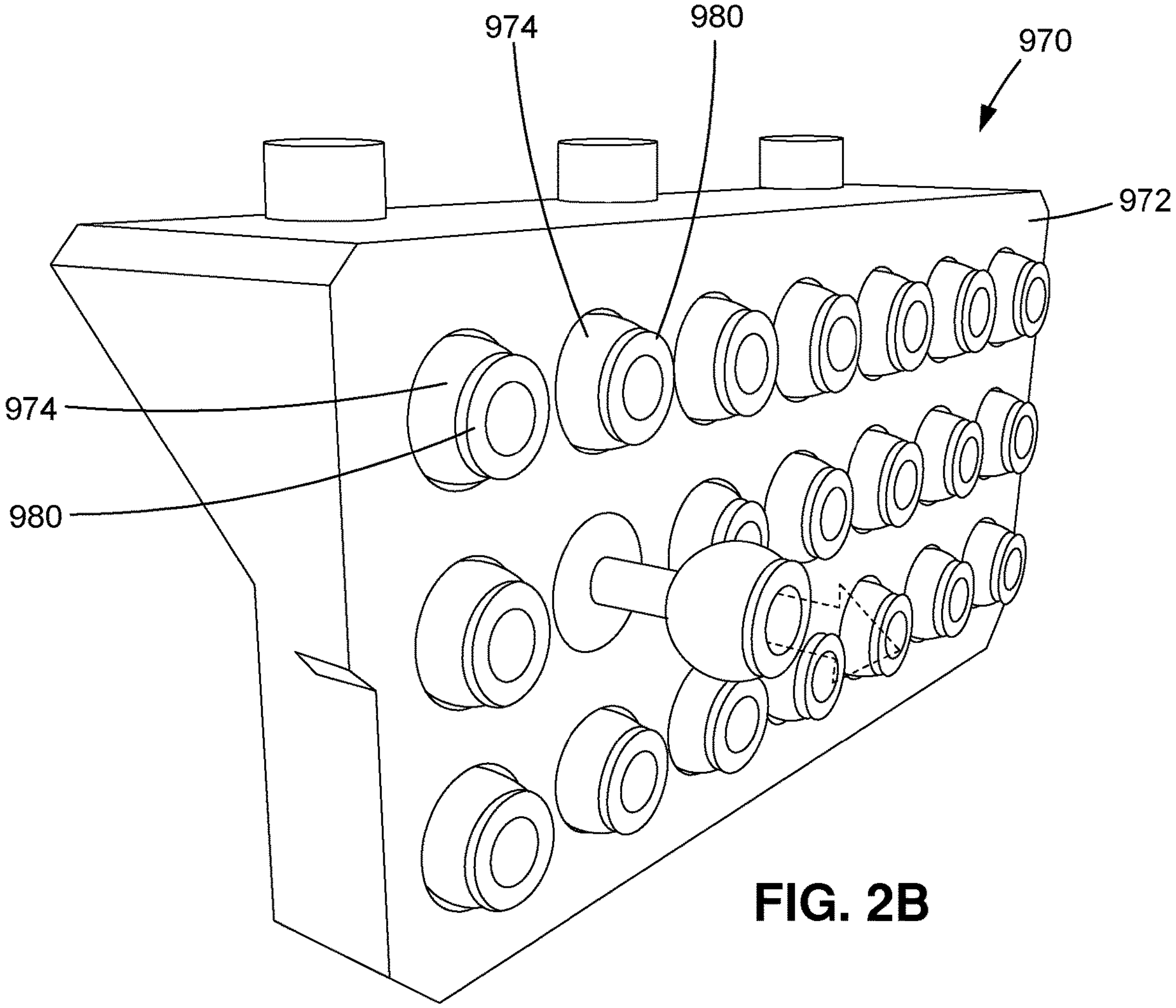
Figure 2C:
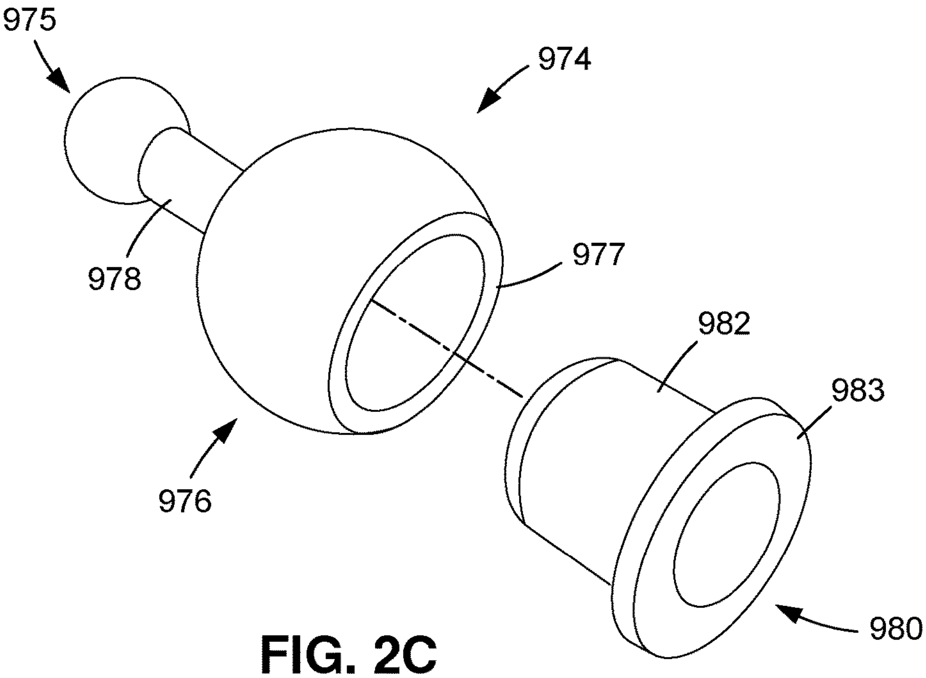
Figure 2D:
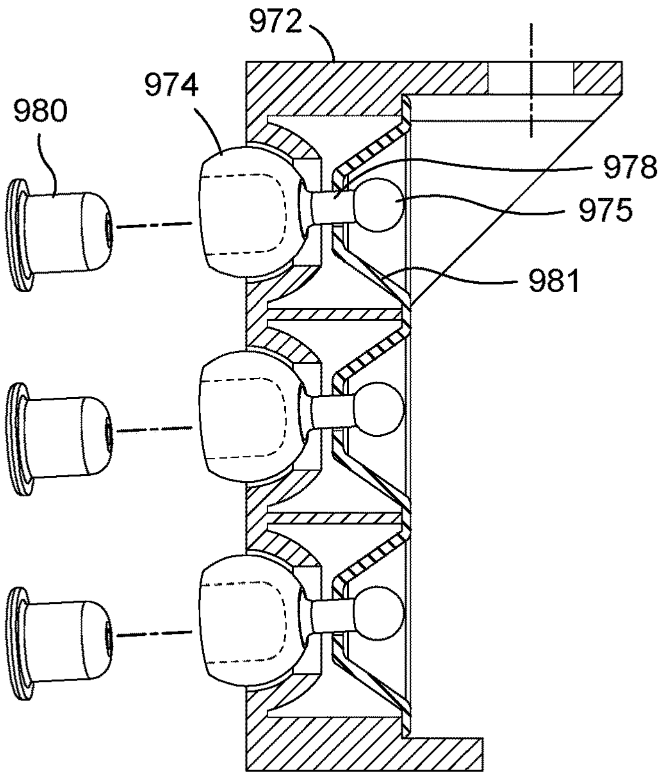

This mounting permits the orientation of each mount 974 to change relative to the base 972, as illustrated in FIG. 2A. This allows the engaging members 980 to be moved to positions in which they may engage one or more workpieces or portions of workpieces that are at different angles or positions relative to the jaws of the vise. When the workpiece is removed, the mounts 974 and engaging members 980 are preferably biased back to their positions illustrated in FIG. 2A.

Figure 2E:
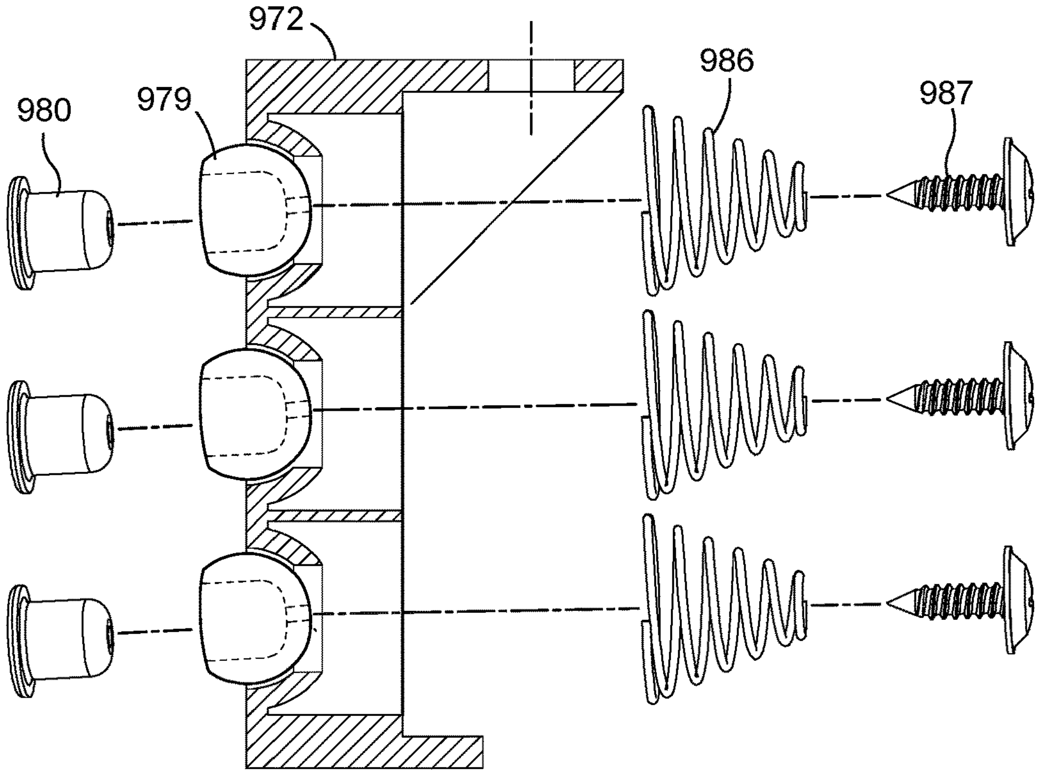

Other mounting configurations for the mounts 974 (relative to the sockets in the base 972 of the fractal jaw body 970). For example, as illustrated in FIG. 2E, a fastener 987 may be passed through a biasing element, such as a conical spring 986, and into engagement with the mount 974 (which holds the engaging member 980). The conical spring 986, which is located at the rear of the base 972, serves to bias the fastener 987, and thus the mount 974, into an aligned position. In another embodiment, the basing element comprises an elastomeric member (not shown) in place of the conical spring 986, or used in conjunction therewith.

Advantageously, the described configurations allow a user to remove and replace the mounts 974 and/or the engaging members 980, such as to service them. The user might associate different engaging members 980 with the mounts 974, such as which have different characteristics which are useful in engaging a workpiece (harder or softer rubber, different face features and shapes, etc.). It will also be appreciated that the fractal jaw body 970 may accommodate varying numbers (and sizes) of mounts 974. For example, a fractal jaw body 970 might include a first density of mounts 974 (such as a matrix of 4 rows and 9 columns of mounts) or a second density of mounts (such as a matrix of 3 rows and 7 columns of mounts). In less dense configurations, the sizes of the mounts 974 might be the same (whereby there is a greater spacing between them) or they might be larger.

Figure 3A:
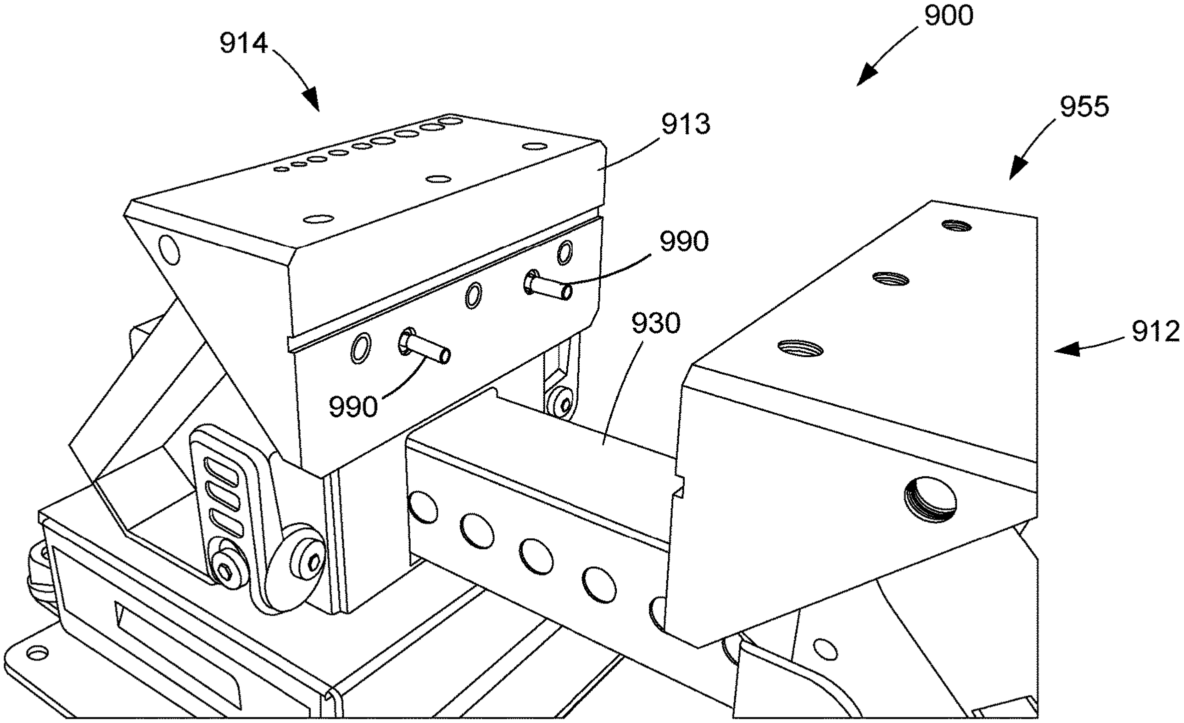
FIGS. 3A-3C illustrate aspects of a zero-point vise jaw feature in accordance with an embodiment of the invention.
Figure 3B:
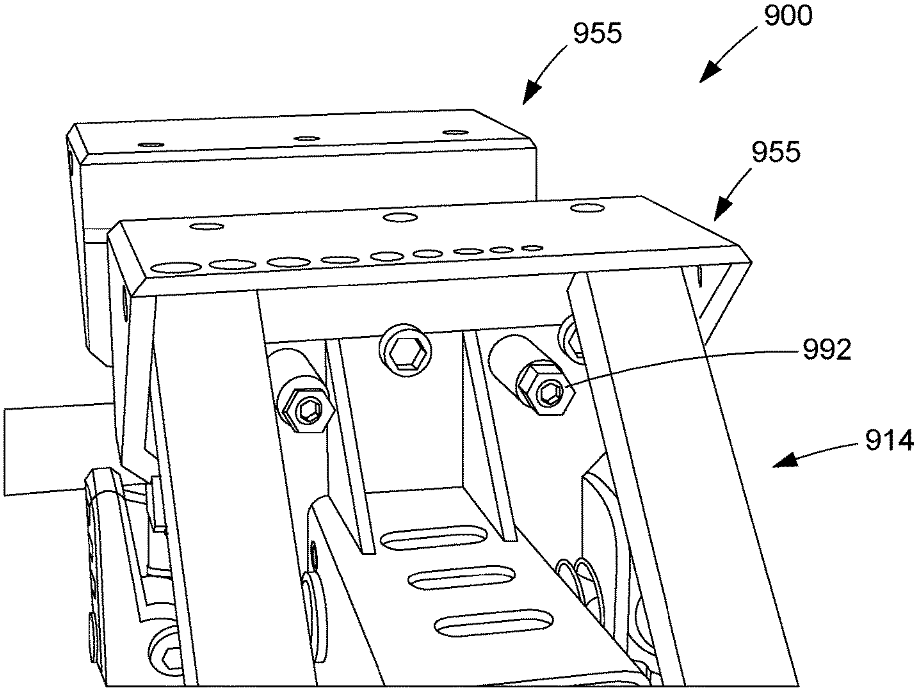

As illustrated in FIGS. 3A and B, one or more biased holding elements might be associated with the jaw body 955 of either or both the movable and stationary jaws 912,914. The biased holding elements might comprise spring loaded pins 990 which may be mounted into apertures defined by the jaw body 955. A spring (not shown), such as a coil spring, may be used to bias the pin 990 outwardly of one of the work surfaces 913 of the jaw body 955, such as to engage (e.g. help hold) a workpiece or other element. As illustrated in FIGS. 1A and 3B, the pins 990 might be extended through the jaw body 955 from the rear, such as where a housing portion 992 thereof (such as which contains the spring) is threaded into engagement with the jaw body 955 and the pin 990 then extends through the jaw body 955 and out the front thereof. In this manner, the biased holding elements may be selectively connected to the jaw body 955 and removed therefrom, such as when they are not needed. While two such pins 990 are illustrated, other numbers of pins (one or more than two) might be provided, including for mounting in different positions relative to the jaw body 955).

Figure 3C:
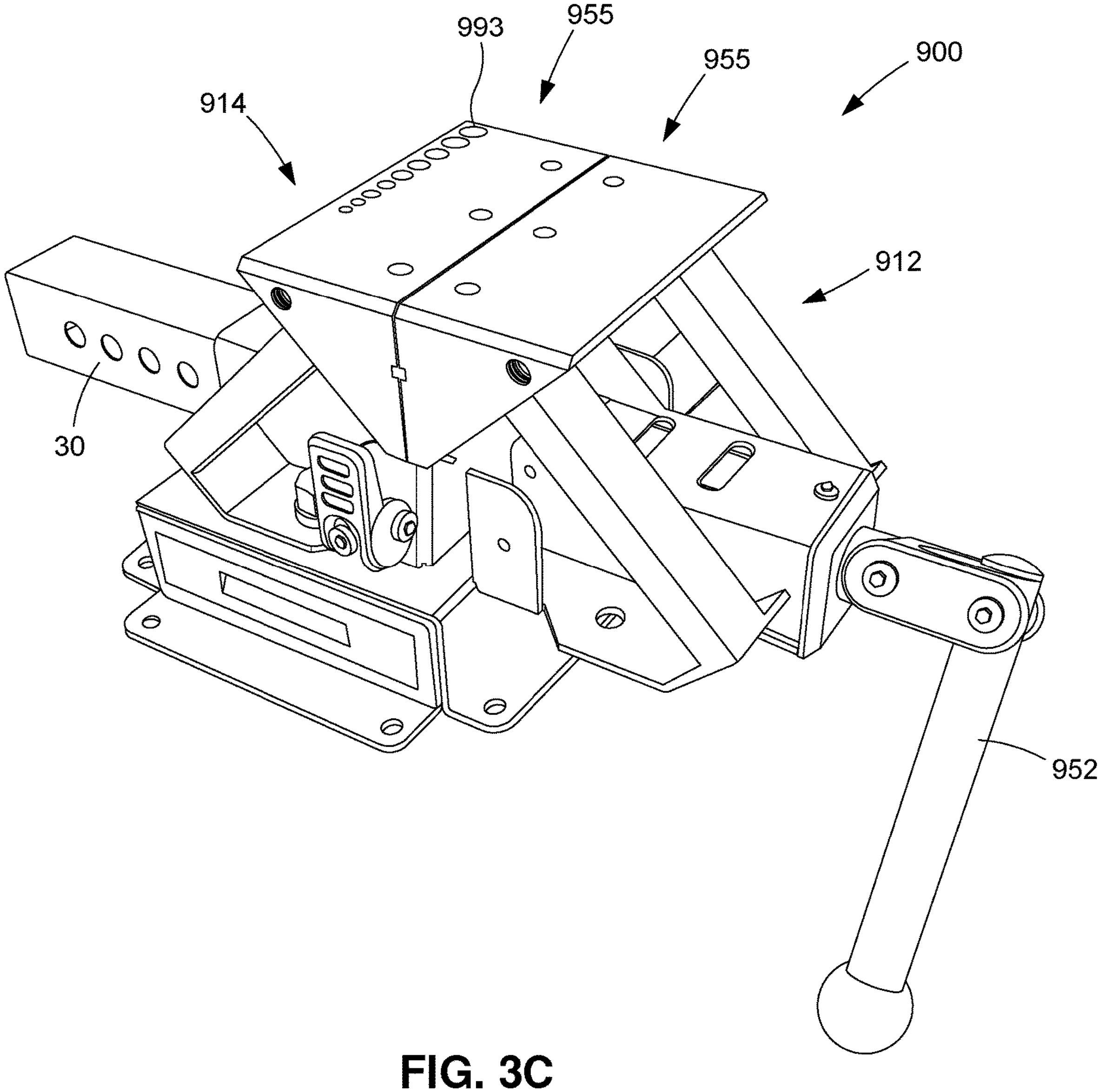

As illustrated in FIG. 3C, when the jaws 912, 914 are moved towards one another, the pins 990 preferably retract into the jaw bodies 955, thus allowing the working surfaces 913 of the jaw bodies 955 to abut/engage one another. The pins 990 may be used as a "third hand", allowing a user to preliminarily position a workpiece between the jaws 912, 914, via the biasing force of the pins 990 pushing against the workpiece. At the same time, the user may then turn the handle 952 to move the movable jaw 912 towards the stationary jaw 914 to create a clamping force that securely clamps the workpiece. As the movable jaw 912 moves, the pins 990 are pushed to their retracted position until the working surfaces 913 of the jaws themselves engage the workpiece.

As illustrated in FIGS. 1A and 3C, the jaw bodies 955 might define one or more guides 993. These guides 993 may comprise openings in the jaw body 955, such as the horizontal top surface thereof. Different sized guides 993 may be provided, such as to accept different sizes of fasteners (bolts, etc.), drill bits and other items.

In some embodiments, the jaw bodies 955 may include printed, etched or other formed markings. These markings may be provided in various positions, at various angles or the like, on the jaw bodies 955, such as for providing reference points when engaging a workpiece.

Figure 4A:
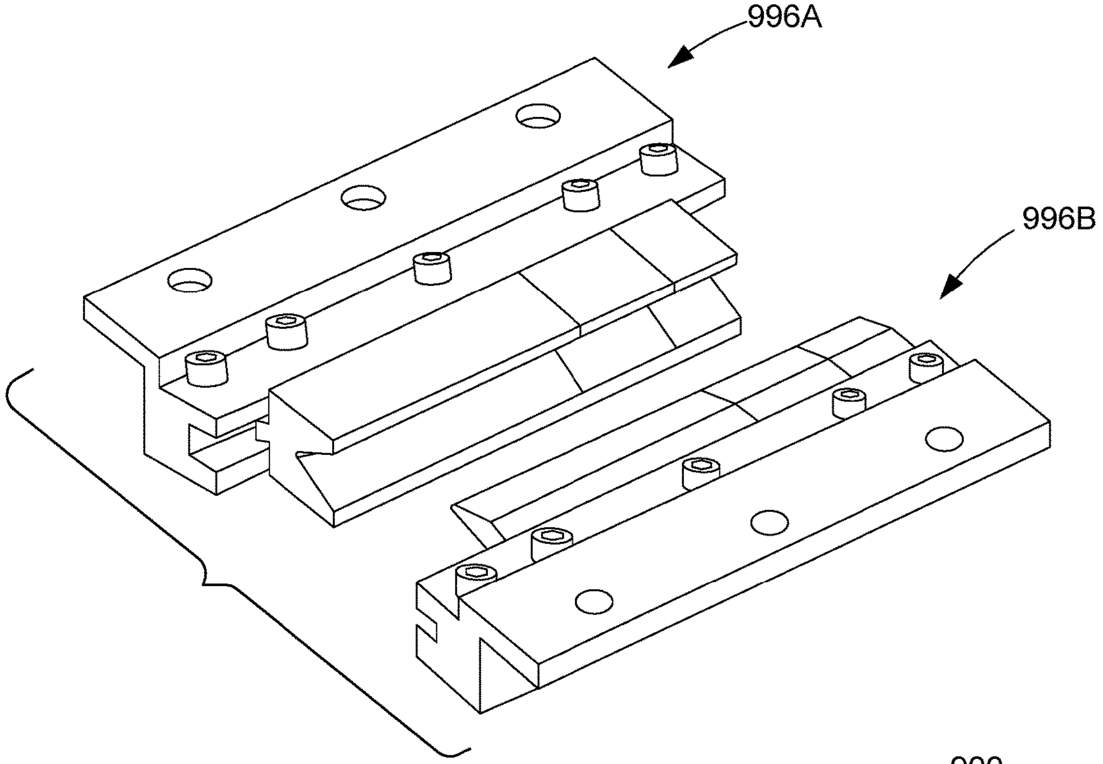
FIGS. 4A and 4B illustrate aspects of a bending die accessory for a vise in accordance with the present invention.
Figure 4B:
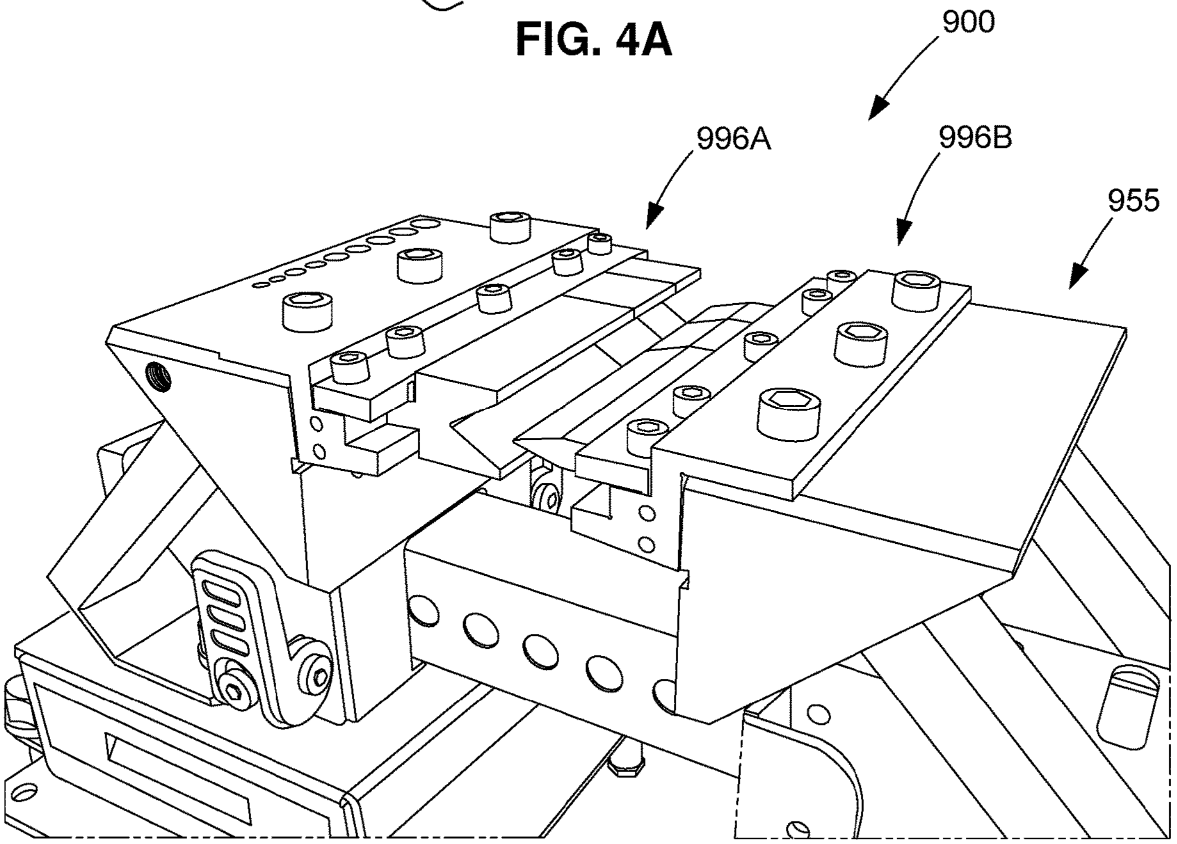

As another example, as illustrated in FIGS. 4A and 4B, working tools, such as bending dies 996A,B, may be mounted to the jaws 912, 914, such as to the jaw bodies 955 thereof. The bending dies 996A,B might have various configurations, such as a configuration in which one bending die 996A is mounted to the jaw body 955 of the stationary jaw 914 for engagement with another bending die 996B which is mounted to the jaw body 955 of the movable jaw 912, such as to engage a workpiece therebetween. Of course, in other embodiments, a bending die might be mounted to only one of the jaws.

The bending dies 996A,B might be mounted to the jaw bodies 955 in various manners. Preferably, they may be mounted by threaded fasteners, such as which pass through a body of the bending die 996A,B and into the vertical and horizontal working surfaces 913 of the jaw bodies 955.

Figure 5:
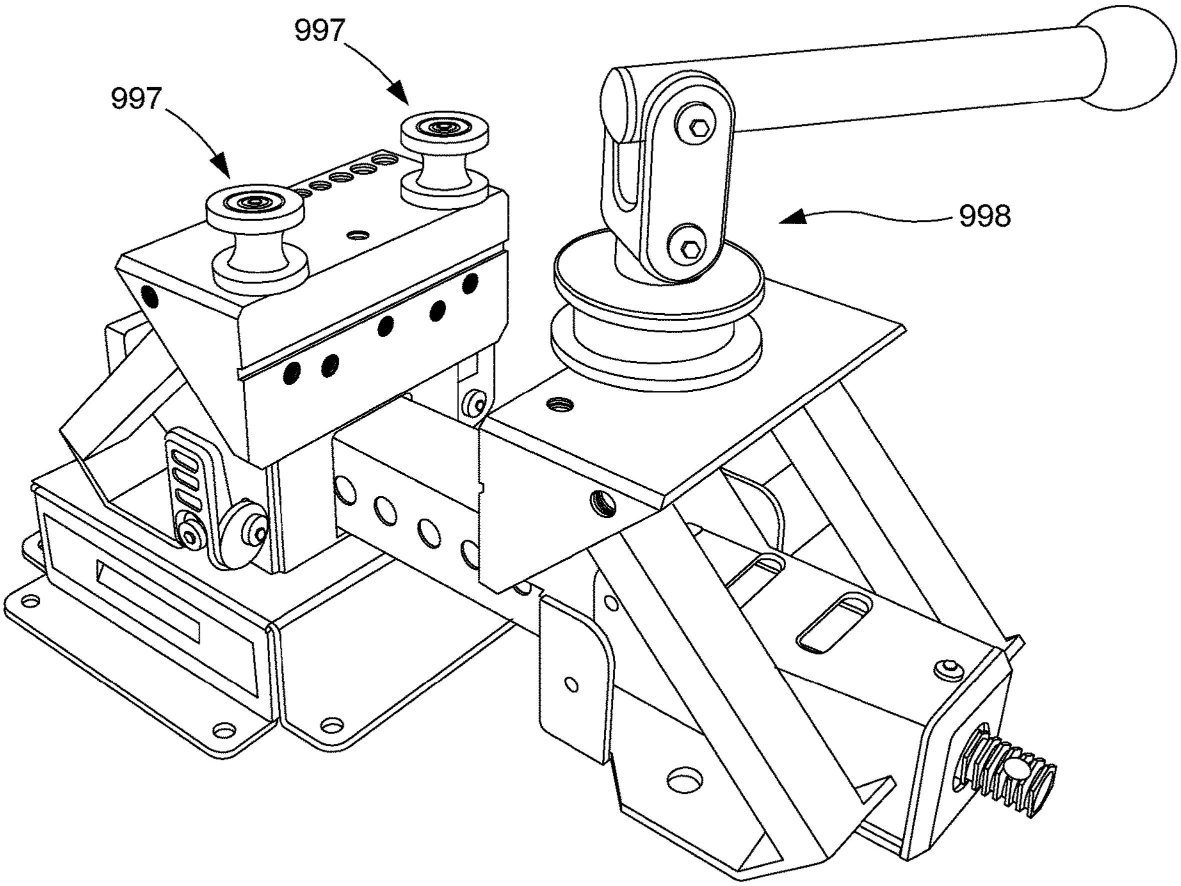
FIG. 5 illustrates aspects of use of roll forming accessories with jaws of a vise in accordance with the present invention.

As another example, as illustrated in FIG. 5, roll forming dies may be associated with one or both of the jaw bodies 955, such as using mounts defined thereby. For example, as illustrated, at least one primary die 998, such as which may be turned by a handle, may be rotatably connected to one of the jaw bodies 955, such as via a threaded fastener (on which the die rotates). Likewise, one or more secondary dies 997 may be mounted to one or both jaw bodies 955. Again, these secondary dies 997 may be rotatably mounted to the jaw body.

As illustrated, aside from primary vertical and horizontal working surfaces 913, the jaw bodies 955 may define another surfaces, such as side surfaces. Mounts or mounting locations may be defined relative to any or all of these different surfaces, such as to permit the associating of secondary features or accessories (and removal thereof) in various combinations and in various locations of the jaw bodies 955.

The vise 900 may have other features. For example, the vise 900 may include a through-hole on the bottom of the saddle 930 that allows debris to fall through the vise versus getting caught up in the saddle/slide and screw 950, as is the case with prior art vises. The hole might comprise one or more openings or a slot in the bottom of the saddle 930. For example, as described in more detail below, in some embodiments, the saddle may be constructed from sheet metal which is bent, whereby opposing sides of the sheet metal member which is used to form the saddle form opposing sides of a slot that runs along a bottom of the saddle.

The square shape of the vise base 915 (see FIG. 1A) allows a more stable footprint when bolted or clamped to a tabletop. The base 915 has a greater number of mounting points for more stability. The mounting holes of the base 915 (such as in the flange(s) 917) may be at two inches on center to allow it mount to a welding table or work hench that normally has holes in it that are in two-inch increments.

In one embodiment, there is a series of openings or apertures perforations 920 in either or both of the slide 919 and base 918, such as in a top thereof, which allow a visual reference for the current location of the saddle 930 and associated screw 950.

As indicated above, one aspect of the invention is the construction of a vise from sheet metal rather than by casting. While this has been described above relative to a fabrication vise 900, the sheet metal construction may be applied to a wide range of other configurations of vises, such as described below. As also described below, these vises may have other advantageous features which may be applied to other types of vises.

For example, FIGS. 6A-I illustrate a trailer vise 1000 in accordance with an embodiment of the invention. As indicated above, the fabrication vise 900 might be configured to be mounted to a trailer hitch receiver or similar mount, such as via an extension 960. However, when used primarily in that application, the fabrication vise 900 includes unnecessary elements, such as the base 915 which simply adds weight and cost to the vise.

FIGS. 6A-I thus illustrate a trailer vise 1000 which is particularly designed for mounting to a trailer hitch receiver or similar mount (for example, a similar receiver style mount that might be mounted to a workbench or the like).

This embodiment vise 1000 is similar to the fabrication vise 900 described above, such as including a first or movable jaw 1012 and a secondary jaw 1014. The movable jaw 1012 may again comprise a body 1018 and have a jaw body 1055 connected thereto, such as via one or more braces or struts 1026. Likewise, the secondary jaw 1014 may again comprise a slide 1019 for accepting a saddle 1030, and may include a jaw body 1055 which is connected to the slide 1019, such as via one or more braces or struts 1026.

Preferably, the position of the secondary jaw 1014 is again selectively fixable relative to the saddle 1030, such as via one or more locks 1032 which engage mating apertures 1031 in the saddle 1030.

Figure 6H:
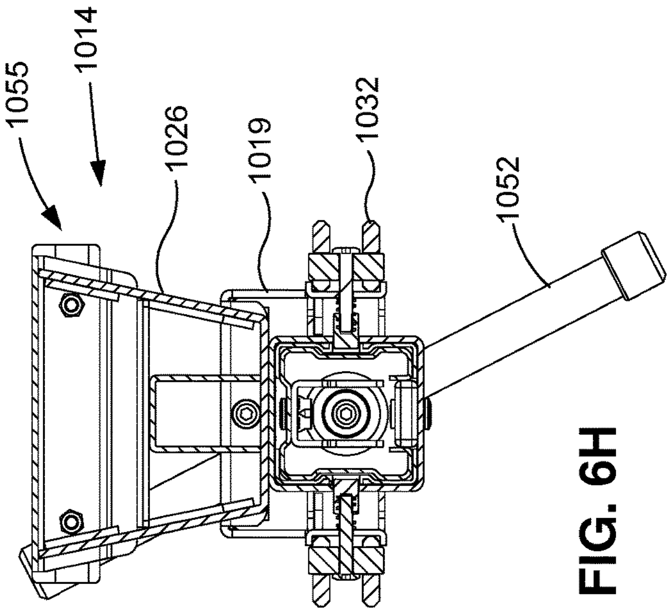
Figure 6I:
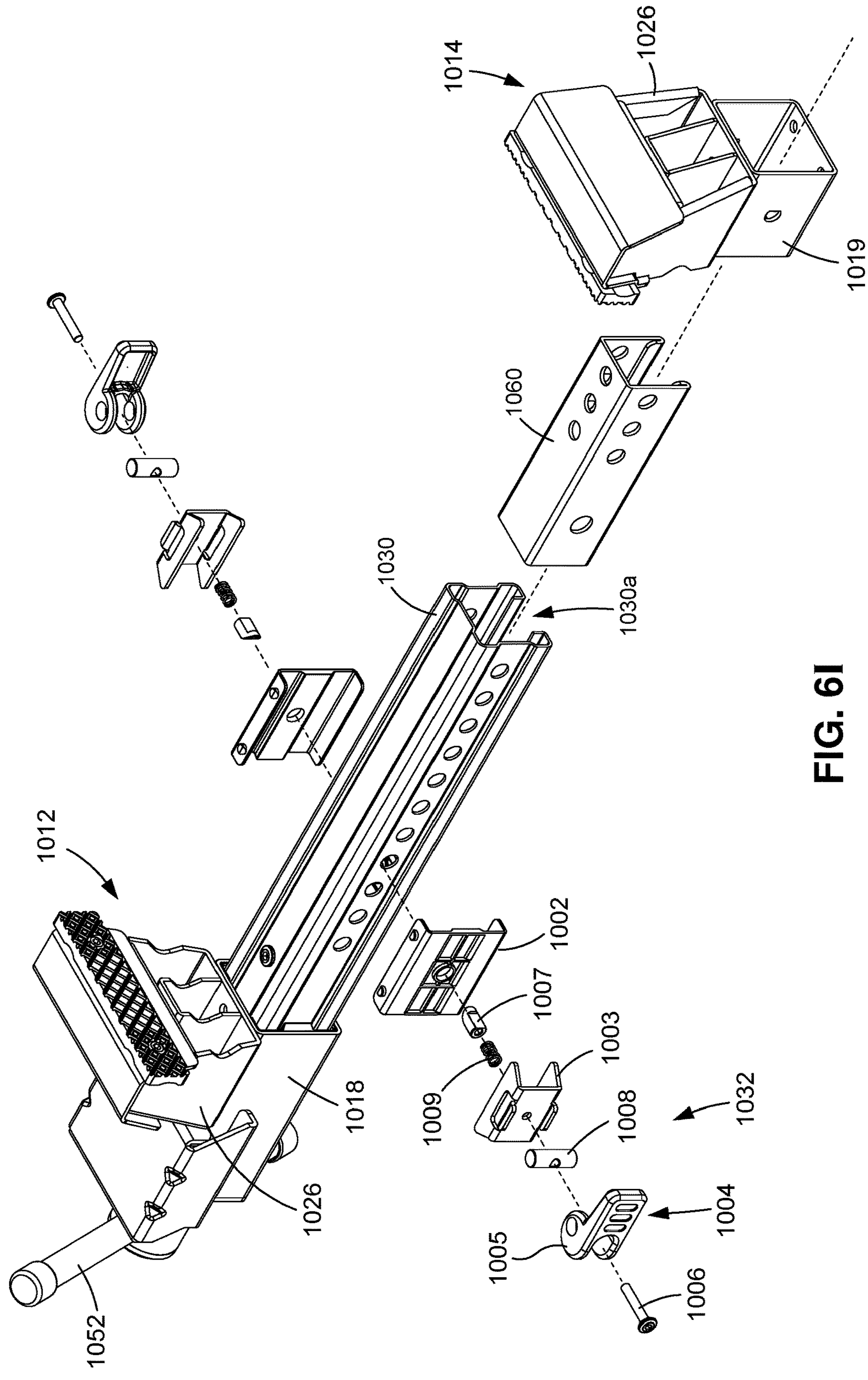

As best illustrated in FIG. 6H, the movable jaw 1012 may be movable relative to the saddle 1030, such as via a threaded shaft 1050. Once again, a first end of the threaded shaft 1050 might be rotatably supported by a cap 1051 which is located at an end of the saddle 1030, and may engage a spindle nut 1054 which is associated with the movable jaw 1012. Rotation of a handle 1052 which is connected to the shaft 1050, such as via a connector 1053, effectuates rotation of the shaft 1050, which in turn causes the movable jaw 1012 to move along the saddle. In this configuration, gross adjustment of the positions of the jaws 1012, 1014 may be made by moving the secondary jaw 1014 by releasing the locks 1032 and moving and relocking that jaw 1014, and then fine adjustment of the jaws may be made by turning the handle 1052 to move the movable jaw 1012 along the saddle 1030.

An opposing end of the saddle 1030 may be configured to be received in a trailer hitch receiver. This may be permitted via the configuration of the end of the saddle 1030 itself, or via an extension 1060 which is connected to the saddle 1030 and extends therefrom. The extension 1060 might be formed as part of the saddle 1030, be connected thereto (such as adjustably connected via a pin and hole configuration which permits the length of the extension to change), or be permanently connected thereto.

As with the fabrication vise 900, the trailer vise 1000, including the components thereof, are preferably substantially constructed from sheet metal. As indicated, the jaws 1012, 1014 may be constructed from sheet metal which is cut, bent or otherwise fabricated. Again, struts 1016, 1026 comprising sheet metal elements, may be used to support the jaw bodies 1055, instead of the jaws being cast as a single large and heavy body. The saddle 1030 may be constructed from sheet member (such as formed into a "U"-shape) or from tubing, as may the handle 1052. As illustrated, the extension 1060 might be constructed from sheet metal which is bent into a "U" shape. As a result, this vise 1000 has many of the same advantages of the fabrication vise 900, including being cheaper and easier to fabricate, with closer tolerances, and being much lighter than a similar cast-component vise.

FIG. 6I provides more details of the mount or lock 1032 for the secondary jaw 1014. As illustrated, the mount 1032 may comprise a base 1002, a bracket 1003, a handle 1004 having a cam surface 1005, a pin 1006, an engaging head 1007, and a connector 1008. In one embodiment, the base 1002 comprises a nylon (or other high molecular weight polyamide having similar characteristics) bushing which is connected to the slide 1019 (such as with fasteners) in a location where it is positioned between the slide 1019 and one of the sides of the saddle 1030, thus serving to aid in smooth relative movement of the slide 1019 and saddle 1030 (in other embodiments, the base 1002 might comprise a plate or other element, such as which has bushing elements, rollers or similar means for facilitating smooth relative movement between the slide and saddle, mounted to that plate).

The bracket 1003 may be generally "U"-shaped, such as having one or more leg portions, and is mounted to the outside of the slide 1019 so that, when so positioned, a support surface is set outwardly therefrom. The handle 1004 is mounted for rotation around the connector 1008. The pin 1006 preferably passes through the connector 1008 and the bracket 1003, and threads into engagement with the head 1007, which is configured to pass through an opening in the slide 1019 and the base 1002 and, when aligned, one of the apertures 1031 in the saddle 1030. As indicated above, the pin is preferably biased, such as by a spring 1009 which is mounted between the head 1007 and the bracket 1003.

When the handle 1004 is in the position illustrated in FIG. 6I, the head 1007 of the pin is preferably biased towards the saddle 1030 and, when aligned with an aperture 1031 therein, extends into the saddle 1030 to prevent relative movement between the saddle 1031 and the stationary jaw 1014. On the other hand, when the handle 1032 is rotated 90 degrees, the cam surface 1005 (which extends outwardly from the pivot point of the handle 1032 farther than the portion 90 degrees thereto) engages the engaging surface of the bracket 1003, and pulls the pin outwardly, thus disengaging it from the saddle 1030.

In one embodiment, the vise 1000 may include an anvil 1099. For example, as illustrated in FIG. 6A, an anvil 1099 may be associated with the housing 1018 of the stationary jaw 1014. The anvil 1099 may define a planar working surface and may, again, be constructed from sheet metal which is cut and bent and then connected to the movable jaw 1012. The anvil 1099 may define an oversized working surface, such as by extending beyond the sides and rear of the housing 1018 of the movable jaw.

Of course, features of the fabrication vise 900 might be utilized with the trailer vise 1000, such as jaw bodies 1055 which include accessory mounts or mounting points and the like.

Another embodiment of the invention will be described with reference to FIGS. 7A-K. This embodiment vise may be referred to as a swivel vise 1100. Once again, this vise 1100 may have features common to the vises described above, such as preferably having primarily a sheet metal construction rather than a cast-component construction.

This embodiment vise 1100 again has first and second jaws 1112, 1114, where one of the jaws 1114 is stationary (and in this case, cannot be moved relative to a saddle 1130) and where the other jaw 1112 is movable.

In this configuration, the movable jaw 1112 may include a body 1118 which is mounted to the saddle 1130, such as at one end thereof, preferably in a fixed position. On the other hand, the stationary jaw 1114 includes a slide 1119 that accepts the saddle 1130 through a passage thereof, thus allowing the saddle 1130, with the movable jaw 1112 connected thereto, to move towards and away from the stationary jaw 1114.

Figure 7A:
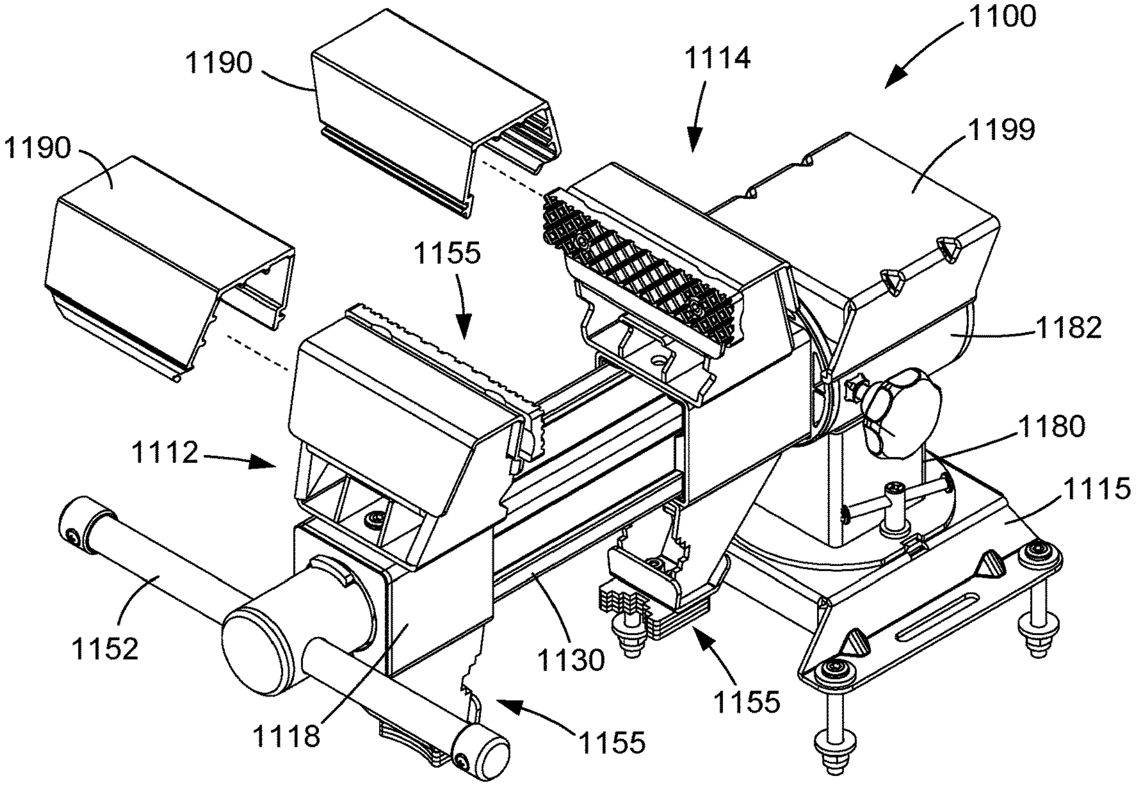
FIGS. 7A-7L are views of a swivel vise in accordance with an embodiment of the invention.
Figure 7B:
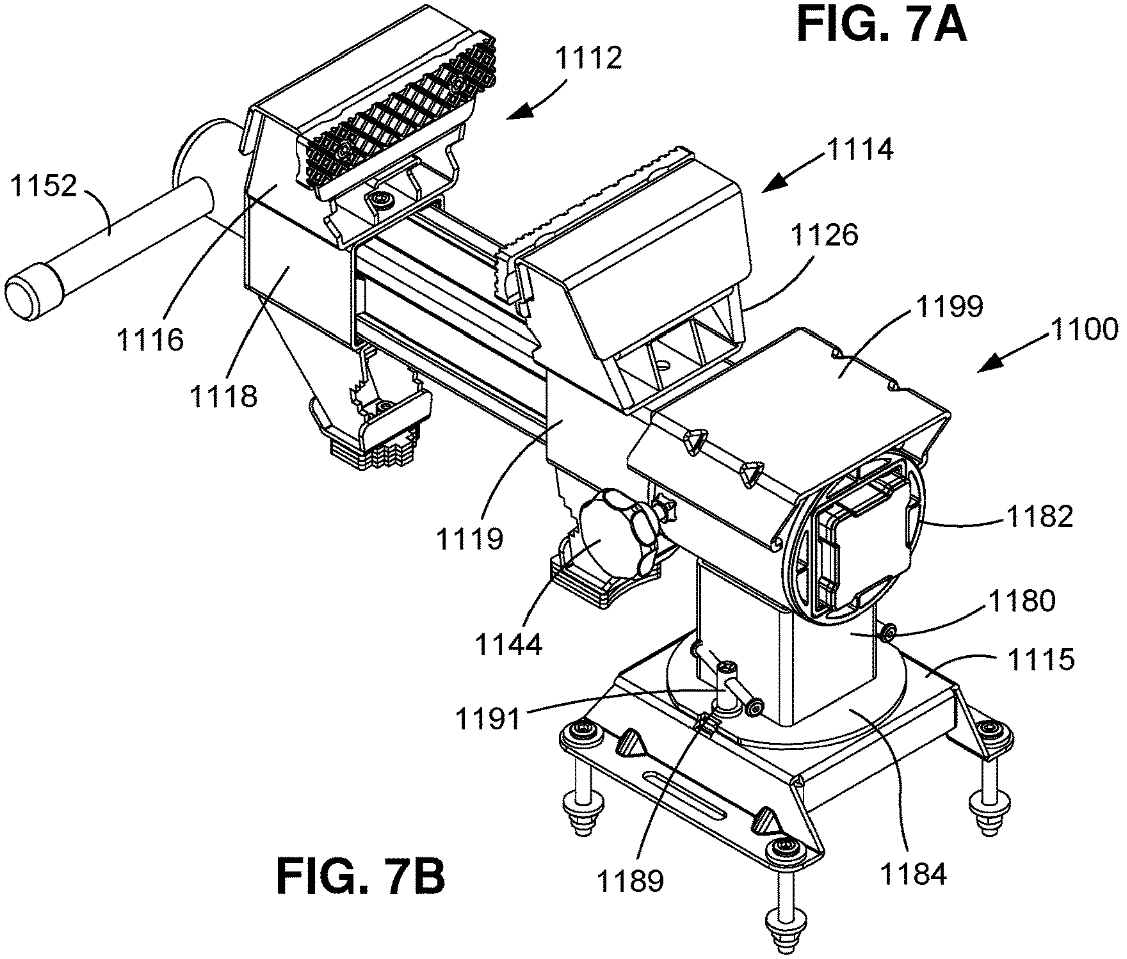
Figure 7C:
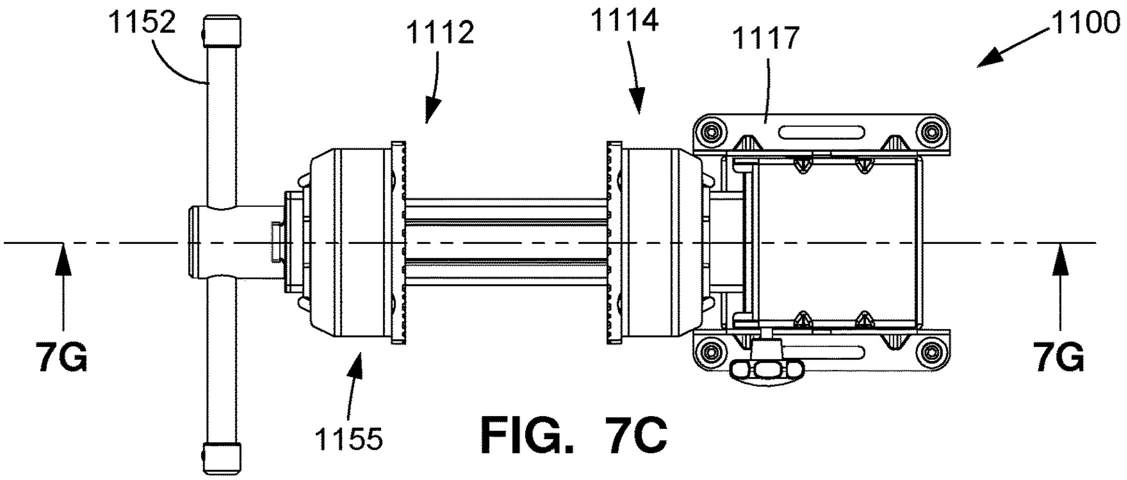
Figure 7D:
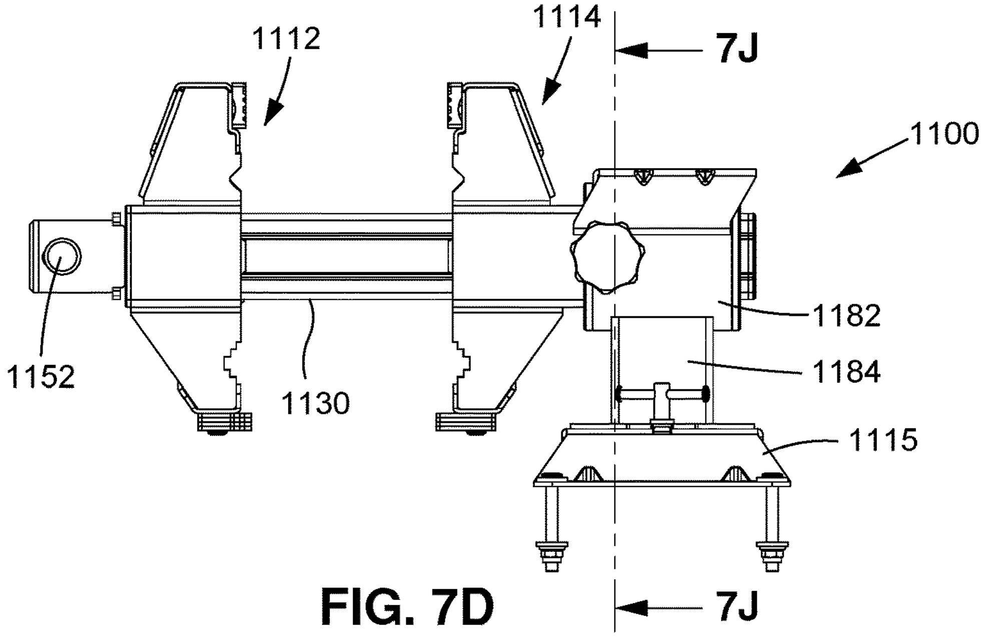
Figure 7E:
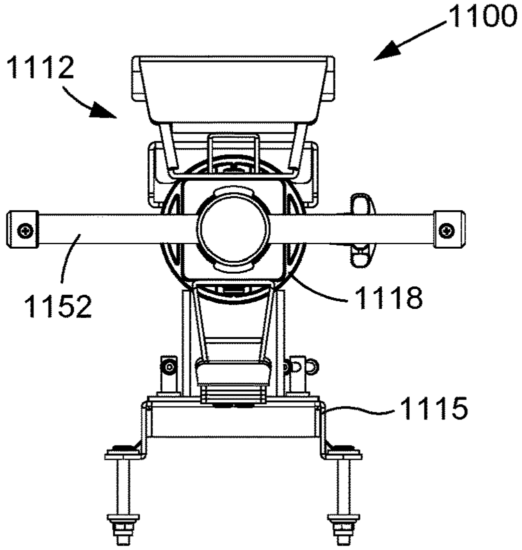
Figure 7F:
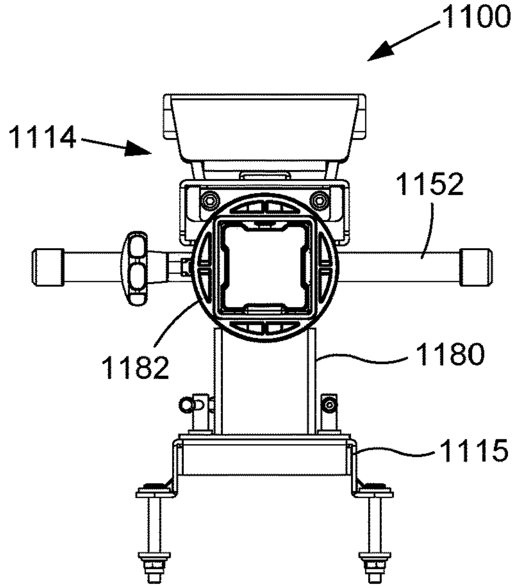
Figure 7G:
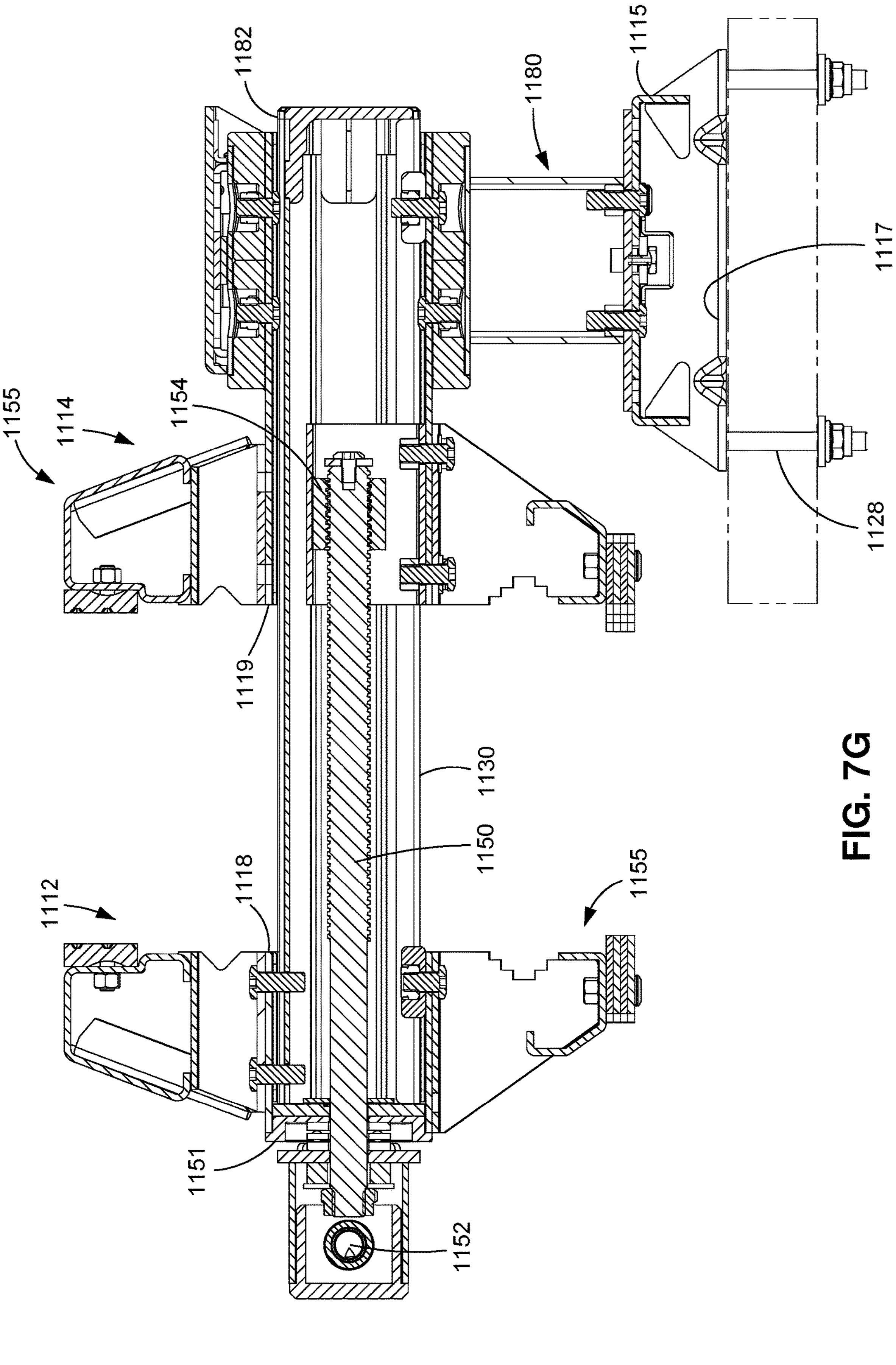

Referring to FIG. 7G, in one embodiment, a threaded screw 1150 is again located in the saddle 1130 and has a first end that is supported for rotation, such as via a cap 1151, and may be rotated by a handle 1152. The second end of the threaded screw 1050 is located in the saddle 1130. The stationary jaw 1114 is connected to the screw 1150 via a spindle nut 1154. In this configuration, turning of the handle 1152 causes the threaded screw 1150 to turn, which causes the position of the moving jaw 1112 to change (back and forth) as the saddle 1130 moves back and forth along the slide 1119 of the stationary jaw 1114.

As with prior embodiment vises, the jaws 1112, 1114 preferably include at least one jaw body 1155 which may be formed from sheet steel and which may be connected to the body 1118 or slide 1119 via one or more struts 1116, 1126. As illustrated, a jaw body 1155 might be located at the top and bottom of the jaw, and those jaw bodies 1155 might have the same configuration or a different configuration, such as defining different working surfaces. Again, the jaw bodies 1155 might include various base or mounting elements, such as for accepting various accessories and the like.

In this configuration, the second end of the saddle 1130 (opposite the handle 1152) might be mounted to a trailer hitch receiver or similar mount, or be mounted to various other mounts. In a preferred configuration, however, the vise 1100 is configured for rotational movement. As such, in one configuration, the second end of the saddle 1130 is mounted to a riser 1180. A first end of the riser 1180 may be connected to a mount 1115, such as which may have a similar construction to the mount 915 described above, such as including flanges 917 for accepting fasteners 928 for connecting the vise 1100 to a support or work surface, such as a workbench.

Figure 7H:
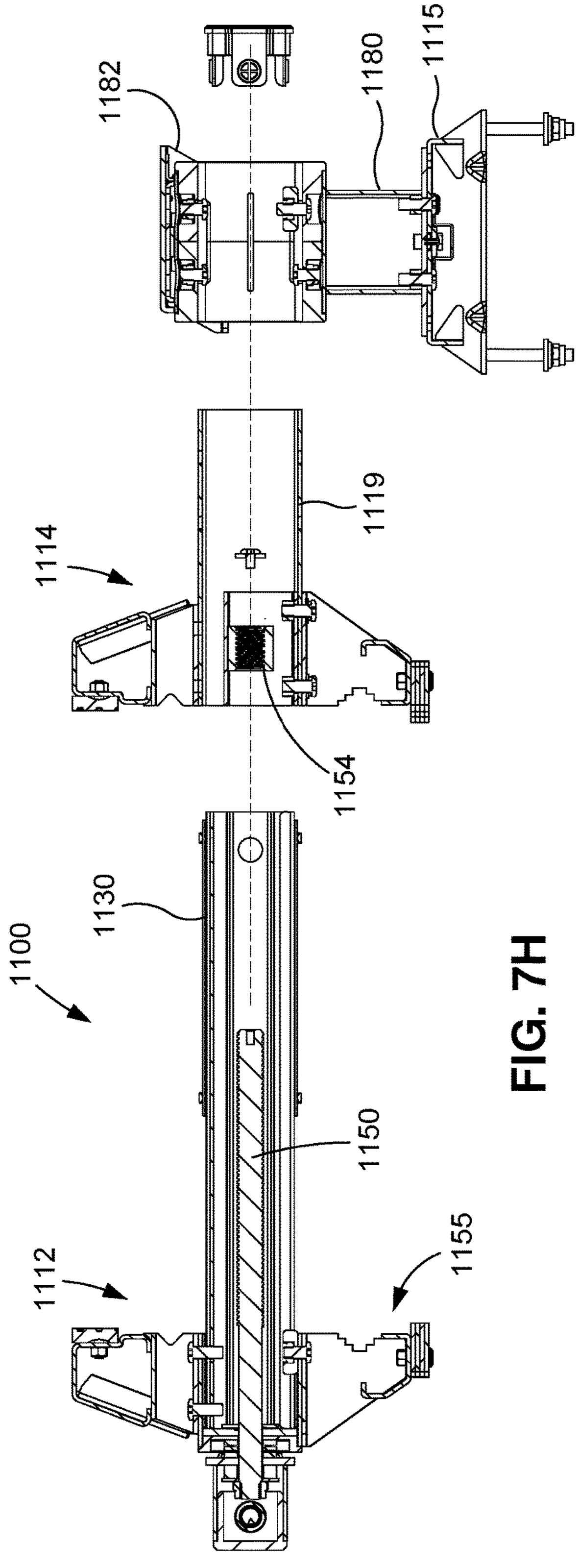
Figure 7I:
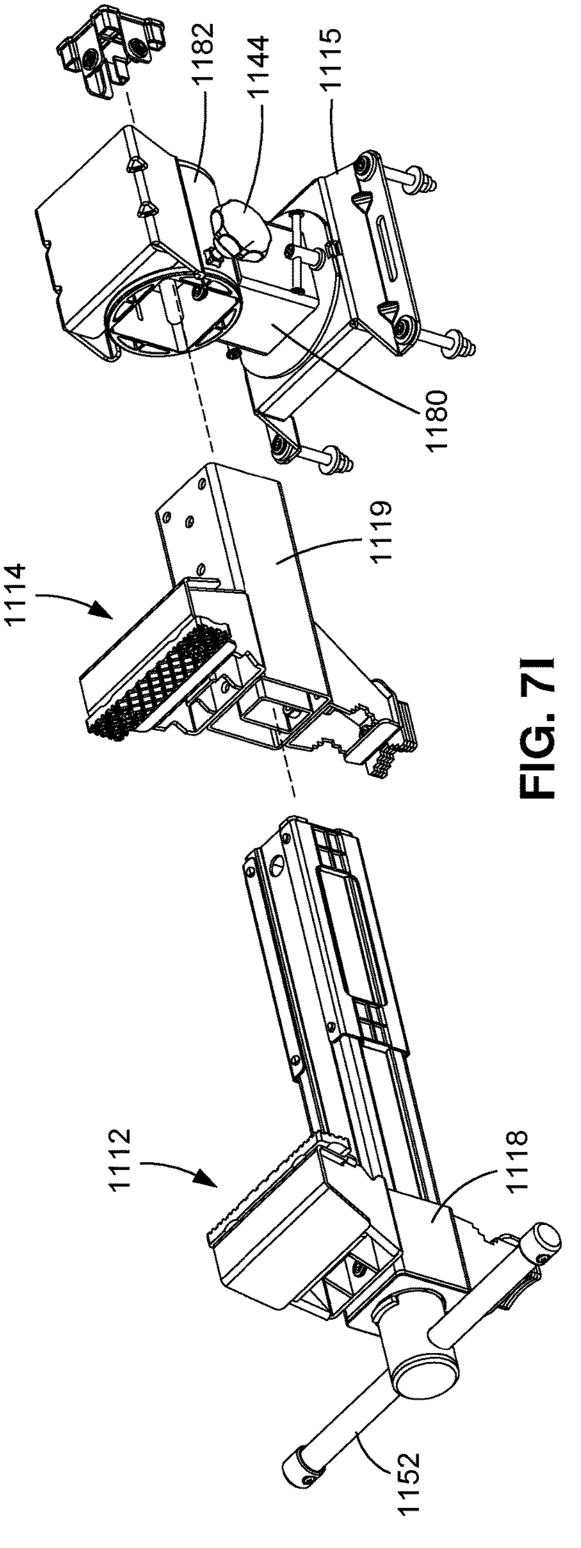
Figure 7J:
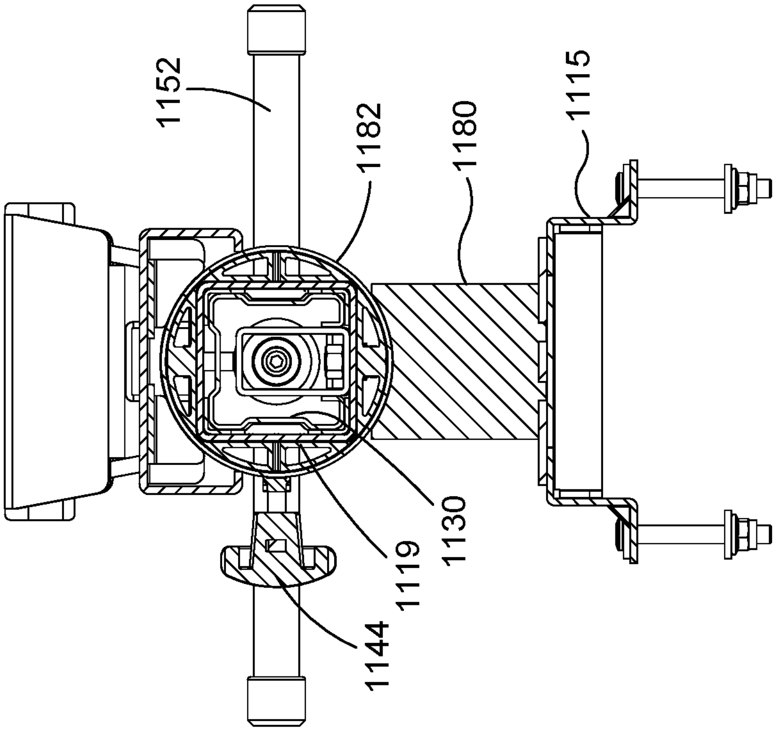
Figure 7K:
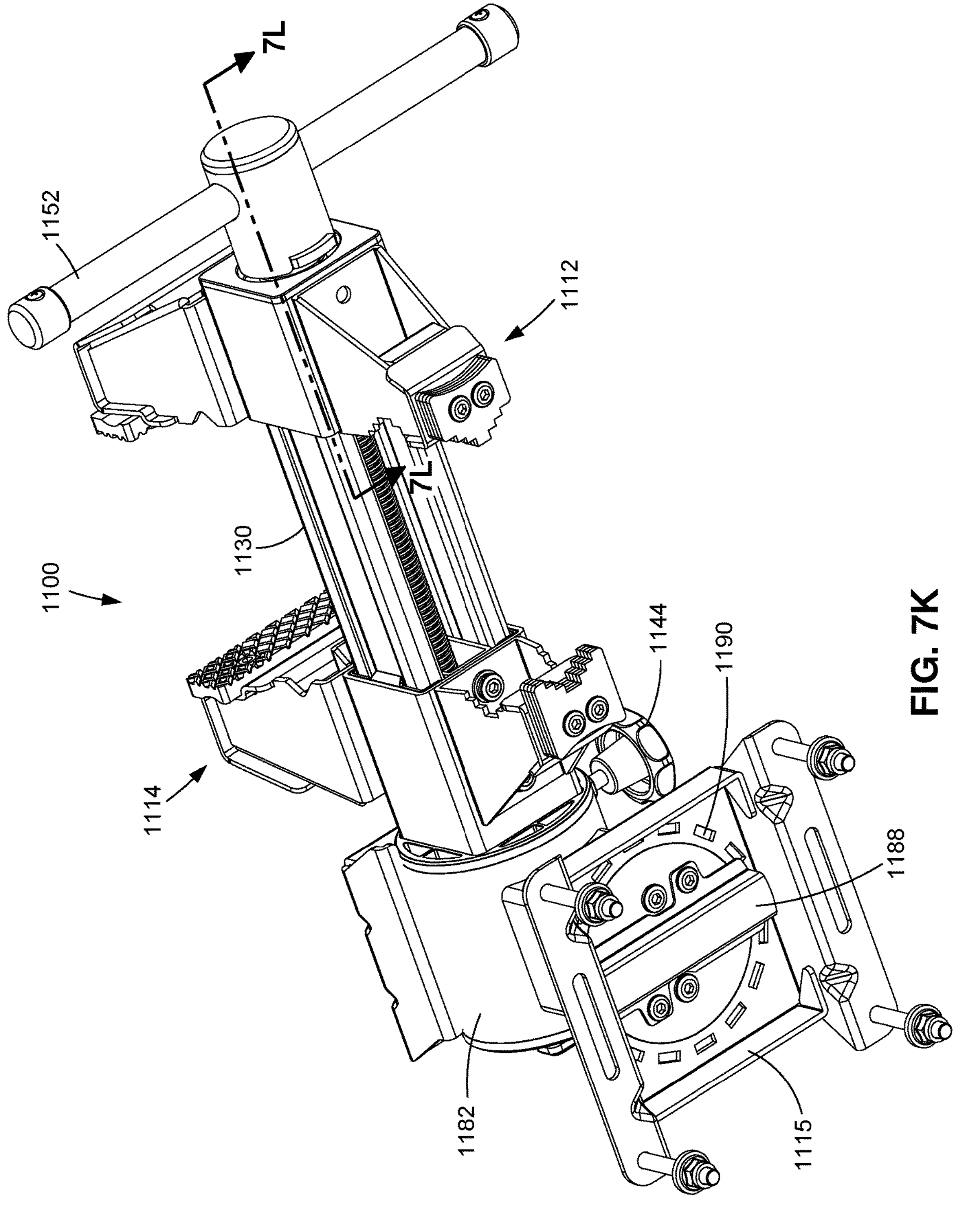

Referring to FIGS. 7H-J, in one embodiment, the second end of the saddle 1130 extends through the slide 1119 of the stationary jaw 1114. The saddle 1130 preferably extends outwardly thereof and into a passage defined by the housing 1182. In one configuration, the stationary jaw 1114 (and saddle 1130 and movable jaw 1112 connected thereto) can be removed by sliding it out of the housing 1182. When the stationary jaw 1114 and associated assembly is located in the housing 1182, a locking handle 1144 may be provided which can be threaded through the housing 1182 and into an out of engagement with the slide 1119 to lock it to or unlock it from the housing 1182.

Most importantly, in a preferred configuration, the position of the vise 1100 is rotationally adjustable. In one embodiment, referring to FIGS. 7A and K, the first or bottom end of the riser 1180 may include, or be connected to a plate 1184. The plate 1184 may be rotatably positioned on a top portion of the base 1115, which define one or more tab accepting slots or openings 1190.

A means is preferably provided for selectively locking the position of the plate 1184 (and thus the workpiece holding portion of the vise 1100) to the base 1115. In one embodiment, this means comprises a locking bar (not visible) which is connected to the plate 1184 and is located under the top surface of the base 1115. The locking bar preferably includes one or more upwardly extending tabs 1189 (such as at opposing ends thereof) which may protrude through the slots or openings 1190 formed in the base 1115. In one embodiment, a cover 1188 is located over the locking bar and the associated springs. The cover 1188 is preferably connected to the bottom side of the plate 1184 and effectively captures the locking bar and springs therein, and allows the locking bar to move towards and away from the plate 1184.

In one embodiment, the locking bar is biased downwardly or away from the base 1115, such as by one or more springs. One or more locking pins 1191 which are accessible at the top of the base 1115 thread into or otherwise engage the locking bar. When the locking pins 1191 are loosened, the locking bar (not visible) preferably moves downwardly so that the one or more locking tabs 1189 thereon move out of engagement with the slot(s) 1190 in the base 1115, such as biased by the one or more springs. At that time, the riser 1180, and thus the entire vise (except for the base) may be rotated relative to the base. Once the locking tabs 1189 of the locking bar are aligned with other slots 1190 in the base 1215, the locking pins 1191 may be tightened to move (pull upwardly) the locking tabs 1189 into engagement with the base 1115, locking the vise in a new rotationally fixed position. In one embodiment, as illustrated, a number of slots 1190 may be formed in the base 1115, such as spaced about a 360 circumference of an opening in the base 1115, thus permitting the vise to be positioned in a wide range of rotational positions.

Of course, other means may be provided for rotatably mounting the vise, including in relation to a base, such as to one or more fixed positions.

Of course, the vise 1100 might have other configurations and other features. For example, as illustrated in FIG. 7A, jaw covers 1190 may be provided. The jaw covers 1190 may be selectively located over the jaw bodies 1155 (such as designed to fit over the jaw bodies at the top and/or bottom of either or both jaw). The jaw covers 1190 may be constructed from an extrusion which is then cut to size or roll formed/formed using a breakpress. The jaw covers 1190 are replaceable, thus allowing a user to place them over jaws of the vise, such as to prevent damage thereto, and when the jaw covers 1190 are damaged, they may be thrown away and replaced. The jaw covers 1190 may have different features, including being constructed from plastic or a similar material (including brass or aluminum, or other materials that are generally softer than the steel jaws).

In one embodiment, the vise 1100 may include an anvil 1199. For example, as illustrated in FIG. 7B, an anvil 1199 may be associated with the housing 1182. The anvil 1199 may define a planar working surface and may, again, be constructed from sheet metal which is cut and bent and then connected to the housing 1182. The anvil 1199 may define an oversized working surface, such as by extending beyond the sides and rear of the housing.

Of course, features of the vises described herein might be utilized with the vise 1100, such as jaw bodies 1155 which include accessory mounts or mounting points and the like.

Yet another vise will be described with reference to FIGS. 8A-H. This vise 1200 is similar to the swivel vise 1100 described above. Once again, this vise 1200 may have features common to the vises described above, such as preferably having primarily a sheet metal construction rather than cast-component construction.

As illustrated, in this embodiment, a movable jaw 1212 is again mounted to a saddle 1230, such as at a first end thereof. The movable jaw 1212 may have a housing 1218 that is mounted to the saddle 1230 and which supports a jaw body 1255, such as by one or more struts or supports 1216.

The stationary or secondary jaw 1214 may again comprise a slide 1219 which his configured to accept the saddle 1230 and which supports a jaw body 1255, such a via one or more struts or supports 1226.

Figure 8A:
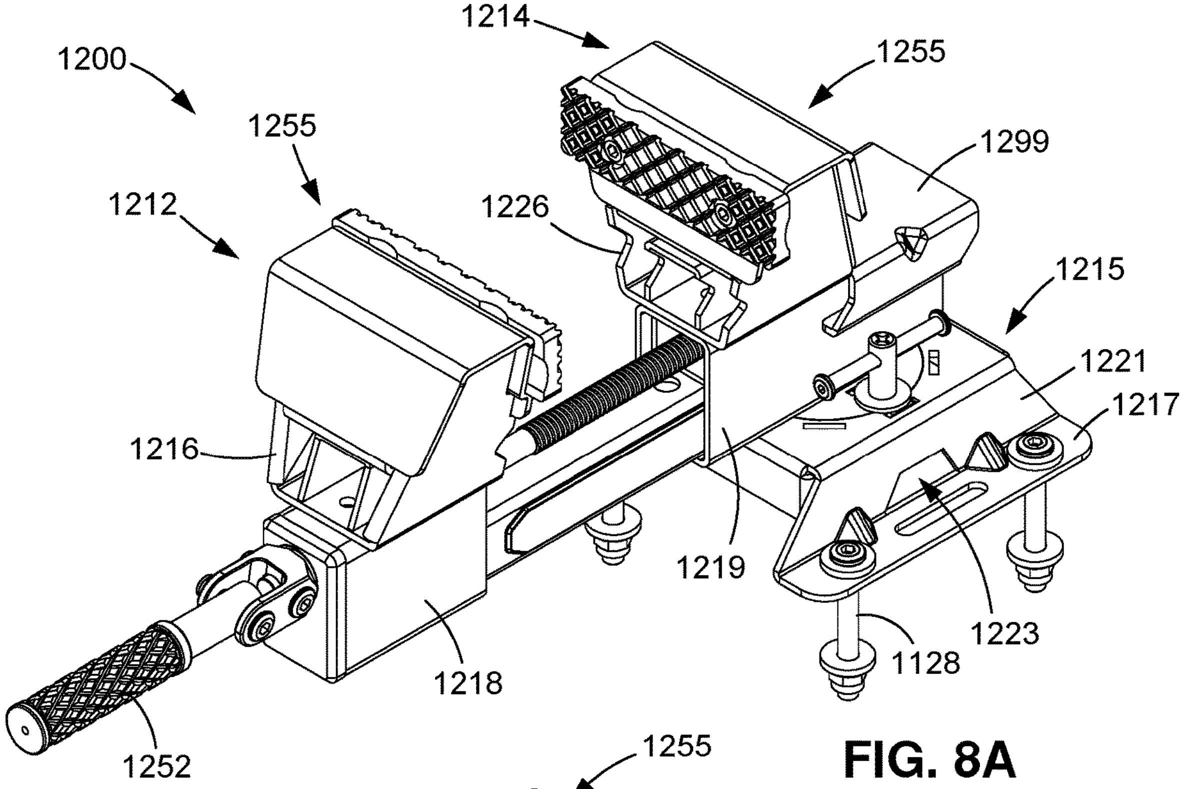
FIGS. 8A-8H are views of another vise in accordance with an embodiment of the invention.
Figure 8B:
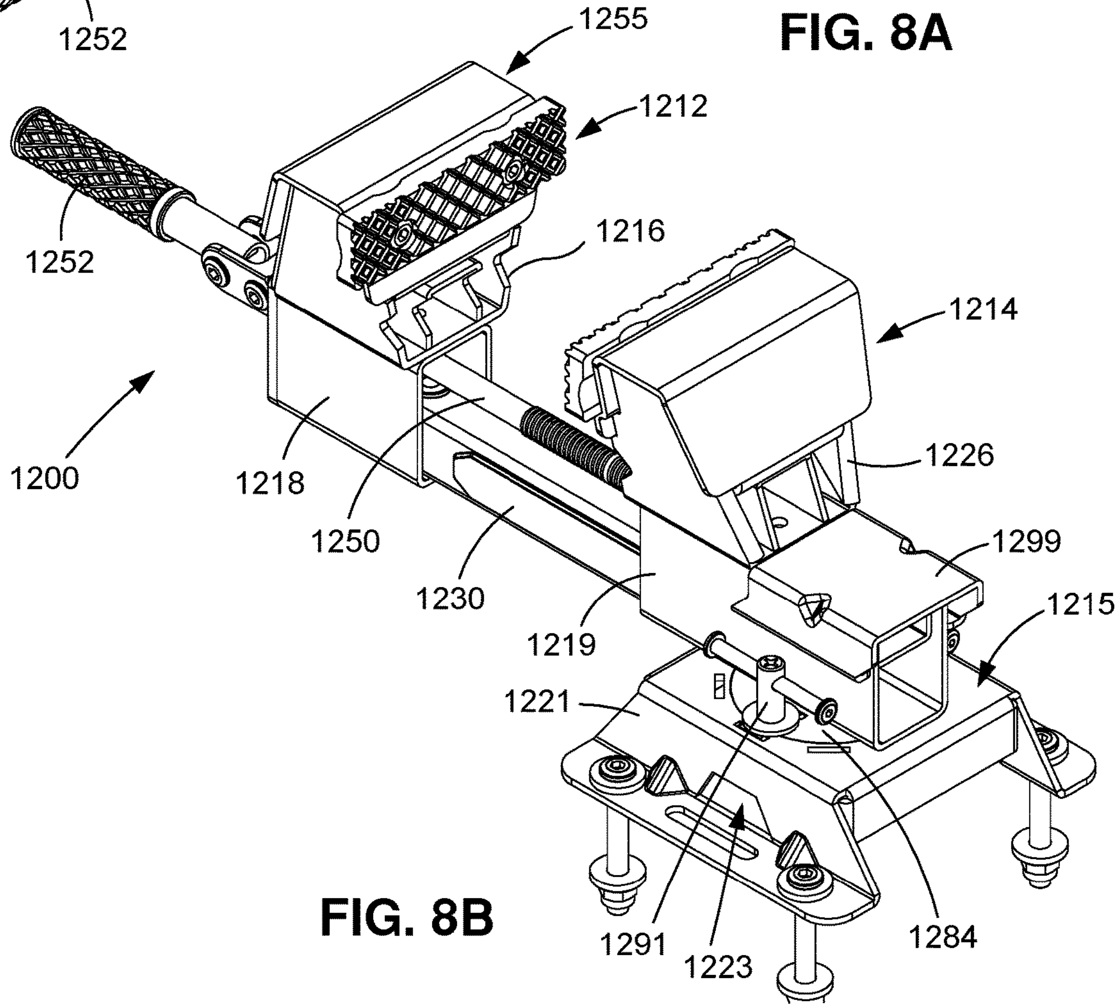
Figure 8C:
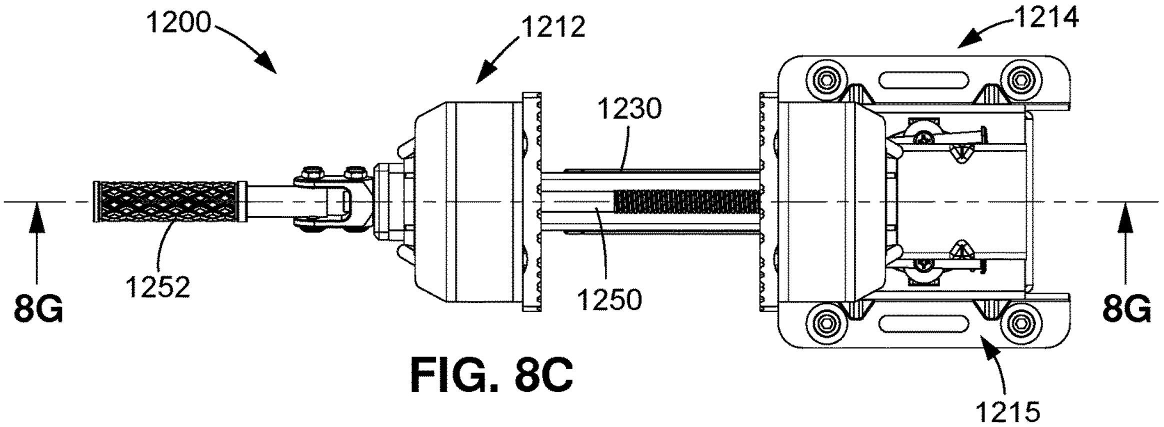
Figure 8D:
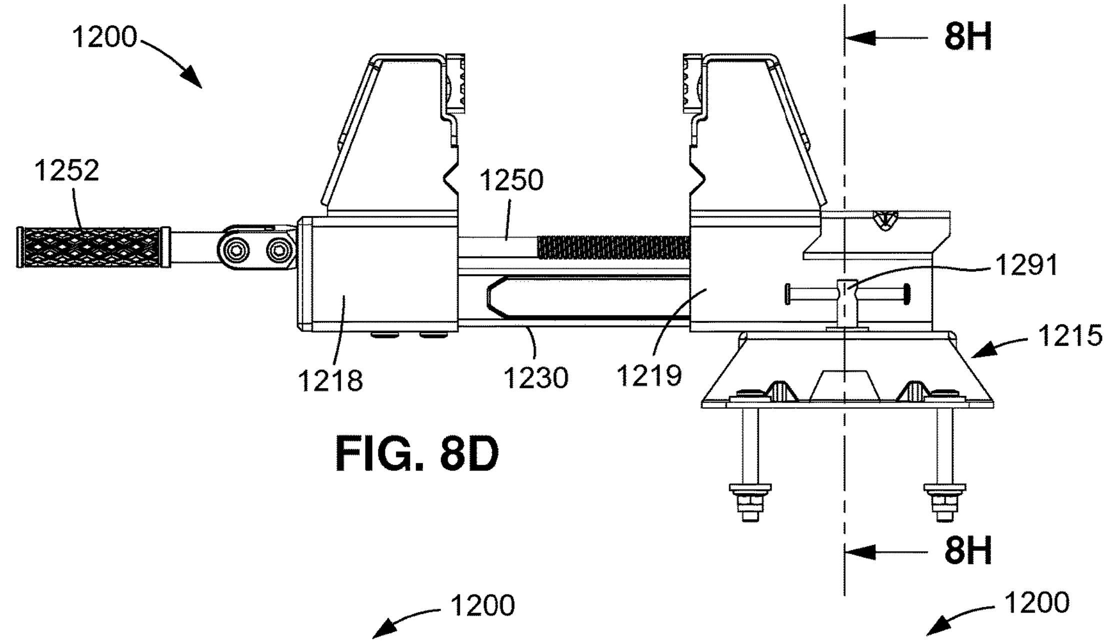
Figure 8E:
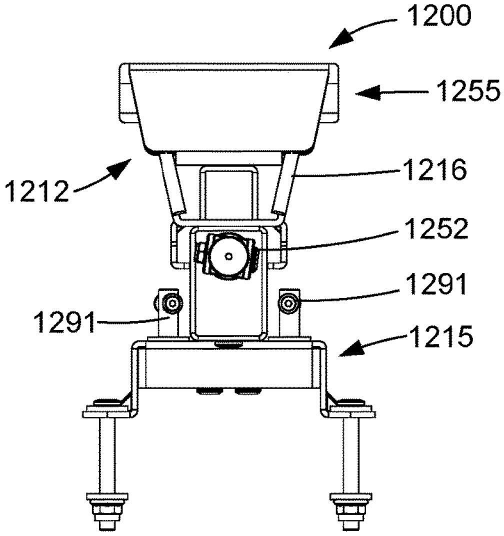
Figure 8F:
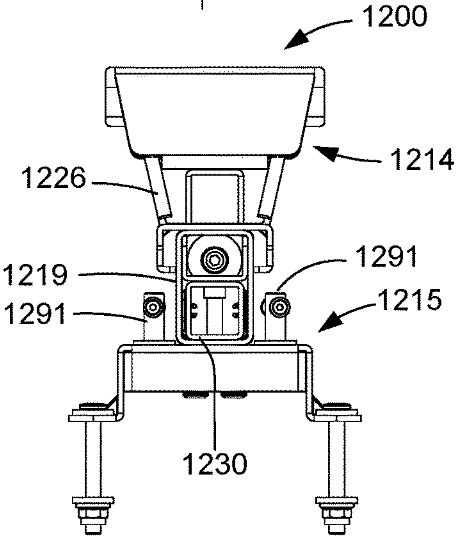
Figure 8G:
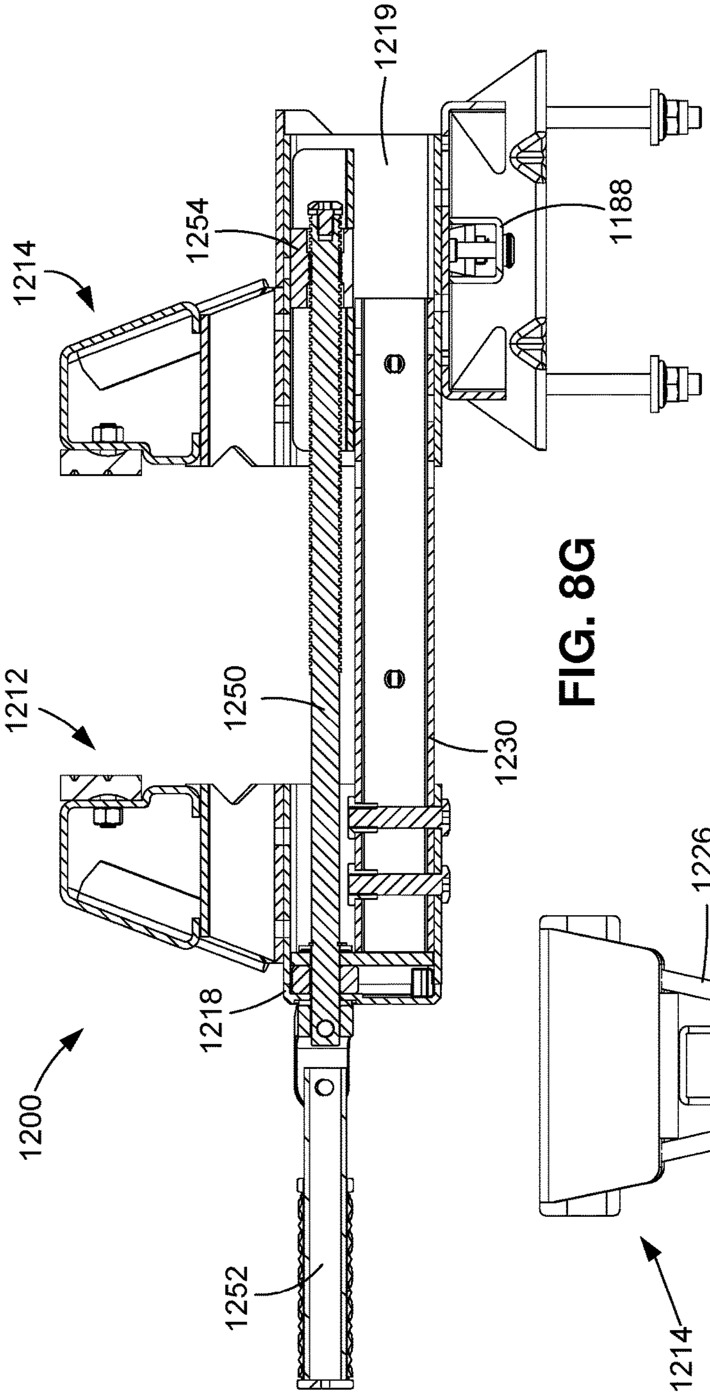
Figure 8H:
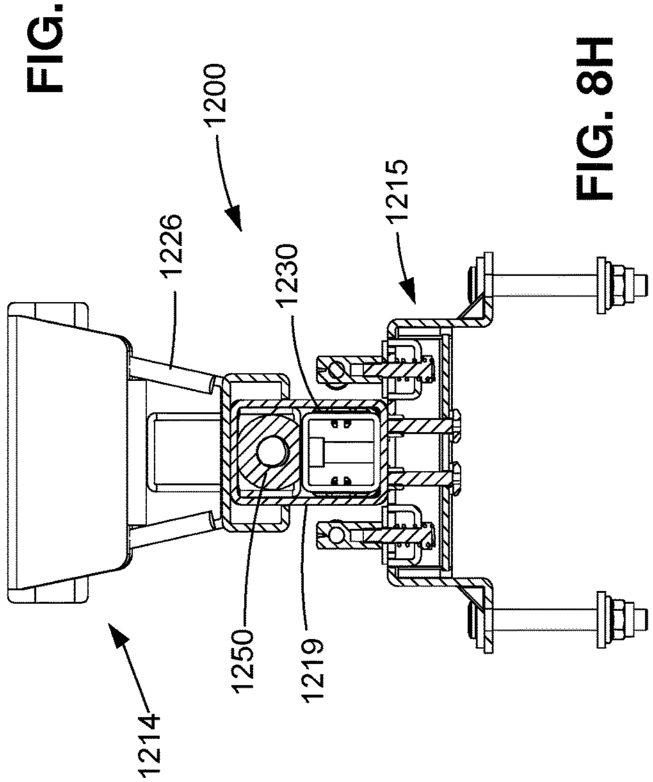
Figure 9A:
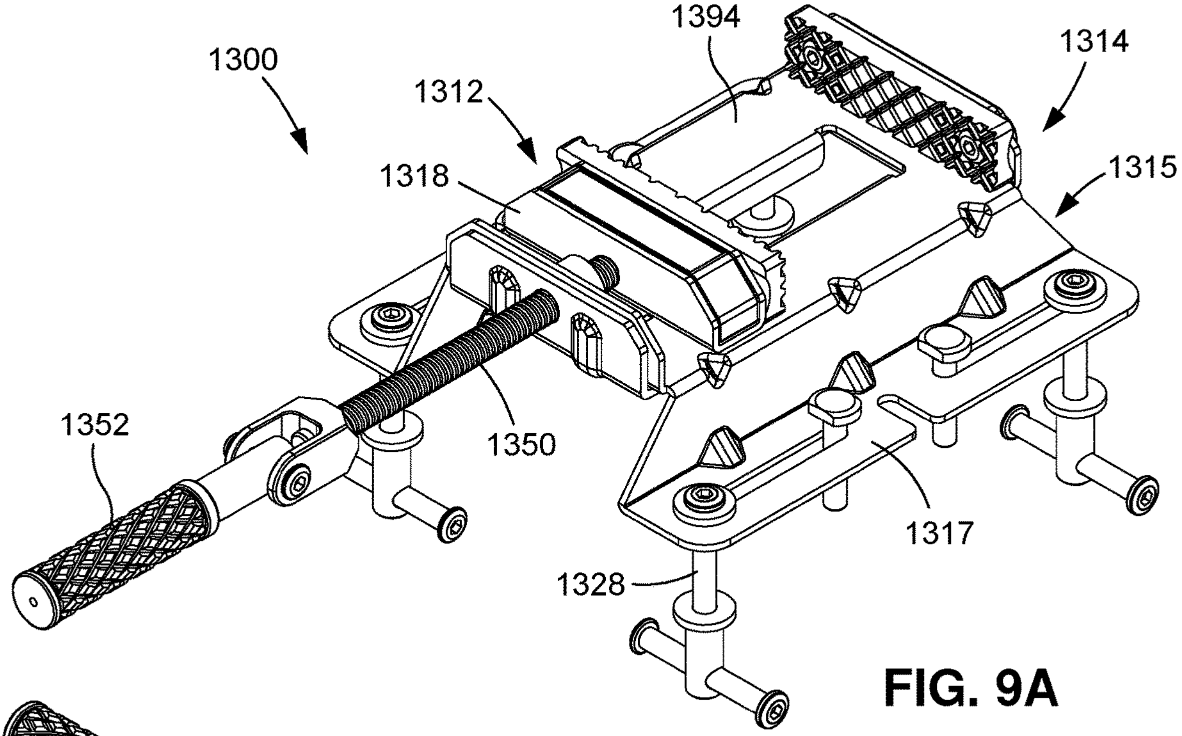
FIGS. 9A-9G are views of a drill press vise in accordance with an embodiment of the invention.
Figure 9B:
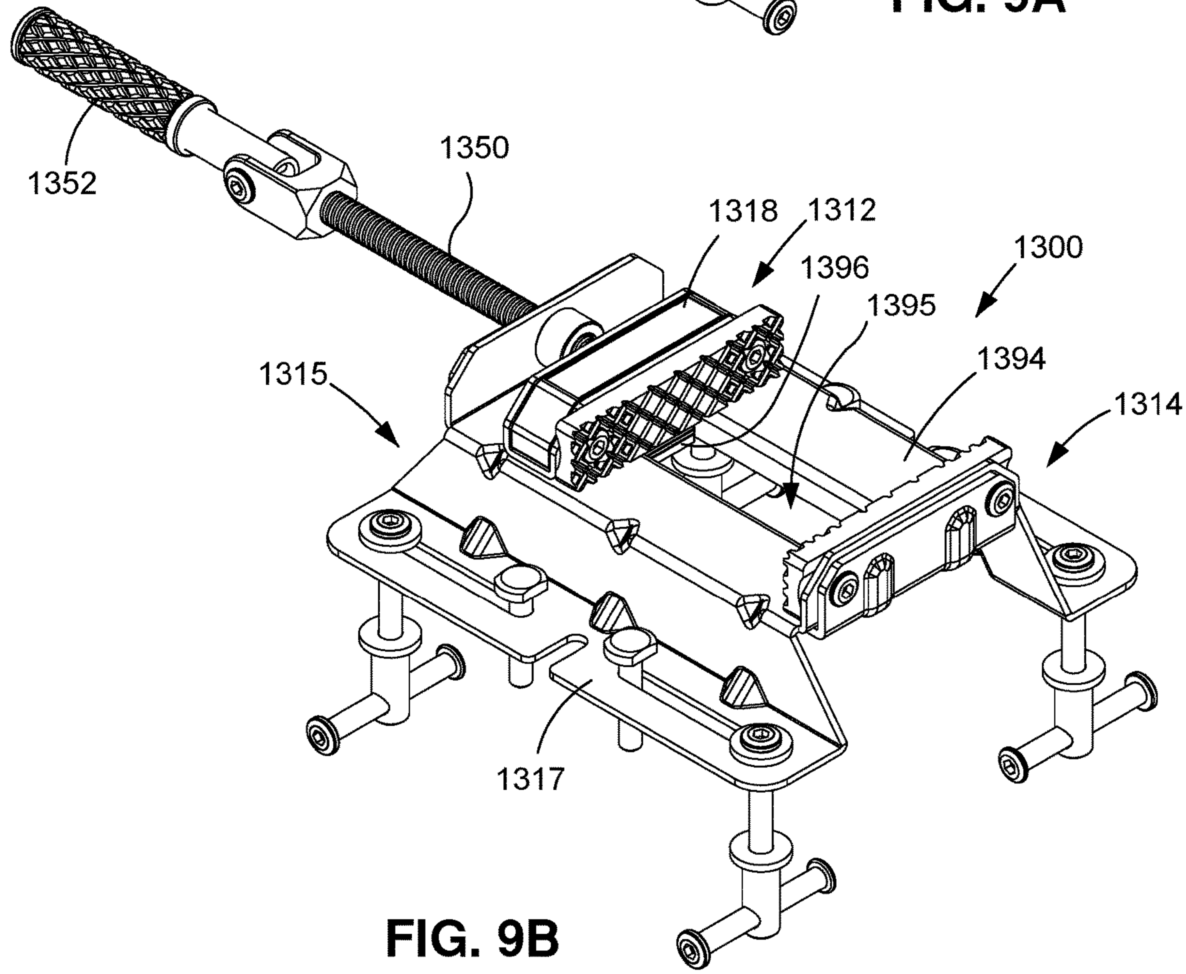
Figure 9C:
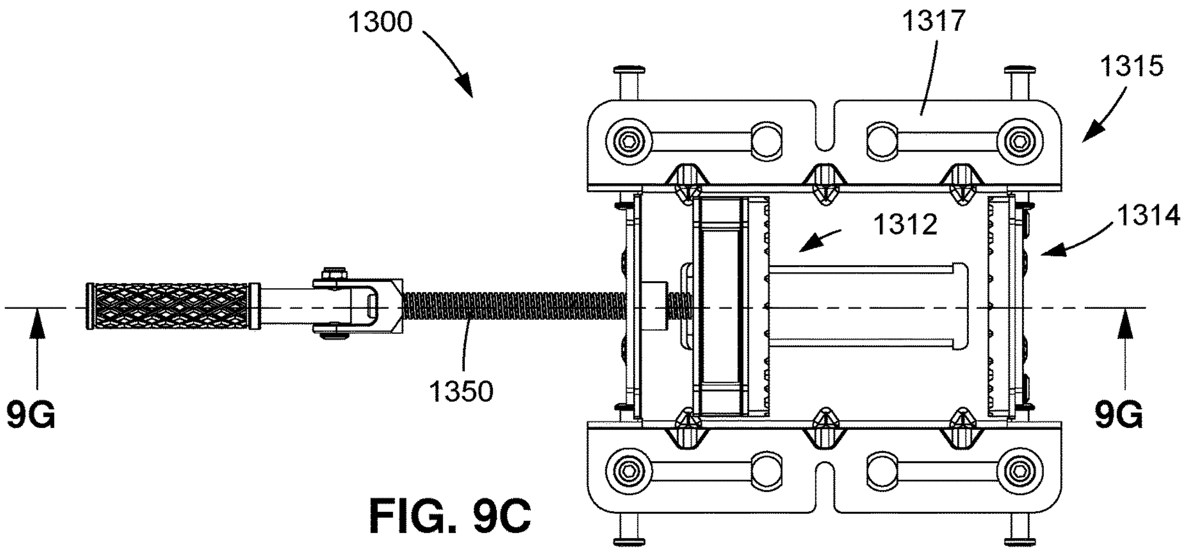
Figure 9D:
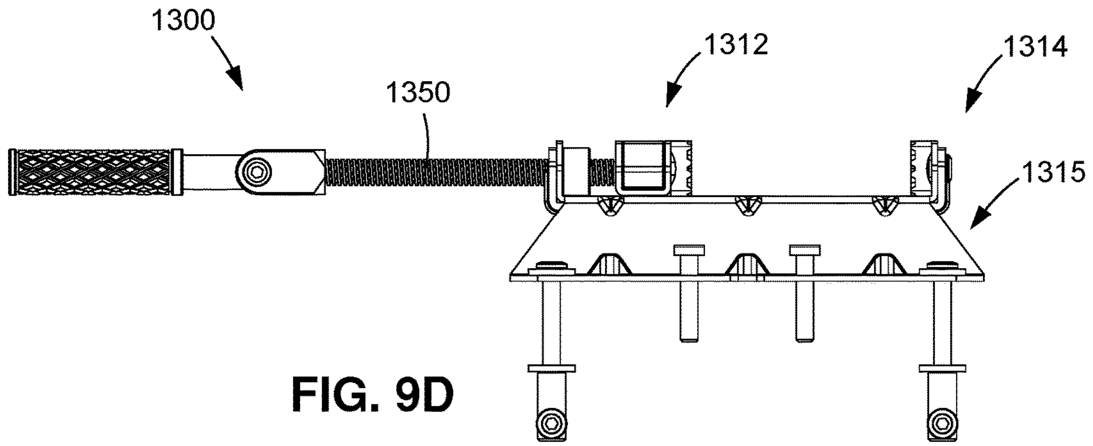
Figure 9E:
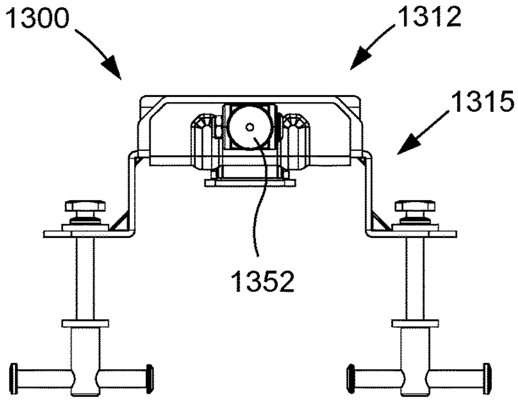
Figure 9F:
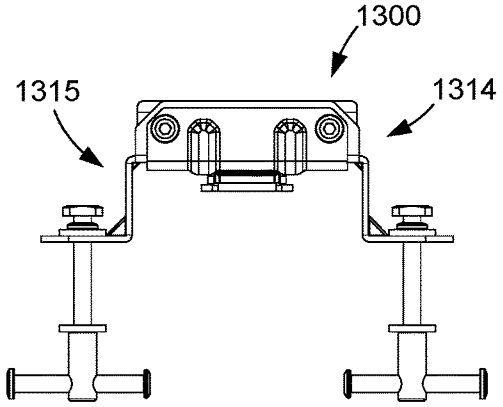
Figure 9G:
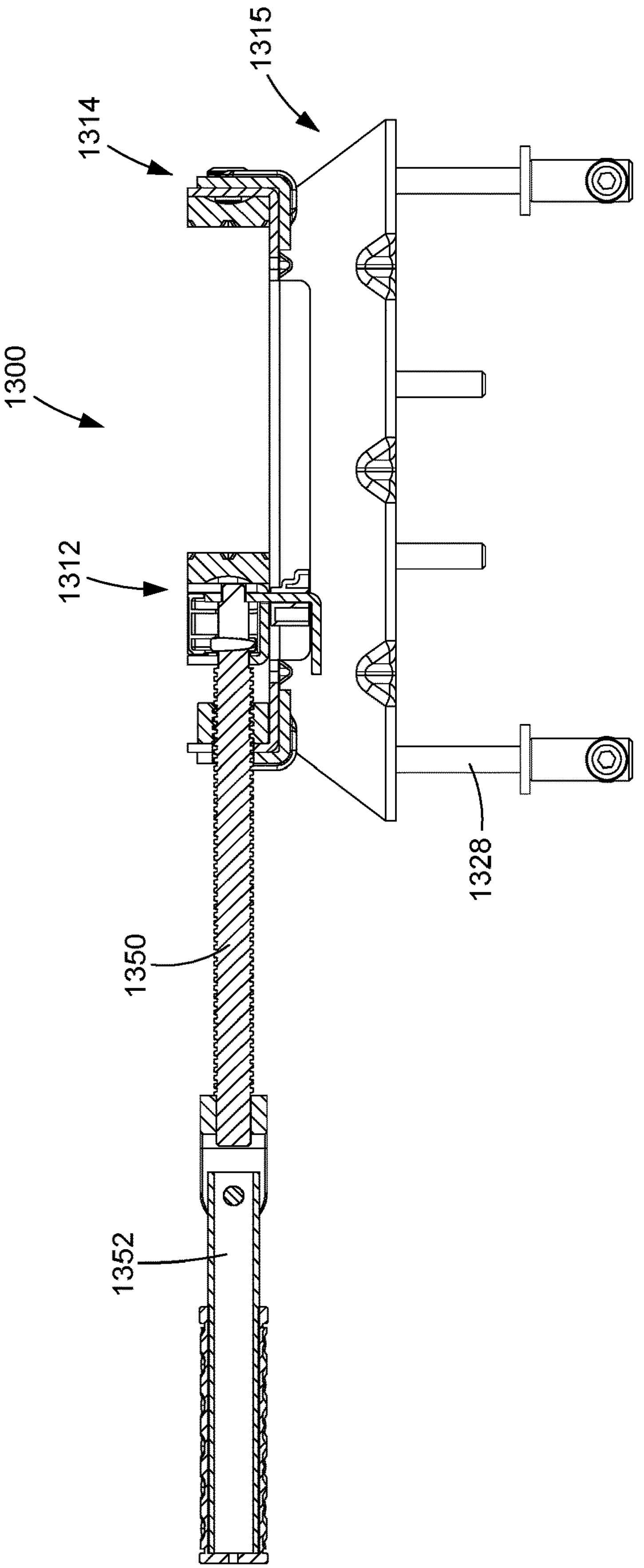

Referring to FIG. 8G, the movable jaw 1212 is preferably movable towards and away from the stationary jaw 1214. In one configuration, a threaded screw 1250 connects the movable jaw 1212 to the stationary jaw 1214. For example, a first end of the threaded screw 1250 may be rotationally supported by the housing 1218 of the movable jaw 1212. A handle 1252 may be connected to the first end of the screw 1250 to permit user rotation thereof. A second portion of the screw 1250 may engage a spindle nut 1254 which is mounted to the stationary jaw 1214, such as to the slide 1219.

In this embodiment, the screw 1250 is located outside of the saddle 1230, but like in other embodiments, it might be mounted in the saddle. When the handle 1252 is rotated, the saddle 1230, and thus the movable jaw 1212 connected thereto, is moved towards and away from the slide 1219 of the stationary jaw 1214.

In one embodiment, the vise 1200 may again include at least one anvil 1299, such as which is mounted to the slide 1219 and located at the top thereof.

Once again, the vise 1200 might be configured for connection to a trailer hitch receiver or other mount, a work surface or the like. In one embodiment, the vise 1200 includes a base 1215 which supports the vise 1200. The stationary jaw 1214 is preferably mounted to the base 1215. In one embodiment, the stationary jaw 1214 is rotatably mounted to the base 1215, such as via a plate 1284 and using the locking bar 1188 (FIG. 8G) and pin 1291 arrangement like that described above.

As illustrated in FIGS. 8A and 8B, the base 1215 may include upwardly extending sidewalls 1221, such as which extend upwardly from the flanges 1217 to a generally planar top of the base 121 to which the saddle 1230 is mounted. In one embodiment, one or more insets or apertures 1223 may be provided in the sidewalls 1221, such as extending upwardly from the intersection of the sidewall 1221 with the flange 1217. These insets or apertures 1223 may be configured to accept a head of a clamp which is placed over the flange 1217, such as to clamp the base 1215 to a work surface. Of course, this feature might be applied to other vises or work holding devices, including the other embodiments described herein.

Of course, features of the vises described herein might be utilized with the vise 1200, such as jaw bodies 1255 which include accessory mounts or mounting points and the like.

Yet another vise will be described with reference to FIGS. 9A-G. This vise 1300 may be referred to as a drill press vise. Once again, this vise 1300 may have features common to the vises described above, such as preferably having primarily a sheet metal construction rather than cast-component construction.

Once again, the vise 1300 again includes first and second jaws, such as a movable jaw 1312 and a stationary jaw 1314. The stationary jaw 1314 may be mounted to or formed as a portion of a base 1315 of the vise 1300. In one embodiment, the base 1315, and additional associated features of the vise 1300 are of a sheet-metal construction, such as constructed from sheet metal which is cut, bent and otherwise fabricated. In this configuration, the stationary jaw 1314 may comprise an upwardly extending flange which is located at one end of the base 1315.

The movable jaw 1312 is configured for movement relative to the base 1315, and thus the stationary jaw 1314. In one embodiment, a screw 1350 is rotationally supported by the base 1315, such as by passing through a flange defined by the base 1315. One end of the screw 1350 may be connected to the movable jaw 1312. A handle 1352 may be connected to the opposing end of the screw 1350, such as to permit rotation of the screw 1350 by a user.

In a preferred embodiment, the base 1315 has a raised portion 1394 (relative to a bottom portion thereof, such as mounting flanges 1317). The raised portion 1394 preferably defines a slot or opening 1395 therein, such as in a top of the base 1315, such as to permit a drill bit to pass therethrough (which raised portion 1394 then defines a space below it, such as between the raised portion and a workbench or other surface on which the vise 1300 is located). In one embodiment, the movable jaw 1312 may have a housing 1318 with a guide 1396 connected thereto, where the guide 1396 is configured to travel along the slot 1395, aiding in maintaining the movable jaw 1312 aligned as it moves back and forth.

Once again, the vise 1300 might be configured to be mounted to or supported by various supports. In one embodiment, the base 1315 defines one or more flanges 1317, such as for supporting or connecting one or more connectors 1328 which may be used to connect or fastener the base 1315 to a supporting surface, such as a work bench.

Of course, features of the vises described herein might be utilized with the vise 1300, such by including or defining jaw bodies which include accessory mounts or mounting points and the like.

Yet another vise will be described with reference to FIGS. 10A-I. This vise 1400 may be referred to as a wood vise. Once again, this vise 1400 may have features common to the vises described above, such as preferably having primarily a sheet metal construction rather than cast-component construction.

Once again, the vise 1400 again includes first and second jaws, such as a movable jaw 1412 and a stationary jaw 1414. In one embodiment, a screw 1450 is rotationally supported by the movable jaw 1412, such as by passing through a housing 1418 thereof. A handle 1452 may be connected to screw 1450, such as to permit rotation of the screw 1450 by a user. The stationary jaw 1414 is mounted on the screw 1450, such as by the screw 1450 engaging a threaded opening in a housing 1419 thereof.

The vise 1400 includes at least one saddle or guide 1430. In one embodiment, the vise 1400 includes two saddles 1430, such as positioned on each side of the screw 1450. The saddles 1450 may have various configurations, and in one embodiment, comprise rods. As illustrated one end of each of the saddles 1450 is connected to the stationary jaw 1414 (such as via a nut), while a second portion of each saddle 1450 is configured to slidably pass through the movable jaw 1412, such as through an opening in the housing 1418 thereof.

Once again, the vise 1400 might be configured to be mounted to or supported by various supports. In one embodiment, a mounting flange 1470 is adjustably connected to the stationary jaw 1414. The flange 1470 may have a first mounting portion 1472 and a second connecting portion 1474. The first mounting portion 1472 may extend outwardly from the stationary jaw 1414, such as generally perpendicular thereto, such as for placement on or against a mounting surface, such as a workbench. The first mounting portion 1472 may include one or more mounts or mount openings therein, such as for accepting fasteners which may be used to connect the vise 1400 to a support such as a workbench surface.

The second connecting portion 1474 is configured to connect the mounting flange 1470 to the stationary jaw 1414. The second connecting portion 1474 may extend generally perpendicular to the mounting portion 1472. The second connecting portion 1474 may comprise a plurality of mounts or mount opening for use in connecting the mounting flange 1470. In one embodiment, the second connecting portion 1474 defines slots or openings in different locations for accepting fasteners which connect the mounting flange 1470 to the stationary jaw 1474. In a preferred configuration, these mounting openings allow the position of the mounting flange 1470 to be adjusted in a vertical direction (e.g. raised or lowered) relative to the stationary jaw 1414.

FIG. 101 illustrates another configuration of an adjustable mounting for the mounting flange 1470, where the mounting flange 1470 includes extensions 1470*a*, such as located at opposing sides thereof. These extensions 1470*a* are preferably configured to overlap at least a portion of the stationary jaw 1414, such as side portions thereof. One or more fasteners (such as bolts having a corresponding nut on opposing side of a head thereof) may be used to connect the mounting flange 1470 to the stationary jaw 1414. In one embodiment, a means is provided for adjustably mounting the mounting flange 1470. In one configuration, a plurality of spaced openings or a slot 1473 is provided in the stationary jaw 1414 (such as in each side thereof) for accepting the fasteners which are used to connect the mounting flange 1470 thereto in different vertical mounting positions.

Figure 10A:
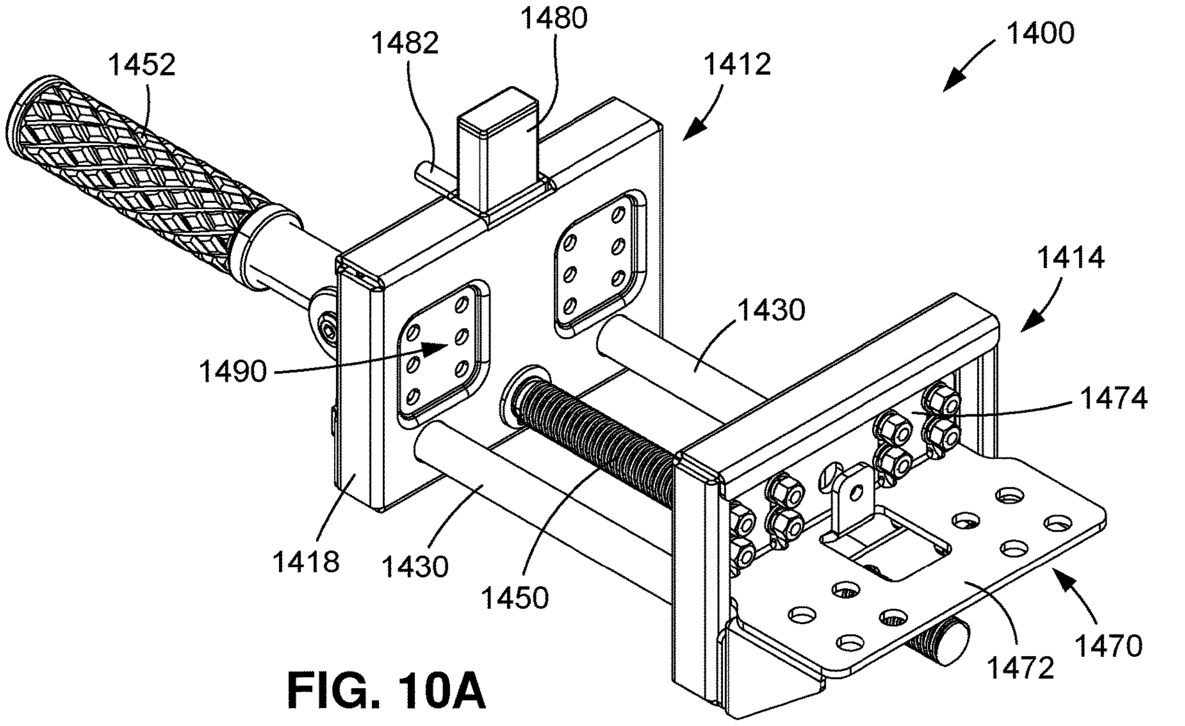
FIGS. 10A-10I are views of a wood vise in accordance with an embodiment of the invention.
Figure 10B:
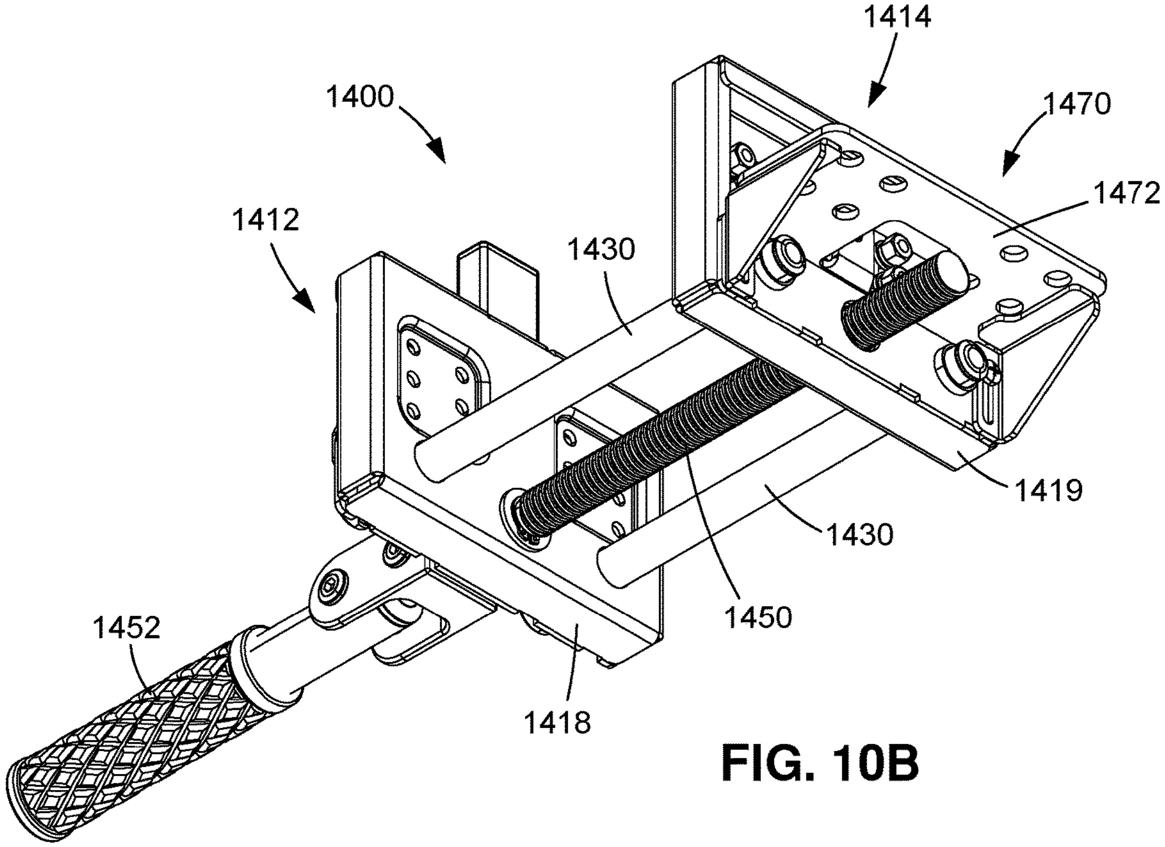
Figure 10C:
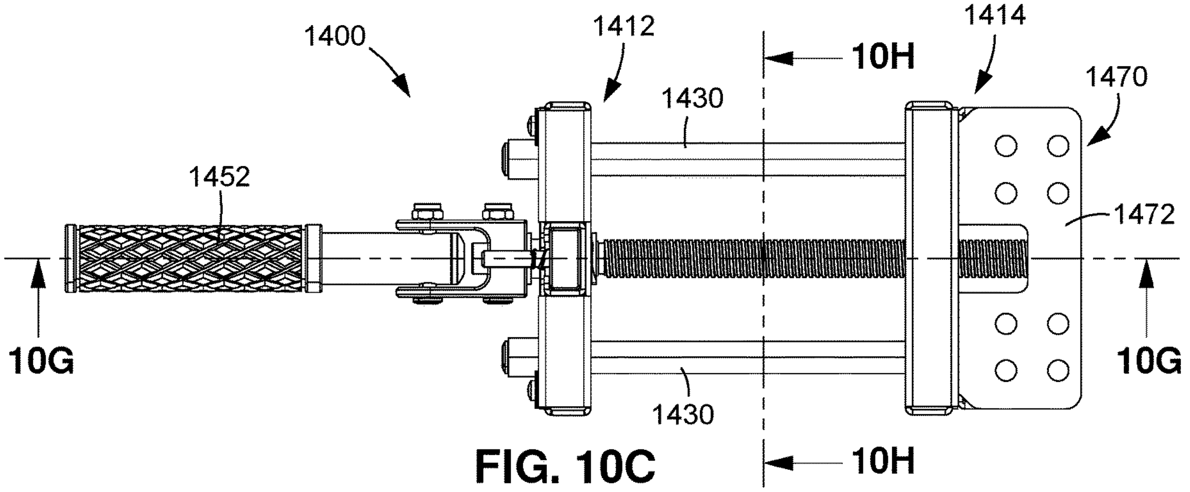
Figure 10D:
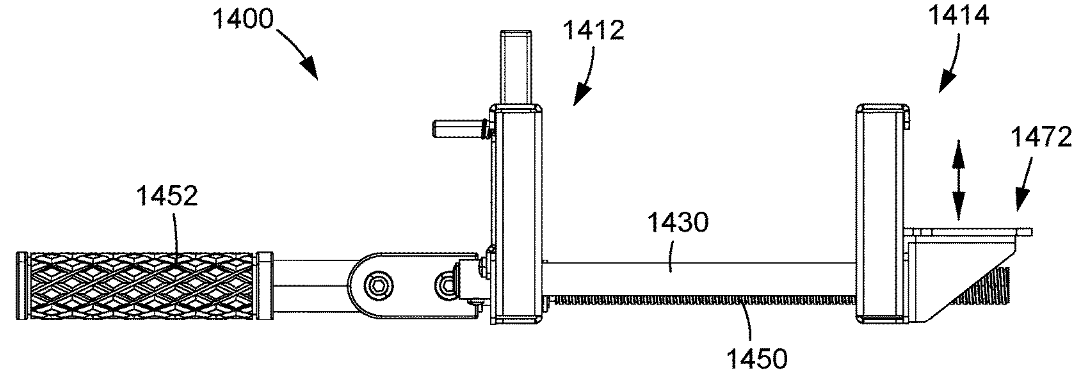
Figure 10E:
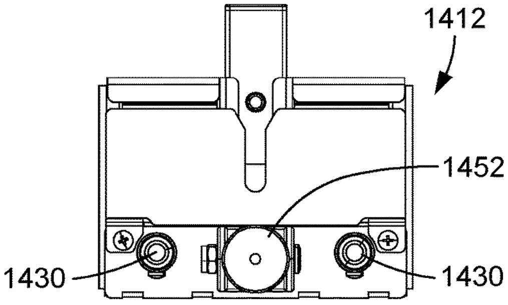
Figure 10F:
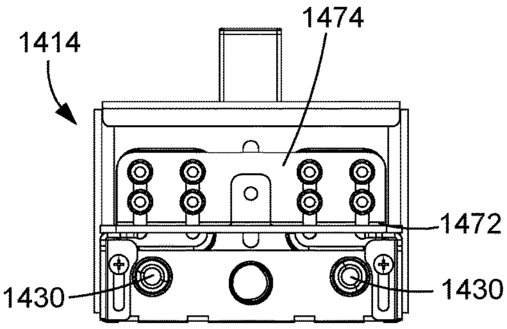
Figure 10G:
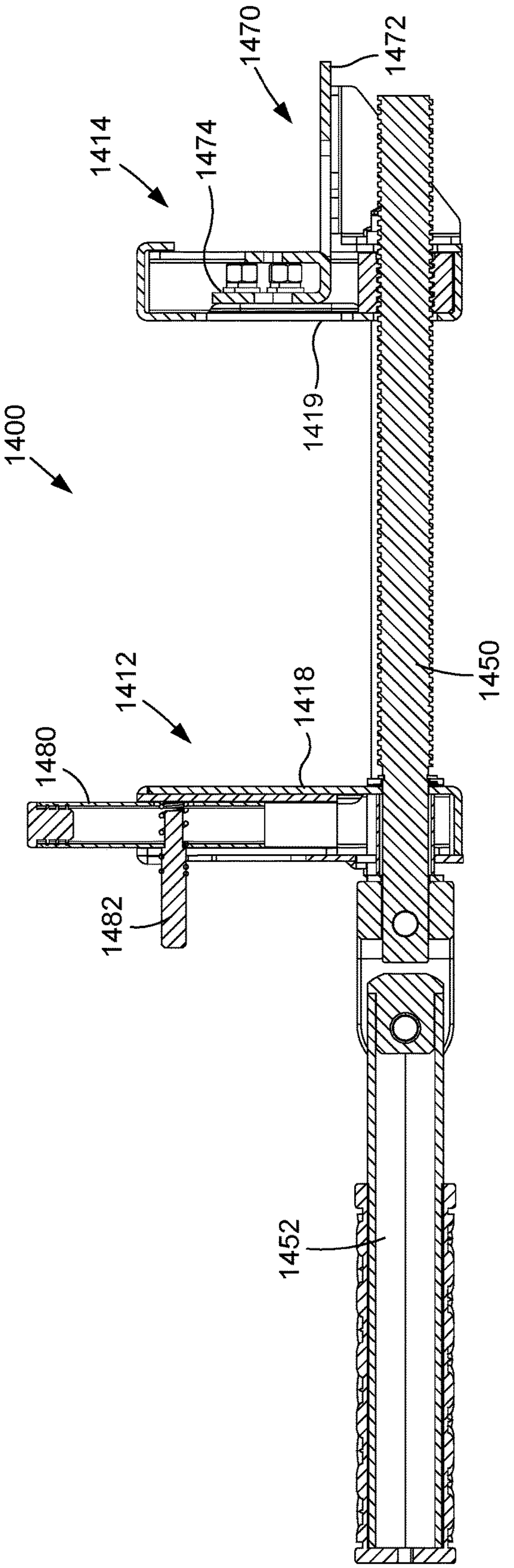
Figure 10H:
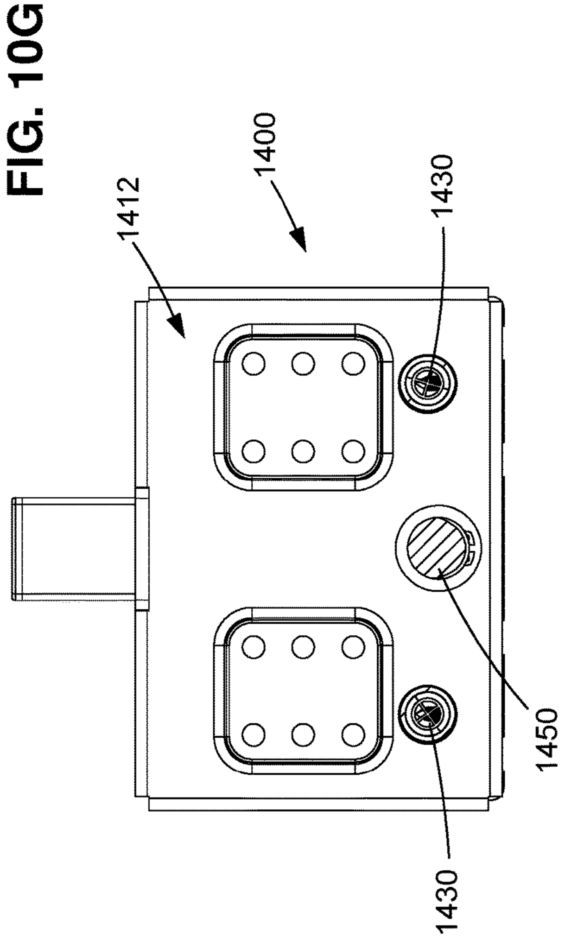
Figure 10I:
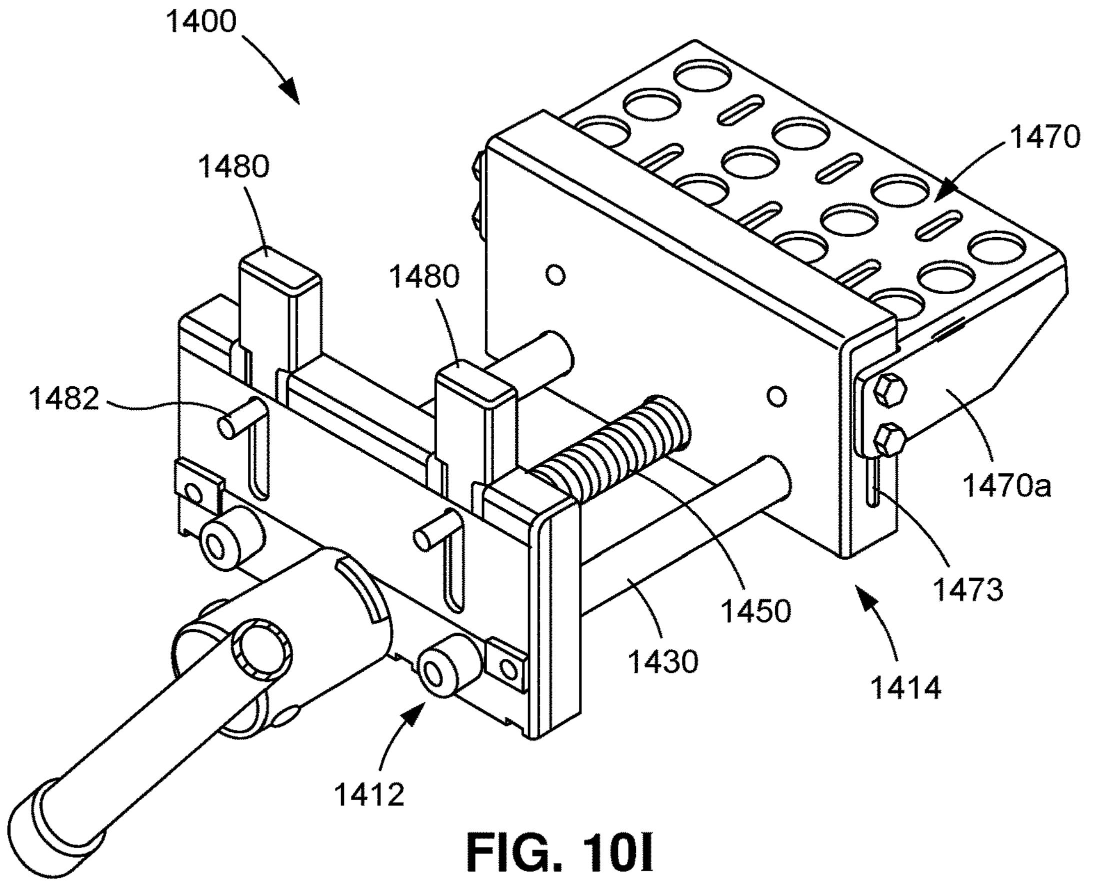

In one embodiment, the vise 1400 may include at least one dog or stop. The dog 1480 may comprise a body which can be raised and lowered, such as relative to the movable jaw 1412. In one embodiment, the dog 1480 may move relative to a slot or opening that extends downwardly from the top of the movable jaw 1412, thus allowing the dog to be retracted into the movable jaw 1412 or raised above the movable jaw (as illustrated in FIG. 10A). In one embodiment, the position of the dog 1480 may be controlled by a biased pin 1482. Of course, more than one dog could be provided, such as illustrated in FIG. 10I.

In one embodiment, faces of the jaws 1412,1414 preferably include one or more insets 1490. These insets may include openings or apertures, such as for accepting fasteners which may be attached to a workpiece, and the fasteners which are used to connect the mounting flange 1470 (in an offset manner in which they do not interfere with the main working surface of the jaw).

As noted above, one aspect of the invention is a vise which is constructed primarily from sheet metal components and/or tubing, rather than being cast or having cast components. Such a construction can reduce the total weight of the vise by as much as 30% or more, saving material and costs associated with shipping and storage.

Advantageously, as indicated above, the modularity of the components allows the creation of different vises using many common components.

In one embodiment, as best illustrated in FIG. 6I, the saddle 1030 may be constructed from sheet metal which is bent. In this configuration, an opening or slot 1030*a* may be defined, such as at a bottom of the saddle (that corresponds to the two sides of the sheet metal that are used to form the saddle; as illustrated, the sides of the sheet metal may be folded so as to form flanges at each opposing sides of the slot 1030*a*, thus increasing the strength of the saddle 1030 at the location of the slot 1030*a*). This again reduces the weight of the saddle, but also provide an opening or slot through which the interior of the saddle is easily accessed, such as for connection of the drive screw mounts/nuts.

As further illustrated in FIG. 6I, the saddle 1030 may include insets or channels on one or more sides thereof, such as the top (opposite the slot 1030*a*) and the opposing sides. The formation of the inset channel (such as in a middle portion of the top/side in relation to the ends) may cause each side (the top and opposing sides) of the saddle 1030 to have a sigma (E) beam profile which increases the strength of the saddle 1030, which is desirable in relation to the sheet metal construction thereof. This allows a thinner gauge of flat sheet steel to be used to make the saddle 1030, reducing the cost and weight thereof.

Figure 7L:
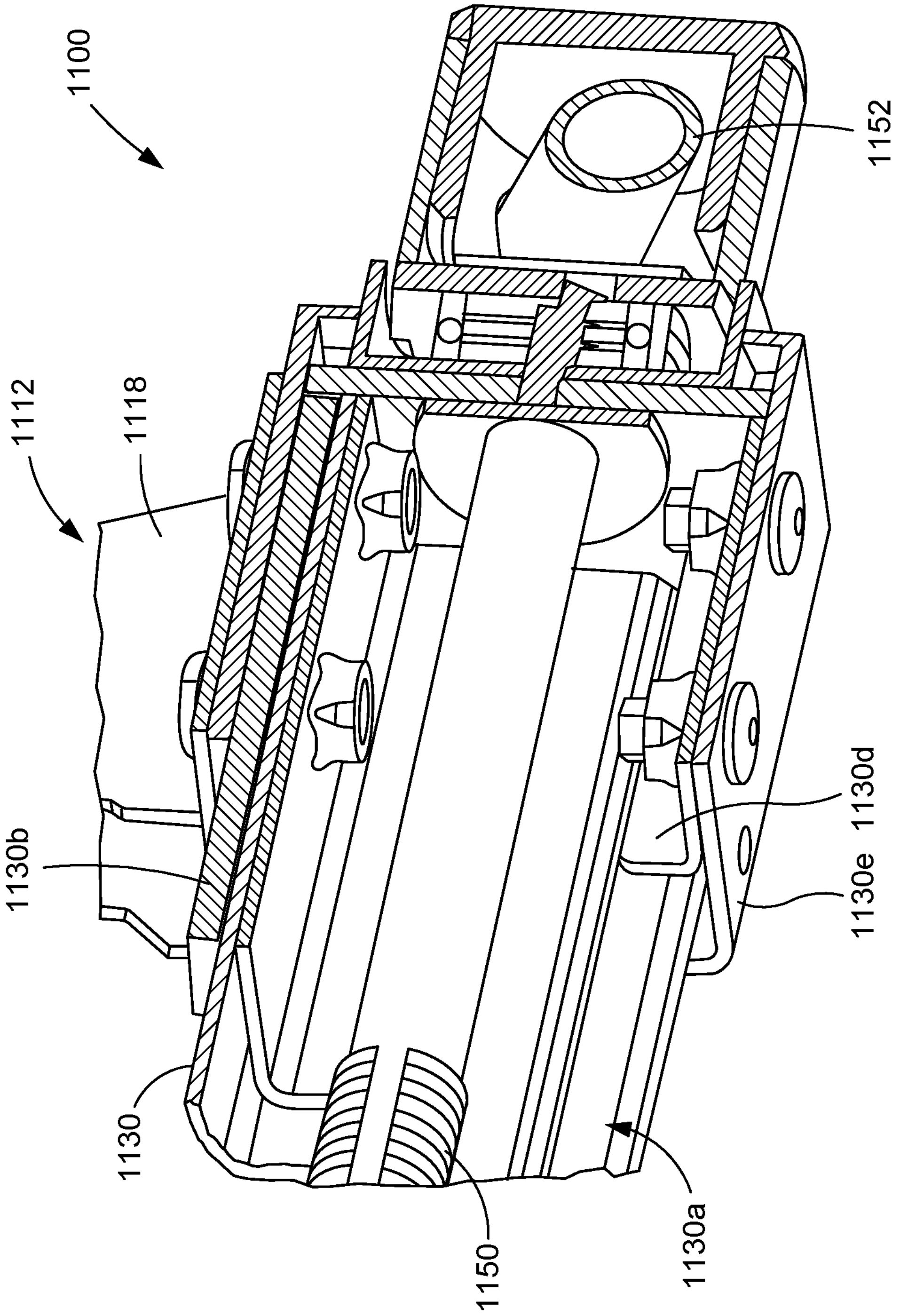

As illustrated in FIG. 7L, in some embodiments, one or more reinforcing elements or members may be associated with the saddle, such as when it is fabricated from sheet metal as described herein, such as for increasing the strength thereof, such as in certain regions. FIG. 7L illustrates one example where an end portion of the saddle 1130 of the vise 1100 (further illustrated in FIGS. 7A-7K and described above), may include or have one or more reinforcing members associated therewith.

For example, a top plate 1130*b* may be located in the top channel of the saddle 1130, such as extending along a portion of the length thereof, such as from the end at which the handle 1152 is located and towards the other end. In addition, at least one of a top inner plate 1130*c* and bottom inner plate 1130*d* may be located inside of the saddle 1130, such as in a similar location. As illustrated, these plates 1130*c,d* may be "c" shaped, such as having a flat central section which extends across the top or bottom of the saddle 1130, and then curved "L" shaped ends which extend along the sides, thus resisting flexing of the saddle 1130 in any direction. In one configuration, at least one outer mount 1130*e* may surround at least a portion of the end of the saddle 1130 (or other reinforced areas), such as to provide mounting or connection points.

In one embodiment, fasteners which are used to connect the base 1118 of the first jaw 1112 to the saddle 1130 may be used to connect a top portion of the outer mount 1130*e*, top plate 1130*b* and top inner plate 1130*c*, to one another and the saddle 1130, while one or more other fasteners may be used to join the bottom inner plate 1130*d* to the outer mount 1130*e*, thus maintaining the bottom inner plate 1130*d* in position relative to the saddle 1130 (such as where the bottom inner plate 1130*d* is located at the slot 1130*a* in the bottom of the saddle 1130 and is thus not directly connected to the saddle 1130. Again, this configuration allow for the vise to be constructed from sheet-metal fabricated elements which are assembled into a unitary structure, and where the components thereof may be removed for replacement or repair, unlike in vise which utilizes cast components.

Again, this feature (saddle configuration, including reinforcement) may be applied to other vises or workpiece holders, such as other embodiments of the vises described herein.

In a preferred embodiment, one end of the drive screw may be supported by a nut (such as an ACME nut) which is located in a bracket. This bracket and nut may then be bolted to the saddle, thus allowing the bracket, nut and drive screw to be disconnected from the saddle for service or replacement by the user (see for example, FIG. 7G). Likewise, the spindle nut may be connected to a bracket which is connected to the stationary jaw, such as with bolts, thus allowing the spindle nut to be disconnected therefrom and removed from the interior of the saddle (see again FIG. 7G).

Further, the insets in the saddle permit guides, such as low-friction nylon guides, to be located in the insets while still accommodating the saddle in a housing or slide. One such configuration is illustrated in FIG. 6I and described above. Of course, such nylon or similar bushings might be similarly used with the movable jaw base 1018 of that embodiment, and further such a nylon or similar bushing may be utilized relative to the other embodiment vises of the invention or other vises, including where the bushing is associated with a slide lock or is used independently thereof.

In a preferred configuration, the saddle of the vise is connected to the movable jaw via fasteners such as bolts. This allows the vise construction to be modular and allows servicing of the components. For example, this allows a user to replace the saddle (such as if damaged) by simply sliding the stationary jaw off of the saddle, and removing the movable jaw and associated screw drive. This is contrary to cast vises where slides are cast with the bodies of the vises, thus preventing their separation and/or replacement.

In one embodiment, elements of the vises may be connected via welding or fasteners. Relative to sheet-metal construction, connection with fasteners is permitted by simply forming openings in the components (such as by drilling), rather than the more complex configuration of having to drill and tap holes in cast components.

As indicated, in one embodiment, the jaw bodies may be connected to the housing or slide of the jaw, such as via one or more sheet-metal struts or mounts (see, e.g. 1016 and 1026 in FIGS. 6A and B). In one embodiment, as illustrated, these struts or supports 1016, 1026 might comprise two outer and two inner supports, where the inner supports form a "U" shape, and where faces of the supports acts as jaws, having engaging features (such as teeth/indents, etc.) thereon, whereby the supports acts as an additional working surface.

Figure 11:
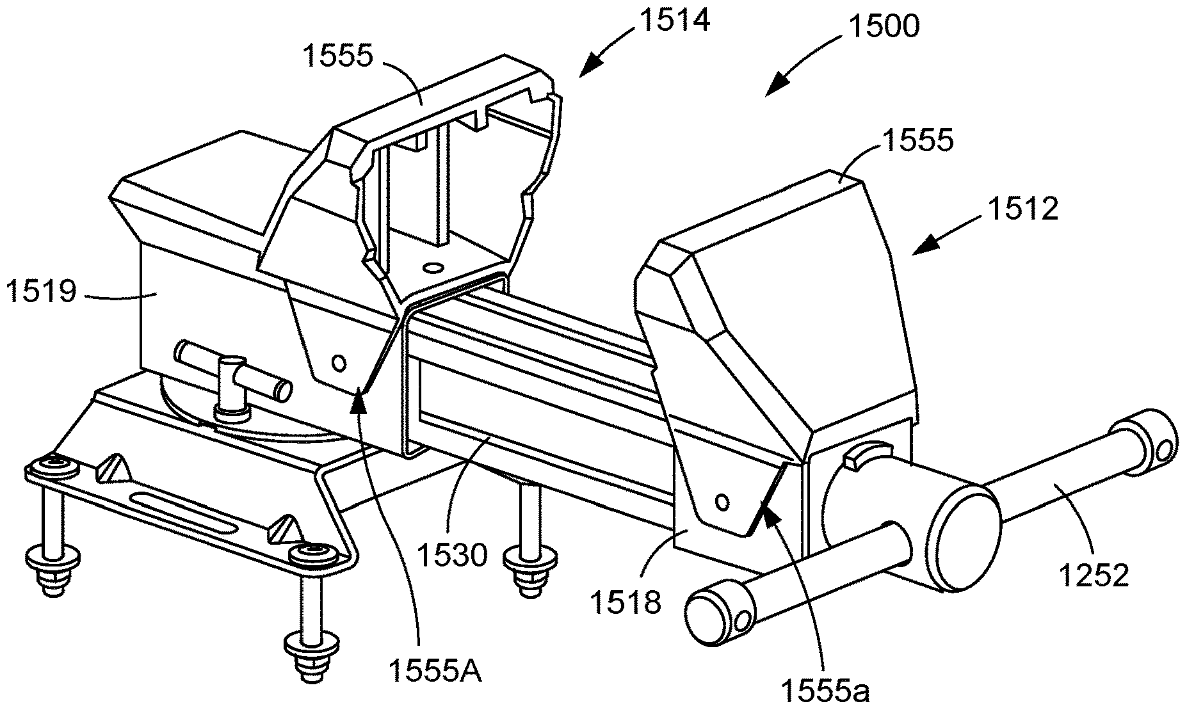
FIG. 11 illustrates yet another vise in accordance with an embodiment of the invention.

FIG. 11 illustrates yet another embodiment of the invention which is a hybrid vise 1500. This vise 1500 is similar in configuration to the vise 800 which is illustrated in FIGS. 8A and 8B and described above.

In this embodiment, the vise 1500 may again include a first or movable jaw 1512 and a second or stationary jaw 1514, as mounted to a base 1515 and having a saddle 1530. In this embodiment, however, the jaw bodies 1555 of the first and second jaws 1512,1514 are cast bodies. In one configuration, the jaw bodies 1555 include one or more flanges 1555*a*, such as which extend downwardly therefrom, such as to permit the jaw body 1555 of the first jaw 1512 to be connected to the jaw body 1518 thereof, and to permit the jaw body 1555 of the second jaw 1514 to be connected to the slide 1519, such as an outer sides thereof using fasteners. In this configuration, the remaining portions of the vise 1500 may again be constructed from sheet metal, but where the jaw bodies 1555 are cast (and as illustrated, may include one or more openings or holes for reducing the weight thereof, but including one or more ribs or similar elements for strength, such as in supporting a top portion which defines the work surfaces thereof, in relation to the bottom/mounting portions thereof. Of course, this aspect of the invention might be applied to vises or work holding/supporting devices of various configurations, including other embodiments of the vises described herein.

As described herein, a vise of the invention may include an anvil (such as anvils 1099, 1199, 1299 of the embodiments illustrated in FIGS. 6A, 7A, 8A, etc.). In one embodiment, the anvil may be fabricated from sheet metal, such as to define a generally planar top working surface and one or more supporting or mounting portions, such as side portions or flanges which extend downwardly from the top working surface, such as for mounting the anvil to another portion of the vise (such as a slide portion thereof). In one configuration, the anvil may be detachably connected to the vise, such as with one or more threaded fasteners, such as to permit a user to remove the anvil for repair or replacement. In addition, in one embodiment, the anvil might be cast, in similar configuration to the jaw bodies 1555 just described above.

It will be appreciated that features of the different vise/embodiments might be used in various combinations, including vises of other configurations. For example, the jaw mounting configuration of the fabrication vise 900 (including stationary and movable jaws mounted on a saddle) might be used with a vise which does not have the elements thereof made from sheet metal (such as where the jaw bodies are cast and then mounted on the saddle).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A vise comprising:

a base;

a first jaw fixedly connected to said base and defining a passage;

a saddle having a first end and a second end and extending longitudinally between said first jaw and said second jaw such that said saddle is configured to extend and translate within said passage;

a second jaw movably mounted to said saddle;

a first means for moving said second jaw relative to said saddle;

a spindle extending into said saddle; and a spindle nut configured to couple said second jaw to said spindle, wherein said saddle is movable relative to said first jaw and movement of saddle relative to said first jaw causes said first and second jaws to be moved towards and away from one another, and wherein movement of said second jaw relative to said saddle causes said first and second jaws to be moved towards or away from one another.

2. The vise in accordance with claim 1, wherein said saddle comprises an elongated tubular mount.

3. The vise in accordance with claim 2, wherein said saddle is fabricated from sheet metal and has a top, a pair of opposing sides, and a bottom which defines an elongated slot.

4. The vise in accordance with claim 3, wherein said top and sides of said saddle define an inset channel.

5. The vise in accordance with claim 3, wherein said top and sides of said saddle have a Σ beam configuration.

6. The vise in accordance with claim 1, wherein said base has a top surface and a bottom surface, said bottom surface configured to be mounted to a work surface, and wherein said first jaw comprises a jaw body connected to said slide by angled support beams disposed on opposing sides of said passage.

7. The vise in accordance with claim 6, wherein said jaw body is fabricated from sheet metal and defines one or more generally planar working surfaces supported by said angled support beams.

8. The vise in accordance with claim 6, wherein said second jaw comprises a base and a jaw body mounted to said base, wherein said base defines a passage through which said saddle extends and where said jaw body is fabricated from sheet metal and defines one or more planar working surfaces supported by one or more support beams, wherein at least one working surface of said jaw body faces a working surface of said first jaw, wherein said at least one working surface of said jaw body and said working surface of said first jaw are disposed perpendicular to said top surface.

9. The vise in accordance with claim 8, further comprising a saddle lock configured to selectively fix said saddle relative to said first jaw via an aperture of a plurality of apertures spaced apart by a first increment, wherein said rotation of said handle is configured to adjust a position of said second jaw by a second increment, said second increment being less than said first increment.

10. The vise in accordance with claim 9, wherein said means comprises a least one pin which is mounted to said first jaw and can be moved in and out of at least one aperture in said saddle.

11. The vise in accordance with claim 1, wherein said base comprises one or more upwardly extending walls and a top, an interior space under said top, and at least one drawer which is configured to be moved relative to one of said walls in and out of said interior space.

12. The vise in accordance with claim 11, wherein a cutout extends into at least one of said walls from a bottom of the wall upwardly along said wall.

13. The vise in accordance with claim 1, wherein said base comprises at least one flange configured for mounting said vise to a generally planar support surface.

14. The vise in accordance with claim 1, wherein a first handle is connected to a first end of said spindle for turning said spindle, wherein, in response to a rotation of said first handle, said first handle is configured to movably adjust said second jaw along said saddle, and further comprising a second handle connected to said second jaw, wherein in response to a force applied in a longitudinal direction to said second handle, said second handle is configured to translate said saddle and said second jaw with respect to said first jaw.

15. The vise in accordance with claim 1, wherein at least one of said first and second jaws comprises a generally vertical working surface having at least one pin which is biased to extend outwardly therefrom.

16. The vise in accordance with claim 1, wherein at least one of said first and second jaws comprises jaw body and a plurality of workpiece engagement members which are independently movable relative to the jaw body.

17. The vise in accordance with claim 16, wherein said workpiece engagement members comprise mounts which are movable relative to a base which is connected to said jaw body, said mounts having a first end and a second end, at least one biasing member associated with said first end.

18. The vise in accordance with claim 17, wherein said at least one biasing member comprises an elastomeric member or a spring.

19. The vise in accordance with claim 1, wherein said first jaw is rotatably mounted to the base.

* * * * *